(12) United States Patent
Griebat

(10) Patent No.: US 8,515,790 B2
(45) Date of Patent: Aug. 20, 2013

(54) COMPUTER PROGRAM AND METHOD FOR JURY SELECTION

(76) Inventor: Jeb C Griebat, Chanute, KS (US)

( * ) Notice: Subject to any disclaimer, the term of this patent is extended or adjusted under 35 U.S.C. 154(b) by 1766 days.

(21) Appl. No.: 11/367,872

(22) Filed: Mar. 3, 2006

(65) Prior Publication Data

US 2006/0198502 A1 Sep. 7, 2006

Related U.S. Application Data

(60) Provisional application No. 60/658,949, filed on Mar. 5, 2005.

(51) Int. Cl.
*G06Q 10/00* (2012.01)
*G09B 19/00* (2006.01)

(52) U.S. Cl.
USPC .......................................... 705/7.11; 434/235

(58) Field of Classification Search
USPC .......................................... 705/7.11; 434/235
See application file for complete search history.

(56) References Cited

U.S. PATENT DOCUMENTS

| | | | | |
|---|---|---|---|---|
| 5,802,493 A * | 9/1998 | Sheflott et al. | ................. | 705/1.1 |
| 5,875,431 A * | 2/1999 | Heckman et al. | ............ | 705/7.16 |
| 6,189,029 B1 * | 2/2001 | Fuerst | ............................ | 709/217 |
| 6,477,504 B1 * | 11/2002 | Hamlin et al. | ............... | 705/7.32 |
| 6,607,389 B2 * | 8/2003 | Genevie | ......................... | 434/235 |
| 6,640,213 B1 * | 10/2003 | Carp et al. | .................... | 705/7.32 |
| 7,111,230 B2 * | 9/2006 | Euchner et al. | ............... | 715/232 |
| 7,284,985 B2 * | 10/2007 | Genevie | ........................ | 434/235 |
| 7,565,615 B2 * | 7/2009 | Ebert | ............................ | 715/762 |
| 7,657,831 B2 * | 2/2010 | Donahue | ........................ | 715/234 |
| 7,665,993 B2 * | 2/2010 | Genevie | ........................ | 434/235 |
| 8,176,004 B2 * | 5/2012 | Malaney et al. | .............. | 707/608 |
| 2001/0053967 A1 * | 12/2001 | Gordon et al. | .................. | 703/22 |
| 2003/0028406 A1 * | 2/2003 | Herz et al. | ........................ | 705/4 |
| 2003/0031991 A1 * | 2/2003 | Genevie | ........................ | 434/235 |
| 2003/0200137 A1 * | 10/2003 | Drummond | ...................... | 705/12 |
| 2004/0002044 A1 * | 1/2004 | Genevie | ........................ | 434/235 |
| 2004/0024634 A1 * | 2/2004 | Carp et al. | ...................... | 705/10 |
| 2004/0030992 A1 * | 2/2004 | Moisa et al. | .................. | 715/513 |
| 2004/0054546 A1 * | 3/2004 | Levin et al. | ........................ | 705/1 |
| 2004/0093263 A1 * | 5/2004 | Doraisamy et al. | ............. | 705/11 |
| 2005/0120294 A1 * | 6/2005 | Stefanison et al. | ........... | 715/506 |
| 2005/0149567 A1 * | 7/2005 | Levin et al. | ................. | 707/104.1 |
| 2005/0197884 A1 * | 9/2005 | Mullen | ............................ | 705/10 |
| 2006/0031177 A1 * | 2/2006 | Rule | ................................. | 705/80 |
| 2006/0036464 A1 * | 2/2006 | Cahoy et al. | ........................ | 705/1 |
| 2006/0069605 A1 * | 3/2006 | Hatoun | ............................. | 705/9 |

OTHER PUBLICATIONS

Richard Waite's et al. "The Role and Effectiveness of Jury Selection in Eliminating Jury Bias"; The Advocates (Advocacy Sciences, Inc.); 6 pages.*
Jury Selection American Judicature Society, AJS, Feb. 11, 2005, Retrieved from Archive.org Apr. 18, 2013.*
Blue, Lisa, Ten Tips for an effective Voir Dire State Bar of Texas, Choosing and Courting a Jury Institute, Apr. 29, 2005.*

(Continued)

*Primary Examiner* — Scott L Jarrett
(74) *Attorney, Agent, or Firm* — David E. Herron, II

(57) ABSTRACT

The invention pertains to computer software tailored to streamline jury selection methods that are currently used by Courts worldwide, and in particular state and federal courts of the United States. The invention is also an improvement upon the current methods used by Courts for selecting jurors from a jury pool.

18 Claims, 4 Drawing Sheets

(56) References Cited

OTHER PUBLICATIONS

Hurney, Thomas J. et al., Picking Juries: Questionaires and Beyond Defense Counsel Journal, vol. 75, No. 4, Oct. 2008.*

JudicialSystems.com Web pages—Jury Management Solutions Judicial Systems, Inc., Apr. 2004, Retrieved from Archive.org Feb. 15, 2013.*

Domino, John C., Effectiveness of Computer Technology in Jury Selection and Management: The Impact of One Automated System, Judicial Systems, Inc., 2004.*

Handler, Lauren E. et al., Jury Selection: A Primer Porzio Bromberg & Newman P.C., Date Unkown.*

Lindquist, Weyman I. et al., The Litigation Manual—Jury Trials American Bar Association, 2008.*

Lowe, John C., Reinventing an Outdated Wheel: Innovations in Complex Litigation Virginia Journal of Lay and Technology, vol. 6, Fall 1997.*

Handford, Paula, Safeguarding Juror Privacy Judicature, vol. 85, No. 1, Jul.-Aug. 2001.*

Beaton Ronald F. et al., The Use of Juror Questionaires in Civil Cases in California CEB Civil Litigation Reporter, Mar. 1996.*

Services: Jury Selection, Voir Dire & Trial Monitoring Trial Behavior Consulting, Inc., Feb. 7, 2005, Retrieved from Archive.org Apr. 18, 2013.*

* cited by examiner

COMPUTER PROGRAM AND METHOD FOR JURY SELECTION

FIELD OF THE INVENTION

The invention pertains to computer software tailored to streamline jury selection methods that are currently used by Courts worldwide, and in particular state and federal courts of the United States. The invention is also an improvement upon the current methods used by Courts for selecting jurors form a jury pool.

SUMMARY OF THE INVENTION

The invention includes software facilitates a forum for questioning jurors outside of the courtroom via website and recording oral responses of jurors via telephone or interactive voice response unit. Thus, attorneys type their jury selection questions into a designated website. The typed questions are then audibly read to jurors when they dial the designated phone number. The juror responses are then recorded in a typed format. Attorneys are then allowed to view the juror responses through the website and print such responses.

The advantage of this method is that it conveniently and economically provides attorneys with significantly more information and insight into the mental impressions of jurors which ultimately helps lawyers make more informed juror selection decisions.

Basic Questioning Method of Jury Selection

Injury selection throughout all jurisdictions there are generally three types of ways jurors are questioned: 1) Lawyer Examination; 2) Judge Examination; and 3) a Hybrid system consisting of part lawyer examination and part judge examination. In lawyer examination of the jurors, lawyers conduct the entire voir dire examination. In judge examination, the judge conducts the entire voir dire examination. The lawyer's role is restricted to submitting requested questions to the judge and exercising challenges. The third method is a hybrid of the first two. The judge asks all preliminary questions of law and determines whether any prospective jurors have fixed attitudes or experiences in life that have slanted their outlook of the case. This is designed to identify jurors who may be challenged for cause. The lawyers are then permitted to ask additional questions so that they can intelligently exercise their peremptory challenges.

Also, among all jurisdictions there are generally two types of approaches when questioning jurors: 1) Open Approach; and 2) Restrictive Approach. The open approach permits far-ranging questions designed not only to cover jurors' backgrounds and experiences but also to sound out the jurors' receptivity or hostility to applicable law and to test jurors' reactions to the likely evidence they will hear and see later in the trial. Thus, in the open approach, jurors can be asked just about any kind of question. The restrictive approach does not permit questions to be asked of jurors pertaining to law or questions that test jurors' attitudes on legal and factual issues related to the case.

The invention is designed to accommodate all jurisdictions' different jury questioning systems and different jury questioning approaches. Therefore, before the basic selection process begins, the judge must set up the jury selection process. This set up of the process will be discussed in great detail below where the judge is obligated to fulfill many requirements for proper setup. However, among other things in this setup process, the judge is instructed to select the type of juror examination to be conducted that is most consistent with his jurisdiction's rules, and he will be presented with three interactive options: 1) Lawyer Examination; 2) Judge Examination; and 3) Hybrid Examination. If the judge selects Lawyer Examination, both attorneys and the court reporter will be instructed that the lawyers will present all of the questions along with the statutory jury selection questions before the lawyers are instructed to submit their questions. If the judge selects "Judge Examination" the lawyers and court reporter will be informed that the judge will ultimately decide what questions will be asked of the jurors on the questionnaire, and that lawyers are to submit their recommended questions to the judge. If the judge selects "Hybrid Examination" the lawyers will be instructed that the judge will only be allowed to ask questions pertaining to the law, and the lawyers will only be allowed to ask other types of questions that are within the scope of the designated approach.

The judge will also be instructed that he may select from any of these options and add to their general rules or amend their general rules by deleting words and adding words by using word processing functions. Thus, next to these generic rules will be a flashing cursor for the judge to add or delete words within these rules. Any changes the judge makes to these instructions will be made viewable and printable to the attorneys and the court reporter. Thus, the court reporter will be advised that she must print the original rule of the type of examination chosen by the judge and she must print any amendments to these rules made by the judge. Thus, any words or letters deleted by the judge will appear with strike through lines and any added words or letter or punctuation marks will appear in distinguishable bold face type to the court reporter when she prints the amended rules. The purpose of this is to easier identify any changes the judge made to these rules.

The judge will also be presented with a narrow rectangular box labeled "Enter Your Jurisdiction's Juror Examination Rules." The judge is instructed that if his jurisdiction's rules of questioning jurors substantially differ from any of the three options presented above in anyway he may type his jurisdiction's rules in this box. A scroll bar is affixed to the right to allow him to type his jurisdiction's rules as lengthy as needed. Thus, the instructions typed in this box will be submitted to the lawyers and court reporter just as the instructions in the top three options.

The judge then will be instructed that he must also select what kinds of questions are permitted to be asked of jurors. Thus, the judge will be presented with two options: 1) Open Approach; and 2) Restrictive Approach. These options will be interactive. If the judge selects open approach, the lawyers and court reporter will be instructed that they will be permitted to ask jurors far ranging questions that may pertain to evidence that may be presented in the case, questions about law and their backgrounds and experiences. If the judge selects the restrictive approach, the lawyers and court reporter will be instructed that they will not be allowed to ask jurors questions pertaining to the law and factual issues related to the case. Below this option will be a rectangular box labeled "Enter Additional Juror Question Rules."

The judge will also be instructed that he may select from any of these approach options and add to their general rules or amend their general rules by deleting words and adding words by using word processing functions. Thus, next to these generic approach instructions will be a flashing cursor for the judge to add or delete words within these rules. Any changes the judge makes to these instructions will be made viewable and printable to the attorneys and the court reporter. Thus, the court reporter will be advised that she must print the original rule of the type of examination chosen by the judge and she must print any amendments to these rules made by the judge.

Thus, any words or letters deleted by the judge will appear with strike through lines and any added words or letter or punctuation marks will appear in distinguishable bold face type to the court reporter when she prints the amended rules. The purpose of this is to easier identify any changes the judge made to these rules.

The judge will be instructed that if neither of the two different two approaches mentioned above cover his jurisdiction's or court rules in regards to the types of questions jurors are asked, he may enter them in the box. There is a scroll bar to the right that allows him to type the rules as lengthy as possible. Thus, the attorneys will be advised of the judge's approach rules in the box instead of the listed approach options.

The Judge also enters the number of jurors who are to respond to the questionnaire or the number of jurors to be included in the jury pool. The judge also enters the number of jurors to be empaneled and the number of alternate jurors to be selected. The judge also selects the jurisdiction.

The judge also enters the judicial deadlines for when the Plaintiff Attorney and the Defense Attorney are to submit their jury selection questions or their recommended questions to the judge. The judge has the option of setting both the Plaintiff Attorney's and the Defense Attorney's jury selection questions or recommendations at the same time or he may set the Plaintiff Attorney's deadline for submitting jury selection questions or recommended questions at an earlier date than the Defense Attorney's deadline. The advantage of having the Plaintiff Attorney submit his questions first is to allow the Defense Attorney to view such questions to prevent questions from being duplicated on the questionnaire. Setting different deadlines to prevent duplication may be beneficial if the judge selected "Lawyer Examination" where the lawyers are allowed to ask all the questions. However, if the judge selected "Judge Examination" he may wish to have the deadlines of both the Plaintiff Attorney and the Defense Attorney for submitting questions be at the same time since the judge ultimately picks which questions will be on the questionnaire and since it is much quicker than waiting for an additional second deadline to pass.

If the judge elects to have both lawyers submit their jury selection questions on the same date, he will only enter one date for both attorneys. If he elects to have the Plaintiff Attorney submit his jury selection questions at an earlier date than that of the Defense Attorney he will need to set two deadlines with the Plaintiff Attorney's deadline being earlier than that of the Defense Attorney.

If the Judge has set the Plaintiff Attorney's deadline to be at an earlier date than that of the Defense Attorney, only the Plaintiff Attorney is sent an email message to his/her personal email account instructing him/her to log onto the website, type his/her jury selection questions, and submit them to the Judge, Defense Attorney, and Court Reporter. Only after the Plaintiff Attorney has submitted his questions, will the Defense Attorney be notified with an email message instructing him to log onto the website, review the Plaintiff Attorney questions and statutory juror qualification questions, and enter his own non-duplicative questions. However, if the judge has set the Plaintiff Attorney's deadline and the Defense Attorney's deadline at the same time, both the Plaintiff Attorney and the Defense Attorney will be notified with email messages to their personal email accounts instructing them to log onto the website and type their jury selection questions, and submit them to the Judge, opposing counsel, and court reporter.

Many jurisdictions have certain statutory questions that must be responded to by jurors before they are questioned in court by lawyers. Such questions are used to determine if each juror is qualified to be a juror. For example, jurors are often asked if they are a United States citizen and if they are a resident of the county where jury selection is to take place. When both attorneys logs onto the website to submit their jury selection questions, the statutory juror qualification questions of their respective jurisdiction will appear. If the Defense Attorney's deadline was set on a later date, then the juror statutory qualification questions will appear with the Plaintiff Attorney's questions directly below them when he is sent an email to log on and submit his jury selection questions.

Also, when both attorneys log onto the website they will be instructed of the type of juror examination that will be conducted through use of the invention. Thus, if the Judge selected "Lawyer Examination," the Attorneys will be instructed that they will create the questionnaire with only their questions unless the judge added any additional instructions. If the judge selected "Judge Examination," the Attorneys will be instructed that only the judge will decide what questions will be placed on the questionnaire, and any additional rules or amendments to these generic rules the judge submitted. Thus, the Attorneys will be advised that the jury selection questions they submit will be mere recommendations and that the judge can choose and/or modify any questions they submit or he can choose not to select any questions from either the Plaintiff Attorney or Defense Attorney or both. If the judge selected the "Hybrid Examination," the Attorneys will be advised that the Judge will ask all questions pertaining to the law and the Attorneys will only be permitted to ask any other questions. Also, any additional rules that the judge added with this option will also be included. If the judge did not select any of the examination options the rules he typed will appear to the Attorneys. If the judge selected the open approach of questioning the Attorneys will then be advised that they can virtually ask any questions including questions pertaining to the law and factual issues and the jurors' backgrounds. Also, any additional rules or amendments made to these generic rules the judge included with this open approach will be included directly below the last general instruction of the open approach. If the judge selected the restricted approach, the Attorneys will be instructed that they will not be allowed to ask questions pertaining to the law or factual issues pertaining to the case. Also, any additional rules or amendments to the generic rules the judge typed will appear.

If the Plaintiff Attorney's deadline was set at an earlier date than that of the Defense Attorney, the Plaintiff Attorney will be instructed to enter his/her jury selection questions below the last appearing statutory question, and the Defense Attorney will be instructed to enter his jury selection questions below the last appearing Plaintiff Attorney question. If both Attorneys deadlines were set at the same time than they both will be instructed to enter their jury selection questions below the last appearing statutory juror qualification question.

Thus, both the Plaintiff Attorney and the Defense Attorney type their jury selection questions through the website and they are both advised of the instructions of the jury examination process selected and/or any additional rules and/or amendments to the generic rules and advised of the type of questions that may be asked of the jurors. When either Attorney finishes typing in his questions, he is instructed to check his spelling, punctuation, and grammar with the "Spelling/Punctuation/Grammar" option within the bottom margin of the screen. Thus, both Attorneys are advised that their questions will be read to the jurors through an automated voice.

For the automated voice to read their questions correctly to the jurors, they must use proper spelling, punctuation, and grammar.

When either Attorney has completed entering their questions and have checked them for spelling, punctuation, and grammar, they are advised to have the automated voice read their questions back to them by selecting the "Read Back Questions" option. Once this option is selected, the software will read the typed questions of the attorney back to him in the computer generated voice format that will speak the questions to the jurors. The purpose of this option is to provide assurance to the attorney that his questions will be properly read to the jurors if the questions will be audibly read to the jurors and the jurors are instructed to respond orally to the questionnaire. Thus, if the automated voice does not read an attorney's question back to him in a fashion consistent with his intent, he will be advised to change his question so it does conform with his intention and is read properly.

This "Read Back Questions" option is equipped with features that allow attorneys to simply read back all of their questions in the numerical order that they were typed, or the attorney can select only specific questions to be read back to him by highlighting the question(s) and then selecting read back. Additionally, there are small square boxes to the left of each numbered questions each attorney enters as well as the statutory jury selection questions. By clicking in the box, a check mark will appear. When the "Read Back Questions" option is selected, it will only read back the questions that were check marked. If no boxes are check marked and no questions are highlighted, and the attorney select the "Read Back Questions" option, the software will begin reading back all of the questions starting with the juror statutory questions, followed by the Plaintiff Attorney's questions, and followed by the Defense Attorney's questions.

If the either attorney does not submit his/her jury selection questions by the judicial deadline, the Judge is immediately sent an email message to his personal email address and is instructed that he may reject the attorney's questions and prevent the attorney from being allowed to submit questions that are to be included in the questionnaire. Thus, if the Judge rejects after the deadline and before the attorney submits his questions, the attorney would be prevented from submitting such questions.

Also, if the judge set the Plaintiff Attorney's deadline at an earlier date than the Defense Attorney's deadline for the purpose of allowing the Defense Attorney to view the Plaintiff Attorney's questions to prevent questions from being duplicated, the judge would be presented with the option of extending the deadline for the defense attorney to submit his questions if any delay is caused by the Plaintiff Attorney's untimely submission of questions. If the Judge rejects the Plaintiff Attorney's questions, the Defense Attorney is then notified with an email message that he may submit his jury selection questions. Additionally, the Court Reporter is notified with an email message that she must log onto the website and print the court order rejecting the Plaintiff Attorney's questions, and the respective judicial deadline for the Plaintiff Attorney to submit his jury selection questions. Also, the Court Reporter is instructed to print, through the website, the email message sent to the Plaintiff Attorney notifying him that he may now submit his jury selection questions. Such email message will contain the email address of the Plaintiff Attorney and the date it was sent to the Plaintiff Attorney.

If the Judge does not log onto the website and reject the Plaintiff Attorney's jury selection questions, the Plaintiff Attorney is still allowed to submit his/her questions. When the Plaintiff Attorney Submits his/her questions after the deadline, the Judge is immediately sent another email message to his/her personal email address notifying him/her that the plaintiff attorney has submitted his/her questions and that the Judge may view the questions and compare the date such questions were submitted with its respective deadline and reject the questions from being included in the questionnaire or accept the questions. If the judge rejects, the questions are excluded from the questionnaire and the defense attorney is sent an email message instructing him/her to submit questions. The judge also is presented with the option of setting a new deadline for the Defense Attorney to submit his/her questions do to the delay caused by the Plaintiff Attorney. Additionally, the Court Reporter is instructed via email to print, through the website, the Plaintiff Attorney's submitted questions even though they were rejected by the judge, the date such questions were submitted and respective judicial deadline, as well as a court order that the questions were rejected and not submitted to the jurors for responses. Also, the Court Reporter is instructed to print, through the website, the email message sent to the Plaintiff Attorney notifying him that he may now submit his jury selection questions. Such email message will contain the email address of the Plaintiff Attorney and the date it was sent to the Plaintiff Attorney.

If the Judge accepts the questions, the Plaintiff Attorney's questions will remain in the questionnaire or remain to be recommendations to the judge, and the Defense Attorney is instructed to submit his/her questions via email message. Additionally, the judge is presented with the option of extending the Defense Attorney's deadline for submitting his/her jury selection questions due to the delay caused by the Plaintiff Attorney. Additionally, the Court Reporter is notified via email message to print the Plaintiff Attorney's questions, date questions were submitted as well as the respective judicial deadline. Also, the Court Reporter is instructed to print, through the website, the email message sent to the Plaintiff Attorney notifying him that he may now submit his jury selection questions. Such email message will contain the email address of the Plaintiff Attorney and the date it was sent to the Plaintiff Attorney.

If the Plaintiff Attorney submits his/her jury selection questions within the respective judicial deadline, the Defense Attorney is automatically notified with an email message that he/she may submit his/her jury selection questions. Also, the Judge is sent an email message notifying him that he may now view the Plaintiff Attorney's jury selection questions. Additionally, the Court Reporter is sent an email message notifying him/her that he/she must now print the Plaintiff Attorney's jury selection questions, submission date of questions, and the judicial deadline for transcript/appeal purposes. Also, the Court Reporter is instructed to print, through the website, the email message sent to the Plaintiff Attorney notifying him that he may now submit his jury selection questions. Such email message will contain the email address of the Plaintiff Attorney and the date it was sent to the Plaintiff Attorney.

Once the Defense Attorney receives an email message to his/her personal email account instructing him/her to submit his jury selection questions, the Defense Attorney will be allowed to do so. If the Plaintiff Attorney's jury selection questions were rejected by the Judge, only the statutory questions mentioned above will appear before the Defense Attorney enters his/her questions. Thus, the Defense Attorney will be instructed to enter his/her jury selection questions directly below the last appearing statutory question. If the Plaintiff Attorney's questions were accepted, the statutory questions will appear with the Plaintiff Attorney's jury selection questions appearing directly below it. Thus, the Defense Attorney will be instructed to enter his/her jury selection questions directly below the last appearing Plaintiff Attorney question. Additionally, the Defense Attorney is instructed to review the statutory questions as well as the Plaintiff Attorney's questions before submitting jury selection questions and is instructed to not duplicate any of the questions. Thus, the reason the Plaintiff Attorney's deadline is at an earlier date than that of the Defense Attorney is to prevent the duplication of questions on the questionnaire that is to be responded to by the jurors. Additionally, in traditional jury selection, the Plaintiff Attorney commonly asks questions before the Defense Attorney.

If the Defense Attorney submits his/her questions within the judicial deadline, the Judge and Plaintiff Attorney are both notified with an email message that they may view the Defense Attorney's questions. Additionally, the Judge is notified that he may view and make edits and/or selections of the attorney submitted questions or the recommendations depending on what kind of examination is to take place and then submit the completed attorney questionnaire to the Jurors for their responses. Additionally, the Court Reporter is notified with an email message to his/her personal email account that he/she must print, through the website, the Defense Attorney's jury selection questions, the date the Defense Attorney submitted his/her questions, and the judicial deadline the Defense Attorney was to have submitted the questions. Also, the Court Reporter is instructed to print, through the website, the email message sent to the Defense Attorney notifying him that he may now submit his jury selection questions. Such email message will contain the email address of the Defense Attorney and the date it was sent to the Defense Attorney.

If the judicial deadline for the Defense Attorney passes and the Defense attorney has not submitted his/her questions, the Judge is notified with an email message that he/she may reject the Defense Attorney's questions. If the Judge rejects the Defense Attorney's questions after the deadline and before he submits them, the Defense Attorney is prevented from submitting questions through the website. Both the Plaintiff Attorney and Defense Attorney are notified with an email message that the Defense Attorney's questions were rejected and will not be submitted to the jurors for responses or be considered by the judge as recommendations. Additionally, the Court Reporter is notified with an email message to print the Court Order rejecting the Defense Attorney's questions, the date the Court Order was submitted, and the respective judicial deadline for transcript/appeal purposes. Also, the Court Reporter is instructed to print, through the website, the email message sent to the Defense Attorney notifying him that he may now submit his jury selection questions. Such email message will contain the email address of the Defense Attorney and the date it was sent to the Defense Attorney. The judge will also have the option of extending the deadline for when jurors may respond due to any delay caused. Also, if the judge allowed attorneys to object to each others questions then he will have the option of extending the deadlines for opposing counsel and/or the Defense Attorney.

If the Judge does not exercise the option to reject, the Defense Attorney may still submit his/her questions. If the Defense Attorney does submit his/her questions after the judicial deadline, the Judge is immediately sent another email message informing him/her that he/she may reject the questions or accept the questions. If the judge rejects, the Defense Attorney's questions will not be submitted to the jurors for responses. The Plaintiff Attorney and the Defense Attorney would be notified with an email message that the Defense Attorney's questions would not be submitted to the jurors or be considered as recommendations to the judge, and the Court Reporter would be notified with an email message that he/she must print the Defense Attorney questions, the submission date of the questions, the respective judicial deadline, and the Court Order rejecting the questions and withdrawing them from the questionnaire. Also, the Court Reporter is instructed to print, through the website, the email message sent to the Defense Attorney notifying him that he may now submit his jury selection questions. Such email message will contain the email address of the Defense Attorney and the date it was sent to the Defense Attorney.

If the judge accepts the Defense Attorney's questions, the Judge will be instructed by email that he/she may now submit the juror questions to the jurors for their responses if he selected "Lawyer Examination." If the judge selected "Judge Examination" he will be instructed by email that he may now choose from each attorneys' recommended questions and create the questionnaire and then submit it to the jurors. If the judge selected "Hybrid Examination," he will be instructed by email that he must now enter any questions of law he would like to have asked of the jurors and choose the questions from the lawyers that do not pertain to the law and are within the selected scope of questions which would be either the open approach or the restrictive approach. The Plaintiff Attorney will be sent an email message notifying him/her that he/she may now view and print the Defense Attorney's questions and the date the Defense Attorney submitted the questions as well as the respective judicial deadline. The Court reporter will be notified with an email message that he/she must now print the Defense Attorney's questions, the date the questions were submitted, and the respective Deadline. Also, the Court Reporter is instructed to print, through the website, the email message sent to the Defense Attorney notifying him that he may now submit his jury selection questions. Such email message will contain the email address of the Defense Attorney and the date it was sent to the Defense Attorney.

If the judge set the deadlines for both the Plaintiff Attorney and the Defense Attorney to submit their questions at the same time, and either one of them does not submit their questions within the deadline, the judge may reject before the attorney submits his questions and after the deadline which would prevent the attorney from submitting his questions. Both attorneys would be notified of the attorney whose questions were rejected, and the court reporter would be instructed to print this order of rejection and the email message sent to this attorney notifying him that he may submit his questions. Thus, the judge would not be presented with any option of extending the other attorney's deadline for not submitting because the other attorney's question submissions are not dependent on the other attorney's questions to prevent duplication. However, the judge would be provided with the option of extending the deadline for attorneys to submit their objections to their counterpart's questions if the judge has allowed attorneys the option of objecting to questions. Conversely, if the judge has not allowed attorneys to submit objections, than the judge will have the option of extending the deadline for when jurors may respond. Thus, when the both the Plaintiff Attorney and the Defense Attorney are given the same deadline to submit their questions, each will be instructed to enter their questions after the juror statutory qualification questions and they will each be instructed to review the juror statutory qualification questions to prevent duplication of them.

After the judge has accepted or rejected each attorney's questions, the judge will be instructed by email that he may now log onto the website and review the questions accepted from the attorneys. Regardless of which type of examination the judge selected whether it be Lawyer Examination, Judge Examination, or Hybrid Examination, the judge will be shown the juror statutory qualification questions of his respective jurisdiction followed by the accepted Plaintiff Attorney questions followed by the accepted Defense Attorney questions. All three types of questions will be presented in one combined numerical order in their respective parts. The judge will be able to view all such questions on the same screen with a scroll bar affixed to the right of the screen. To the left of every respective question will be a small square box. The judge will be instructed that if he wishes to delete a question he may do so by clicking his cursor in the square box to the left of the question and a check mark will appear in the box. After the check mark appears, the judge selects the delete button in the top margin of the screen. The judge also will be able to delete or edit any question with traditional word processing keys. The judge also will be instructed that he may add a question of his own in between any questions or at the top or bottom of the questionnaire by using traditional word processing keys. Thus, the judge will be instructed that for every new question he adds, all questions will be automatically renumbered so they appear in chronological order. Likewise, if the judge deletes any questions all remaining questions will automatically renumbered to proper sequential order. The judge will also be instructed that every question originally placed on the questionnaire will be printed by the court reporter for transcript appeal purposes immediately after attorneys have submitted them. Also the judge will be instructed that any questions or words he deletes from these original questions will be shown with strike through lines, and any new questions or letters or words entered by the judge will appear in bold type. Thus, such visible edits of bold letters and strike through lines will be printed by the court reporter when the judge finishes his edits and submits the questionnaire to the jurors for response. However, when the judge submits the questions to the jurors after making any edits none of the edits will appear to the jurors if they answer the questionnaire through the website or receive the questionnaire via U.S. Mail or email. Additionally, the automated voice will not read any deleted questions or deleted words in questions to the jurors if the jurors are ordered to respond by phone.

If the judge selected "Lawyer Examination," the judge will be instructed, through the website, that since the jurors will be questioned through "Lawyer Examination," the judge should only allow the attorney questions and the juror statutory qualification questions remain on the questionnaire. Thus, the judge will be advised against submitting any of his own questions. The judge will also be instructed of any other instructions he added to these general rules of lawyer examination. Thus, any questions the judge enters or any questions he deletes or any modifications he makes to the questions will be conspicuously shown with either bold type or strike through lines, and the court reporter will print this conspicuously edited questionnaire for transcript/appeal purposes. Thus, after the judge submits the questionnaire to the jurors, both lawyers will be notified with an email message that they may now view the questionnaire. They will be notified in this message that if the judge made any changes to the questions any deleted letter, words, or questions will appear to the lawyers with conspicuous strike through lines and any letters, punctuation marks, words, and questions added will appear in bold. Thus, the lawyers will be advised that they may log on to the website and view any changes that may have been made.

If the judge selected "Lawyer Examination" with "Open Approach," the judge will be generally instructed that the lawyers should be permitted to ask far-ranging questions designed not only to cover jurors' backgrounds and experiences but also to sound out the jurors' receptivity or hostility to applicable law and to test jurors' reaction to the likely evidence they will hear and see later in the trial and ask jurors about the law and legal principles. Plus, the judge will be provided any additional instructions or amendments to this general instruction he added to this open approach method in the set up phase. Thus, any edits or deletions or new questions added by the judge to the questionnaire will be conspicuously shown with strike through lines and bold face type and printed by the court reporter and lawyers will be sent email messages instructing them that they may log onto the website and view any changes which will be conspicuously shown with strike through lines and bold face type.

If the judge selected "Lawyer Examination" with "Restrictive Approach," the judge will be instructed that he should review each of the attorney's questions and delete any questions about the law or questions that test jurors' attitudes on legal and factual issues related to the case. The judge will also be advised of any additional instructions he added to this restrictive approach or any amendments he made to these general instructions of the general approach. The judge also will be instructed that any edits or deletions or new questions he adds to the questionnaire will be conspicuously shown with strike through lines and bold face type and printed by the court reporter and lawyers will be sent email messages instructing them that they may log onto the website and view any changes which will be conspicuously shown with strike through lines and bold face type.

If the judge selected "Judge Examination," the judge will be instructed, through the website, that since the jurors will be questioned through "Judge Examination," the judge should only decide which questions should remain on the questionnaire. Thus, the judge will be advised that he has the task of making the questionnaire either through entering his own questions or selecting from the attorney recommended questions and statutory juror qualification questions of his respective jurisdiction or editing any attorney recommended questions. The judge will also be instructed of any other instructions he added to these general rules of judge examination or any amendments he made to these general instructions. Thus, any questions the judge enters or any questions he deletes or any modifications he makes to the questions will be conspicuously shown with either bold type or strike through lines, and the court reporter will print this conspicuously edited questionnaire for transcript/appeal purposes and lawyers will be sent email messages instructing them that they may log onto the website and view any changes which will be conspicuously shown with strike through lines and bold face type.

If the judge selects "Judge Examination" the lawyers and court reporter will be informed that the judge will ultimately decide what questions will be asked of the jurors on the questionnaire, and that lawyers are to submit their recommended questions to the judge that are within the respective question approach the judge selected whether it be open approach, restrictive approach, or the rules entered by the judge. Also, any additional instructions or amendments made to the general instructions the judge added to the basic rules of Judge Examination will be included and presented to the attorneys and court reporter.

If the judge selected "Judge Examination" with "Open Approach," the judge will be generally instructed that only he will be permitted to ask far-ranging questions designed not only to cover jurors' backgrounds and experiences but also to sound out the jurors' receptivity or hostility to applicable law and to test jurors' reaction to the likely evidence they will hear and see later in the trial. The judge will also be instructed that he may select from any attorney questions that are far-ranging and make any edits to these attorney recommended questions. The judge will also be instructed of any other additional rules he added or amendments to the general rules of judge examination. Plus, the judge will be provided any additional instructions or amendments he made or added to this open approach method and/or the judge examination rules. Thus, any edits or deletions or new questions added by the judge to the questionnaire will be conspicuously shown with strike through lines and bold face type and printed by the court reporter and lawyers will be sent email messages instructing them that they may log onto the website and view any changes which will be conspicuously shown with strike through lines and bold face type.

If the judge selected "Judge Examination" with "Restrictive Approach," the judge will be instructed that only he will be allowed to formulate the questionnaire and that he should not type any questions about the law or questions that test jurors' attitudes on legal and factual issues related to the case. The judge will also be instructed that through "Judge Examination" he may select or refuse to select any attorney questions. However, he will be advised against selecting any questions the attorney's have recommended that pertain to the law or test jurors' attitudes on legal and factual issues related to the case. The judge will also be advised of any additional instructions and/or amendments he made or added to this restrictive approach. The judge also will be instructed that any edits or deletions or new questions he adds to the questionnaire will be conspicuously shown with strike through lines and bold face type and printed by the court reporter and lawyers will be sent email messages instructing them that they may log onto the website and view any changes which will be conspicuously shown with strike through lines and bold face type.

If the judge selected "Hybrid Examination" with "Open Approach," the judge will be generally instructed that only he may now enter any questions of law he would like to have asked of the jurors and he must include the questions from the lawyers that do, not pertain to the law and are within the open approach scope in that such questions may be far-ranging and designed not only to cover jurors' backgrounds and experiences. Plus, the judge will be provided any additional instructions he added to this open approach method or any amendments he made to the general rules of the open approach. Thus, any edits or deletions or new questions added by the judge to the questionnaire will be conspicuously shown with strike through lines and bold face type and printed by the court reporter and lawyers will be sent email messages instructing them that they may log onto the website and view any changes which will be conspicuously shown with strike through lines and bold face type.

If the judge selected "Hybrid Examination" with "Restrictive Approach," the judge will be generally instructed that only he must now enter any questions of law that do not test jurors' attitudes on legal and factual issues related to the case. The Judge will also be instructed that he must include the questions from the lawyers that do not pertain to the law and are within the restrictive approach scope in that such questions do not test jurors' attitudes on legal and factual issues related to the case. Plus, the judge will be provided any additional instructions he added to this restrictive approach method and/or any amendments he made to the general rules of the restrictive approach. Thus, any edits or deletions or new questions added by the judge to the questionnaire will be conspicuously shown with strike through lines and bold face type and printed by the court reporter and lawyers will be sent email messages instructing them that they may log onto the website and view any changes which will be conspicuously shown with strike through lines and bold face type.

Regardless of the type of examination selected, once the questionnaire has bee completely formulated, the judge is instructed to submit the questionnaire to the jurors for their responses. Thus, the judge simply selects the option labeled "Submit Questionnaire to Jurors." If the Judge does not select submit jurors, the jurors will not be able to respond to the questionnaire.

When the judge submits questions to the jurors for responses, the Court Reporter will be notified with an email message to print the judge's edited questionnaire and the attorneys will be sent an email message that they may now log onto the website and view the judge's edits.

Also, when the Judge submits the questions to the jurors for responses, the Court Administrator assigned to the case will be sent an email message notifying him/her that he/she must now mail certain necessary juror information and a password to each juror called for juror duty. The information and password will instruct each juror on how to properly respond to the questionnaire. Included in this mailing will be an advisement to the jurors that the answering of this questionnaire is a critical part of their jury duty. Failure to respond to this questionnaire will be deemed a refusal or failure of their duty and could subject them to criminal penalty under the law.

The invention can audibly read the jury selection questions to each juror and record each juror's oral responses through the use of a personal telephone or some other type of interactive voice response unit. Thus, a courthouse can have juror's respond to the questions without ever appearing in court via their telephone. Additionally, the jurors can respond to the questions at anytime day or night 24 hours a day so the jurors would not have to take off work. Also, since attorneys can ask as many questions as they desire, the questionnaires produced could be quite lengthy. Thus, the jurors would not have to respond to all of the questions at once through one phone call. The jurors can stop answering at anytime. The software will record every response and only read questions that were not responded to by the juror when the juror calls to answer more questions. The jurors can call as many times as needed until they have responded to every question. Jurors simply have to make sure they finish responding by the respective judicial deadline. Also, when jurors call the designated number to answer the questionnaire, they are advised of how many questions are on the questionnaire each time they call to answer question.

To prevent fraud or some unauthorized person from answering the questionnaire in place of an authorized juror, the software audibly instructs each person who attempts to respond to the questionnaire that they will be subject to criminal penalty if they are not authorized to answer the questionnaire. Additionally, they will be instructed that their voiced oral responses will be recorded and subject to comparison to the voice of the respective juror authorized to answer the questionnaire for the purpose of detecting fraud. Thus, the software does record each juror's voiced responses. Thus, the judge, plaintiff attorney, and defense attorney are allowed to listen to the voiced juror responses in their respective programs through the website.

Furthermore, to prevent fraud, each juror is provided with a confidential password that they must enter over the phone to respond to the questionnaire. 1. If a juror does not have access to a telephone, the courthouse will have a designated phone(s) for jurors to respond to the questionnaire.

If a juror does not speak English, the Juror is instructed in the letter containing the Juror's password to contact the appropriate court administrator notifying him/her of this problem. If the juror calls the appropriate number to answer the questionnaire, the software audibly instructs the juror to select English or Spanish. If the Juror selects English, an instruction will follow that if the juror does not speak English, the juror must not respond and hang up the phone, and then contact the appropriate court administrator. After this instruction, the software will continue to audibly read the rest of the instructions and questions.

If the Juror selects Spanish, the software will audibly read the instruction to the Juror in Spanish that the Juror should not respond to the questionnaire and should contact the appropriate court administrator. The software will then instruct the juror that the rest of the instructions and questionnaire will be audibly read to the jurors in English and the questionnaire will only be read to the Juror in English and not Spanish. Thus, the Juror will be instructed in Spanish that he/she may quit the administration of the questionnaire by simply hanging up the phone.

Jurors are instructed not to answer their questions within the presence of other jurors, or attorneys. One objective of the invention is to prevent jurors from conforming their responses with other jurors or having their responses influenced by the Attorneys involved in the case. Ultimately, such a way of responding will provide attorneys with more credible juror responses. Thus, a main advantage of the invention is that it prevents conformity of answers.

Before the juror is allowed to respond to the questionnaire, the software audibly administers an oath to each juror that they are indeed a person authorized to answer the questionnaire and that they will answer each and every question on the questionnaire truthfully and answer the questions out of the presence of all other jurors and attorneys and any other influential person under penalty and perjury of the law. The jurors will once again be advised that their voiced responses to this oath will be recorded to detect fraud and that the Judge, Plaintiff Attorney, and Defense Attorney will be allowed to listen to their responses oath for the detection of fraud.

If a courthouse or jurisdiction does not feel comfortable with Jurors responding to the questionnaire without physically appearing or checking in with court administrators and showing proper identification, a courthouse could install telephones or some other type of interactive voice response units compatible with this software in the courthouse or some other location where court administrators can physically view the jurors and their identifications. Thus, the courthouse or location would have to ensure that the jurors respond to the questions in private without any other jurors or court administrators being allowed to hear the responses. The reason for this requirement is so jurors will not be allowed to conform their responses with those of other jurors or attorneys or any other influential person. Thus, the courthouse or designed location could set up sound proof booths to accomplish this objective.

When Jurors orally respond to the questions that are audibly read to them over the telephone or interactive voice response unit, the software records their oral responses in audio format, and records their responses in a typed format below their respective questions which are also in typed format. Additionally, the software records the voice responses of each juror to allow the Judge and Attorneys to hear the sincerity and tone of voice of the jurors to assist them in making jury selections and to check for fraud or ensure that only authorized Jurors have answered the questionnaire.

Once the judicial deadline for jurors to respond to the questionnaire has passed, the Judge is sent an email message notifying him/her that he/she must log onto the website, view and listen to the juror responses, ensure that all Jurors ordered to respond to the questionnaire completed it, and ensure that no profane language was used. The Judge then makes the questionnaires accessible to the Attorneys and Court Reporter for viewing, listening, and printing. When the Judge logs onto the website to view the juror responses, he/she is shown an interactive list of all the juror names who were ordered to respond to the questionnaire. Small yellow cautionary flags will appear next to the names of jurors who did not complete the questionnaire to its entirety, or they will appear next to the names of jurors whose questionnaires contain foul language. To view a Juror's questionnaire, the Judge simply clicks the cursor on the name of the Juror the Judge wishes to view. Thus, each name on the list is interactive in that by clicking the cursor on any name that Juror's respective questionnaire responses will appear in a typed format on the screen. If the judge wishes to listen to the voice responses of the jurors, he may do so on the same screen that the typed questionnaire and responses appear. Thus, he simply selects "Listen to Juror's Voice Responses" in the bottom margin of the screen.

The Judge is instructed to particularly view the Juror questionnaires that have a yellow flag next to the names. When the Judge clicks on a name with a yellow flag, the Jurors questionnaire and any responses will appear. Any questions that were not answered by the respective Juror will appear in highlighted text. Additionally, any profane or foul words in a juror response will appear in highlighted text.

If any Jurors have not completed the questionnaire within the judicial deadline, the Judge is instructed that he/she may contact the Jurors and order them to finish answering the questionnaire. Once these Jurors finish responding, the Judge is instructed to submit the Juror responses to the Attorneys and Court Reporter for viewing and printing.

If any Jurors answer questions with foul or profane language, the Judge is instructed that he/she could order these Jurors to retake the questionnaire answering appropriately. Thus, upon such an order, these Jurors could be administered another questionnaire via telephone or an interactive voice response unit and ordered to take the questionnaire within the presence of a Court Administrator or the Judge. Once they have completed the questionnaire, the Judge is instructed to submit all Juror questionnaires to the Attorneys and Court Reporter for viewing and printing. Additionally, the Court Reporter is ordered to print the deadline the jurors were to have responded to the questionnaire as well as the original responses of each jurors, and any additional responses of jurors. However, the Court Reporter will not be allowed to print the original responses of jurors until the judge has submitted all juror questionnaires to the attorneys. The purpose of this is to prevent attorneys from viewing the original responses that may not have been completed or finished.

In all, if any Jurors do not complete the questionnaire or if any jurors use profane or foul language, the Judge could simply not resort to any remedial measures and submit all juror questionnaires to the Attorneys and Court Reporters for viewing and printing.

Once the Judge elects to submit the Juror Responses to the Attorneys and Court Reporter for viewing and printing, email messages are sent to the Attorneys and Court Reporter that they may now view and print the Juror questionnaire responses through the website. Thus, the Juror questionnaire responses would be made accessible to the Attorneys and Court Reporter through their respective programs in the website. Thus, the Court Reporter is instructed to print each juror's respective questionnaire responses and their respective judicial deadline.

When attorneys log onto the website to view the questionnaire responses of the jurors, the questions will initially appear in black text, and the juror responses will initially appear in green text. The reason the responses initially appear in green is to make the responses easier to view for the attorneys. Thus, when attorneys view these questionnaire responses through the website, they will have a font color/size option that will allow them to change the font color and size of the questions and responses. Thus, attorneys can make the questions a different size and color than the responses and vice versa.

The attorneys may also listen to the juror's voice responses on the same screen they view the jurors typed questionnaire by selecting the option "Listen to Juror's Voice Responses" in the bottom margin of the screen. Thus, when this option is selected, the automated voice of the invention begins audibly reading the oath that was administered to the particular juror, and the juror's voiced oath is then heard. The automated voice then audibly reads each question followed by the juror's actual voice response to each question. When attorneys or the judges select this option, a play button, fast forward button, rewind button, and close button will appear to allow the judge or attorney to listen to the whole questionnaire or skip to certain parts. Additionally, each typed and numbered question will have a small square box to the left of it. When attorneys or judges click in the small square box, a check mark will appear. When the attorneys select the Listen to Juror's Voice Responses option, the software will only audibly read the check marked questions and respective responses of the jurors instead of all questions and responses and the oath.

Options of Inventive Jury Selection Method

The invention has several options to meet any jury selection objective. Thus, not only can The invention be used as a tool to gather more information and insight into the mental impressions of jurors before the lawyers question them in court, but it can also allow lawyers to view the jurors and/or make actual juror selections with challenges for cause and/or peremptory challenges. Additionally, the invention is equipped with optional features that can prevent jurors from being excluded with a challenge for cause and/or peremptory challenge based on their race or gender. Ultimately, before the invention process begins, the Judge must decide which of the optional features described below he/she wishes to incorporate.

1. Exercise Challenges for Cause WITH Listening and/or Viewing Juror Responses

This option allows lawyers to strike jurors from the venire with challenges for cause based on the juror questionnaire responses in a typed format and their actual voice responses through the website. If the judge selects the option of viewing the jurors respond which is described below, then the attorneys may also exercise their challenges for cause based on the physical appearances of the jurors as well as the voice responses and typed responses. If the judge selects this option, he/she sets the number of challenges for cause each lawyer may exercise. The judge may either type in a limited number of challenges for cause or he may allow lawyers to exercise an unlimited number of challenges for cause by simply selecting "unlimited." The judge is instructed that he should allow each lawyer equal numbers of challenges for cause, or allow both lawyers an unlimited number of challenges for cause.

The judge must also select the number of jurors out of the jury pool that will be eligible for exclusion with the attorney challenges for cause. Thus, only this selected number of jurors from the jury pool will have their questionnaires made viewable by the attorneys for challenge for cause exercises. The remaining jurors not included in this number will not have their questionnaires made viewable to the judge or attorneys. They will have their questionnaires put on a stand by basis or a reserve basis. Thus, if too many jurors are excluded with challenges for cause where there are not enough jurors to impanel a jury or allow attorneys to exercise all of their peremptory challenges if such challenges are an option, then the judge may select from these remaining jurors until enough jurors remain. Or, if the judge elects to have each juror excluded with a challenge for cause replaced with a new juror questionnaire, the software will automatically replace the juror with a new juror questionnaire from the jury pool. Thus, when the judge enters this number, the software automatically selects a list of jurors up to that number.

The first jurors to answer up to that number are selected. For example, if the judge sets the jury pool at 200 and the judge sets the number of jurors eligible to be excluded at 150, the software automatically makes a viewable list of the first 150 jurors to respond to the questionnaire. Thus, the list is interactive, by clicking on a juror name or anonymous number, the juror's respective questionnaire responses appear in full on the screen with several features described below. The judge also has the option of making every juror in the pool be eligible for exclusion with a challenge for cause by simply typing in the exact number of jurors in the pool into the box designated for jurors eligible for challenges for cause exclusion. The purpose of this feature is to accommodate and replicate the jury selection rules of any jurisdiction. Thus, jurisdictions that exercise the "Panel System" of jury selection may only want to have 12 to 20 juror questionnaires eligible for exclusion for challenges for cause out of the entire jury pool Thus, in the "Panel Method" of conventional jury selection, lawyers are only allowed to question the jurors in the panel and the limited number of extra jurors chosen as alternates. The remaining jurors in the pool are not questioned unless they are selected to fill in for an excluded juror in the panel. Thus, jurisdictions that exercise the "Strike System" of jury selection may want to question as many jurors as possible since all challenges for cause and peremptory challenges are exercised before the jurors are impaneled.

Before the judge decides how many jurors shall be eligible for exclusion with a challenge for cause, he must first decide the number of jurors to be empaneled, and, secondly, he must decide whether or not he wishes to have the alternate jurors selected at the same time along with the jury panel or have the alternate jurors selected separately only after the jury has been empaneled.

If the judge elects to have the jury panel and the alternates selected at the same time, he will be advised that he needs to make the number of jurors eligible for exclusion with a challenge for cause to be big enough to encompass the number of jurors to be empaneled plus the number of alternates to be selected plus the limited or unlimited number of challenges for cause each attorney is allotted.

If the judge elects to have the alternate jurors selected separately and after the jury panel has been selected, then the judge must not only enter a number for jurors eligible for exclusion with a challenge for cause for the jury panel and the limited or unlimited number of challenges for cause each attorney is allowed to exercise in the selection of the jury panel, but he must also enter a separate number of jurors eligible for exclusion with a challenge for cause for the alternate jurors to be selected. The judge will be advised that he must take into account only the number of jurors to be selected as alternates and the limited or unlimited number of challenges for cause to be exercised on the potential jurors being selected for alternate juror positions. Thus, the judge must also enter a separate limited or unlimited number of challenges for cause each attorney will be allowed to exercise in the selection of the alternates only if the alternate juror selection is to be done in a separate process after the panel is selected.

Additionally, if alternate jurors are to be selected separately and after the jury panel is selected, the juror questionnaires making up the number of jurors eligible for exclusion with a challenge for cause for the selection of alternate jurors will be made up from the remaining juror questionnaires in the jury pool. Thus, no juror questionnaires making up the number of jurors eligible for exclusion with a challenge for cause for the selection of the panel will be included. Thus, the questionnaires for the alternates will come from the jury pool.

Also, if the judge elects to have the alternate juror positions selected in a separate process after the selection of the jury panel, the deadlines for all challenges for cause and any peremptory challenges and any *Batson* challenges allotted to attorneys for the selection of the jury panel must come to pass before attorneys may begin to exercise challenges for cause and/or any peremptory challenges allotted to attorneys for the selection of alternate jurors. Thus, the judge will be advised that the deadlines for all challenges for cause and any peremptory challenges for the selection of the jury panel must be set at earlier dates than the deadlines for any challenges for cause and/or peremptory challenges allowed for the selection of alternate jurors.

The method for exercising challenges for cause on alternate jurors selected separately and after the jury panel is selected is identical to the method for exercising challenges for cause on the alternate jurors. Thus, the lawyers will only be shown the number of juror questionnaires from the jury pool equal to the number of jurors eligible for exclusion with a challenge for cause for the selection of alternate jurors.

Furthermore, if the Judge selects this challenges for cause option, the Judge must also select whether or not he wants to allow attorneys to submit rebuttals to their counterpart's challenges for cause exercises. After the judge decides whether or not to allow attorneys to submit rebuttals, the judge must then decide the method of how the challenges for cause of each attorney will be exercised. The judge will be advised to set the deadlines for challenges for cause and/or rebuttals in one of two ways: 1) Simultaneous Exercise, where the judge sets the deadlines for both the Plaintiff Attorney and the Defense Attorney to submit their challenges for cause within the same deadline. Also, if the attorneys are allowed to submit rebuttals to their counterpart's challenges for cause, then the judge sets the deadlines for both the Plaintiff Attorney and the Defense Attorney to submit their rebuttals at the same time after they have exercised their challenges for cause. The advantage of the simultaneous exercise is that it is quicker. 2) Non-duplicative Exercise, where the judge sets the Plaintiff Attorney's deadline for exercising his challenges for cause at an earlier date than that of the Defense Attorney's deadline to exercise his challenges for cause. This will prevent duplication of challenges for cause because the Defense Attorney will have an opportunity to view the Plaintiff Attorney's challenges for cause. Also, if the attorneys are allowed to submit rebuttals to their counterpart's challenges for cause and the judge has selected the non-duplicative method, then the judge will have two ways in which he may set the deadlines for the attorneys to submit their rebuttals to their counterpart's challenges for cause: 1) Directly After Counterpart's Exercises of Challenges for Cause, where the Judge sets the Defense Attorney's deadline for rebuttals directly after the Plaintiff Attorney submits his challenges for cause. Thus, after the Plaintiff Attorney submits his challenges for cause and the Defense Attorney submits his rebuttals thereto the Defense Attorney then submits his challenges for cause and the Plaintiff Attorney then submits his rebuttals thereto. 2) Both Attorneys submit their rebuttals at the same time after each attorney has finished submitting their challenges for cause. The purpose of setting rebuttals at the same time for both attorneys is that it will make the rebuttal process quicker through the invention. Thus, since the lawyers will have no duplication problem when submitting rebuttals they may submit them at the same time. Submitting rebuttals at the same time will prevent the judge from having to set an additional deadline.

The judge will be advised against setting rebuttals at the same time for the non-duplicative method if he desires to have juror questionnaires excluded by challenges for cause replaced. Thus, if the judge elects to have juror questionnaires that are excluded by challenges for cause replaced the software will prevent him from selecting that attorneys submit their rebuttals at the same time combined with the non-duplicative method.

The judge must then select whether or not he wants jurors excluded with a challenge for cause to be replaced with new juror questionnaires from the jury pool. Thus, typically, in conventional jury selection, once a potential juror is excluded with a challenge for cause, that juror is replaced with a new juror from the jury pool. Thus, jurors struck with challenges for cause are continually replaced until both attorneys pass for cause. The lawyers then exercise their allotted number of peremptory challenges.

If the judge elects to have jurors replaced upon being struck with a challenge for cause, the software automatically randomly selects a new juror questionnaire from the jury pool for each juror struck with a challenge for cause.

More specifically, if the judge elects to have jurors replaced upon being struck with a challenge for cause and the judge elected to have the Plaintiff Attorney submit his challenges for cause at an earlier date than that of the Defense Attorney to prevent duplication of challenges for cause and the judge elected to allow attorneys to submit rebuttals, the judge must first set a deadline for when the Plaintiff Attorney is to have passed the jurors for cause and tender the potential jurors to the Defense Attorney for the exercise of challenges for cause. Such deadline must be after the jurors have answered the questionnaire and after the judge has reviewed the juror questionnaires and/or edited the questionnaires and submitted the questionnaires to the attorneys. The judge must then set a deadline for when the Defense Attorney is to have passed the jurors for cause and tender the jurors back to the Plaintiff Attorney for any additional exercises of challenges for cause. The judge must then enter the number of hours or day(s) each attorney is allowed to submit rebuttals after their counterpart submits challenges for cause. Thus, once an attorney submits challenges for cause, the software will send an email to his counterpart informing him of the exact month, day, year, and time of day the challenges for cause were submitted and it will inform the counterpart of his deadline to submit rebuttals by automatically adding the number of hours or day(s) attorneys have to submit rebuttals to the date and time the challenges were submitted. For example, if the Plaintiff Attorney submits challenges for cause on Mar. 5, 2005 at 5:00 p.m., and the judge allows each attorney 48 hours to submit rebuttals, the Defense Attorney will be notified by email that he must submit any rebuttals by Mar. 7, 2005 at 5:00 p.m.

Once the Plaintiff Attorney receives the email message that he may begin exercising challenges for cause, the Plaintiff Attorney will be shown all juror questionnaires making up the total number of jurors eligible for exclusion with challenges for cause. In the bottom margin of the Plaintiff Attorney's screen are two options labeled as follows: 1) "Exercise Challenges for Cause," and 2) Pass for Cause and Tender Jurors to Defense Attorney." If the Plaintiff Attorney exercises challenges for cause, he exercises challenges for cause in the exact same manner as mentioned below with all the same features as mentioned below. Once the Plaintiff Attorney submits his challenges for cause, the Defense Attorney is then sent an email message notifying him of the exact date and time he is allotted to submit rebuttals. As stated above, the software automatically calculates this rebuttal deadline by adding the number of hours or day(s) entered by the judge to the date and time the challenges for cause were submitted.

Once the Defense Attorney submits rebuttals, the judge is then sent an email message informing him to rule on the Plaintiff Attorney's challenges for cause and the Defense Attorney's rebuttals. If any of the Plaintiff Attorney's challenges for cause are granted, the software automatically replaces the juror questionnaires excluded with challenges for cause with new juror questionnaires from the jury pool. The Plaintiff Attorney is then notified with an email message notifying him that he may now exercise challenges for cause on the new juror questionnaires only or pass for cause and tender the jurors to the Defense Attorney. For example, if 3 of the first challenges for cause submitted by the Plaintiff Attorney was granted. The Plaintiff Attorney will only be allowed to submit challenges for cause on the 3 new juror questionnaires that he has not yet reviewed. If he exercises another challenge for cause on these three juror questionnaires and it is subsequently granted, the software will replace the juror questionnaire with a new juror questionnaire from the jury pool. The Plaintiff Attorney will be sent another email message stating that he may either exercise another challenge for cause on the new juror questionnaire or pass for cause and tender the jurors to the Defense Attorney.

Thus, for every juror questionnaire the Plaintiff Attorney replaces he will have a direct opportunity to exercise a challenge for cause on each new juror questionnaire. Once the Plaintiff Attorney is satisfied with all jurors eligible to be excluded with a challenge for cause, he will be instructed to select the option labeled "Pass for Cause and Tender Jurors to the Defense Attorney." Once the Plaintiff Attorney selects this option, the Defense Attorney is then sent an email message advising him that he may now submit his challenge for cause exercises on any of the jurors eligible for exclusion with a challenge for cause. The Defense Attorney will only be shown all new replacement juror questionnaires made by the Plaintiff Attorney and all juror questionnaires not replaced by the Plaintiff Attorney that make up the total number of juror questionnaires eligible for exclusion. The Defense Attorney then presented with the same options and features of exercising challenges for cause as the Plaintiff Attorney. The Plaintiff Attorney also submits rebuttals with the same features and process and deadline functions as the Defense Attorney.

Once the Defense Attorney passes for cause and tender the jurors back to the Plaintiff Attorney, the Plaintiff Attorney will then be allowed to exercise challenges for cause on only the newly replaced juror questionnaires made by the Defense Attorney that the Plaintiff Attorney has not yet reviewed. Thus, the if the Plaintiff Attorney exercises any challenges for cause on these new juror questionnaires and they are subsequently granted, the Plaintiff Attorney will once again be sent another email notifying him that he may log on and exercise challenges for cause on any newly replaced juror questionnaires. This process will continue until the Plaintiff Attorney again passes for cause. Once the Plaintiff Attorney passes for cause the Defense Attorney will only be allowed to exercise challenges for cause on any newly replaced juror questionnaires that he has not yet reviewed and will make such exercises through the same process as the Plaintiff Attorney.

This tendering will continue to go back and forth between the attorneys until one attorney passes for cause without replacing any juror questionnaires and the opposing attorney has tendered the jurors on at least one prior occasion. When this happens, the software will automatically notify the judge and attorneys that the challenge for cause process has been completed. If an attorney does not pass for cause to his counterpart within the deadline, the judge will be notified with an email message informing him that he may now log onto the website and deem the attorney has passed for cause and prevent the attorney from submitting challenges for cause, or the judge has the option of waiting for the attorney to submit challenges for cause after the deadline and pass for cause. As long as the judge does not prevent the attorney from submitting challenges for cause, the attorney still has the option of submitting challenges for cause and passing for cause. Once the attorney submits challenges for cause after the deadline, the judge has the option of rejecting the challenges for cause or accepting them. If the judge rejects, both attorneys will be notified of this rejection and notified that any challenge for cause submissions of the attorney submitted after the tendering deadline will not be granted.

The judge may then tender the jurors to the opposing attorney for challenges for cause. The judge may also extend the deadline for the counterpart to pass for cause for any delay caused. The court reporter will also be notified that she may now print the court order rejecting the specific attorney's challenges for cause and print the challenges for cause that were submitted by the attorney and print the deadline and the date they were submitted. An attorney who previously had his challenges for cause rejected may still be afforded an opportunity to exercise challenges for cause on any newly replaced juror questionnaires. If the opposing attorney has already been given an opportunity to exercise challenges for cause and has passed for cause and his counterpart's challenges for cause were rejected, the challenge for cause process will be complete. If the judge accepts the late challenge for cause submissions, the judge will have the option of extending the deadline for the opposing counsel to submit a rebuttal if rebuttals are allowed. The Court Reporter will then be instructed to print the challenges for cause, the date they were submitted, and the respective deadline. If attorneys are allowed to submit rebuttals, and an attorney does not submit a rebuttal within the deadline, the judge will be notified with an email message informing him that he may now log onto the website and prevent the attorney from submitting a rebuttal and issue rulings on the challenge for cause. If the judge does prevent an attorney's rebuttals, the attorney will be notified of this rejection, and the court reporter will be notified with an email message informing her that she may now log onto the website and print this rejection.

The judge also may wait for the attorney to submit a rebuttal. Thus, as long as the judge does not reject the attorney may still submit rebuttals. Once an attorney submits after the deadline, the judge will be notified with an email message that he may log onto the computer and either accept or reject the untimely rebuttals. Thus, if he rejects at this point, both attorneys will be notified and the court reporter will be notified to print this court order of rejection and print the attorney's submitted rebuttals. The judge will also have the option of extending the deadline of his counterpart to submit challenges for cause for any delay caused.

If the judge elects to have juror questionnaires replaced with new juror questionnaires after challenges for cause are granted and the judge elected to have both the Plaintiff Attorney and the Defense Attorney submit their challenges for cause at the same time and submit rebuttals at the same time after challenge for cause submissions, the judge must first set a single deadline for both attorneys to have submitted challenges for cause on all the jurors eligible for exclusion with challenges for cause. The judge must then set a later deadline for both attorneys to submit rebuttals to their counterpart's challenges for cause.

After each attorney submits their challenges for cause, they are then shown a list of juror questionnaires sought to be stricken by their counterpart with challenges for cause. The attorneys are sent email messages instructing them to submit rebuttals to their counterpart's challenges for cause. After the attorneys submit their rebuttals, the judge is then notified with an email message that he may now log onto the website and rule on each attorney's challenges for cause and respective rebuttals.

Thus, if the judge grants any challenges for cause for either attorney, the attorneys are both notified of which specific challenges for cause were granted. The court reporter is then instructed to print all judicial rulings of the challenges for cause. The court reporter will also be sent an email message immediately after each attorney submits either challenges for cause and/or rebuttals informing her to print all challenges for cause and respective rebuttals. The attorneys are then shown a list of newly replaced juror questionnaires that is equal to the combined number of granted challenges for cause of both the Plaintiff Attorney and the Defense Attorney. The judge then sets another deadline for both the Plaintiff Attorney and the Defense Attorney to submit another round of challenges for cause on the new juror questionnaires and another deadline for attorneys to submit rebuttals to their counterpart's new challenges for cause. Thus, the attorneys will only be allowed to submit challenges for cause on this new list.

If either attorney does not wish to exercise any challenges for cause on the original list of jurors, they will be instructed to "pass for cause" which will be an option in the bottom margin of their screen. If one attorney passes for cause and the other attorney submits challenges for cause and his challenges for cause are granted, the software will then provide a list of new juror questionnaires equal to the number of challenges for cause granted. Both attorneys, even the attorney who passed for cause, will then be given an opportunity to exercise challenges for cause only on the new juror questionnaires on the list. Thus, attorneys will continue to have an opportunity to exercise challenges for cause until both attorneys have passed for cause. Thus, attorneys will be provided the option of passing for cause or exercising challenges for cause for each new juror questionnaire list presented to the attorneys. Anytime an attorney passes for cause, submits a challenge for cause, or submits a rebuttal, the court reporter is instructed to print it.

Furthermore, if either attorney does not submit a challenge for cause within the respective deadline, the judge will be notified with an email message informing him that he may log onto the website and prevent the attorney from submitting such challenges for cause or wait for the attorney to submit his challenges for cause. If the judge rejects, both attorneys will be notified of this rejection by email and the court reporter will be notified with an email message instructing her to log onto the website and print this court order of rejection. If the judge waits, and the attorney submits challenges for cause after the deadline, the judge will once again be notified with an email message that he may accept or reject them. If he accepts, the court reporter will be notified by email to print the challenges for cause, the date they were submitted, and the judicial deadline. If the judge rejects, the court reporter will be instructed to print this order of rejection, the challenges for cause submitted, the date they were submitted and the respective judicial deadline. The judge will also have the option of extending the opposing attorney's deadline for submitting rebuttals.

Likewise, if an attorney does not submit a rebuttal within the respective deadline, the judge will be notified with an email message informing him he may wait for the rebuttals to be submitted or prevent the attorney from submitting the rebuttals. If the judge prevents, the court reporter will be instructed to print this order, the current date, and the respective deadline for the submission of the rebuttal. If the judge waits, the attorney may still submit rebuttals. If the attorney submits rebuttals after the deadline, the judge will be notified that he may reject or accept. If the judge accepts, the court reporter will be instructed to print the rebuttals, the date they were submitted, and the respective judicial deadline. If the judge rejects, the court reporter will be notified by email to log onto the website and print the order rejecting, the date the rebuttals were submitted, and the respective judicial deadline. If the attorney submits his rebuttals on time, the judge is notified with an email that he may now issue rulings on the respective challenges for cause and rebuttals.

If the judge does not elect to have jurors replaced after challenges for cause have been granted, and the judge elected to have the Plaintiff Attorney submit his challenges for cause at an earlier date than that of the Defense Attorney, the judge simply sets the deadline for the Plaintiff Attorney to have submitted his challenges for cause and he then sets a later deadline for the Defense Attorney to submit his challenges for cause. Thus, if the judge does not elect to have jurors replaced after the granting of challenge for cause exercises, and the judge elects to have both attorneys submit their challenges for cause at the same time, the judge simply sets one deadline for both attorneys to submit such challenges for cause. Once each attorney has had an opportunity to submit challenges for cause the process is complete unless the attorneys are allowed to submit rebuttals.

Challenges for cause can only be exercised after the Jurors have finished responding to the questionnaire and after the Judge submits the answered juror questionnaires to the attorneys for viewing their typed responses and listening to their voice responses, and if the judge selected the viewing option, the physical appearances and physical gestures. Therefore, the judge will only be allowed to set the deadlines for time periods after he has viewed the questionnaires and submitted them to attorneys for viewing.

If the judge elected to set the deadlines for attorney submissions for challenges for cause through the non-duplicative method where the Plaintiff Attorney's deadline is set at an earlier date than that of the Defense Attorney, and the Judge submits the answered juror questionnaires to the attorneys for viewing, only the Plaintiff Attorney is sent an email message to his/her personal email account notifying him/her that he/she must log onto the designated website and exercise challenges for cause. The Defense Attorney will be sent an email message allowing him to listen and view the juror responses; however, he will not at this time be allowed to exercise his challenges for cause until the Plaintiff Attorney has finished responding and/or the Defense Attorney rebuttal have been submitted.

Once the Plaintiff Attorney receives this email notification, he/she logs onto the Plaintiff Attorney program in the designated website and selects "Exercise Challenges for Cause WITH Listening and/or Viewing Juror Responses."

If the judge has elected to have both attorneys submit their challenges for cause with Listening and/or viewing Juror Responses simultaneously then both attorneys would be sent email messages instructing them to submit their challenges for cause.

Each state and federal jurisdiction in the United States that allows the exercise of challenges for cause for the selection of juries has a designated statute that specifies the grounds for excluding a juror with a challenge for cause. If a judge elects to exercise challenges for cause through the invention method, the Judge selects his/her jurisdiction's statutory authority that specifies the grounds for challenges for cause.

When each attorney logs onto the website to exercise challenges for cause, the statute stating grounds for a challenge for cause in his respective jurisdiction appears at the top of the screen directly above each Juror questionnaire the attorney intends to view. Thus, the statute initially appears in blue text in a rectangular box with a scroll bar affixed to the right side to allow attorneys to view the entire statute within the box. The Juror questionnaire questions and respective juror responses appear in the middle of the screen. The questions initially appear in black text. The juror responses initially appear in green text. Below the questionnaire, a designated area for attorneys to type confidential notes appears in a narrow rectangular box with a scroll bar affixed to the right side to allow attorneys to type as many notes as they deem necessary. Attorneys are instructed to review the statute for striking jurors with a challenge for cause. The attorneys are then instructed to read each juror's questionnaire and type notes on each questionnaire as they read them. When attorneys type notes in the box, the letters initially appear in red text. On this screen, attorneys are presented with an option to change the font size and color of the questions, juror responses, and their typed confidential notes. Thus, attorneys can change the font sizes and colors of the questions, responses and notes so they are different from each other. Such an option will make viewing responses and notes easier. Additionally, the juror's name or anonymous number appears at the top of the juror's questionnaire. To the left of these names or anonymous numbers appears a rating system from 1-10 to mark the strength of the attorney's desire to exclude a juror with a challenge for cause. Thus, this rating system consists of a rectangular box with a horizontal scroll bar affixed to the bottom. To the left of the box is the word "Keep." To the right of the box is the word "Exclude." When the scroll bar moves from left to the word exclude, the number from 1-10 increases. Thus, the higher the number between 1 and 10 the stronger the attorney's desire to exclude the juror with a challenge for cause. Thus, such a rating is simply to help the attorney remember his initial impression of the juror's questionnaire upon reviewing after the attorney has reviewed all of the juror questionnaires. Also, at the top of the screen and to the left of these numbers appears the judicial deadline for the attorney to exercise his challenges for cause. To the immediate right of this deadline appears the current date.

Also, on this screen there is an option labeled "Listen to Juror Responses." By selecting this option, attorneys can listen to the juror respond to the questionnaire. Thus, upon listening to the juror responses they are advised to take additional notes in their confidential notes box as to the sincerity of the juror's voice or how articulate the juror is. If the judge selects the option of video recording juror responses, which is described below, then on this screen the attorneys would have the option labeled "Listen and View Juror Responses." Thus, if this option is selected, attorneys would be advised to take confidential notes on not only the sincerity of the juror's voices but also their appearance and physical gestures or any other notes regarding the juror's appearance and voice that may be pertinent to making a challenge for cause decision.

After the attorneys have read each juror's typed responses, and listened and/or viewed each juror's questionnaire responses, attorneys are instructed to select the Challenge for Cause Submission Screen. At the top of the screen appears the judicially limited number of challenges for cause the attorneys are allowed to exercise or the word unlimited will appear if the judge allowed attorneys to exercise an unlimited number of challenges for cause. To the right of this number, will appear the total number of challenges for cause the attorney exercises on this submission screen. Also, at the top of the screen and to the left of these numbers appears the judicial deadline for the attorney to exercise his challenges for cause. To the immediate right of this deadline appears the current date. Directly below this deadline and current date appears the statute stating grounds for a challenge for cause in his respective jurisdiction. Thus, the statute initially appears in blue text in a rectangular box with a scroll bar affixed to the right side to allow attorneys to view the entire statute within the box. Below this statute, appears a vertical list of the juror names or anonymous numbers of all jurors who were made eligible to be excluded with a challenge for cause. These names or numbers are interactive. If an attorney clicks on the name or number, that Juror's questionnaire responses appears on the screen. To the left of each juror's name or anonymous number appears the rating number from 1-10 that the attorney assigned to the juror when he initially reviewed it. Below this number appears a box labeled "Strike." By clicking in this strike box, a check mark will appear. Directly below the juror's name or anonymous number appears the confidential notes the attorney typed upon initially reviewing the questionnaire. These notes will initially appear in red text. There is a scroll bar attached to the right of this vertical list of juror names or anonymous numbers so attorneys can view all names or numbers and their respective notes on the same screen. Also, the names or anonymous numbers appearing on this list are interactive. By clicking on a juror's name or anonymous number, that juror's name will appear in full. Directly below this vertical list appears a rectangular box labeled "Explanations for Challenges for Cause." When a check mark appears in a box labeled strike for a particular juror, that juror's name or anonymous number will appear in this box labeled explanations for challenges for cause. A flashing cursor will appear to the right of this name or anonymous number. At this flashing cursor, attorneys are instructed to type an explanation for striking that particular juror with a challenge for cause pursuant to the statute specifying the grounds for challenges for cause of their respective jurisdiction that appears at the top of the screen.

On this submission screen attorneys will be allowed to submit their challenges for cause to the judge, opposing counsel, and court reporter. Thus, on this screen, check marks in the strike box of a juror will exclude a juror with a challenge for cause upon selecting submit. Attorneys are instructed to read their notes and change their check marks if needed to be within the judicial limit unless they are allowed to exercise an unlimited number of challenges for cause. Once an attorney makes a check mark in the strike box, he must type an explanation for striking that particular juror in the explanation box next to the juror's name or anonymous number. The explanation should be consistent with the statute specifying the grounds for a challenge for cause within the respective jurisdiction appearing at the top of the screen. The explanation for striking a juror will initially appear in green text. Affixed to the right side of this explanation box is a scroll bar to allow attorneys to type explanations as lengthy as possible. Attorneys must complete this process for all jurors they seek to exclude with challenges for cause before they submit them to the judge, opposing attorney, and court reporter. Attorneys will not be allowed to submit their challenges for cause until they are at or within the judicially limited number of challenges for cause unless they are allowed to exercise an unlimited number of challenges for cause. Also, on this screen, attorneys are presented with an option to change the font size and color of their typed confidential notes, challenge for cause statute, and explanations for challenges for cause to where they are each a different color and size.

Once the attorney's type an explanation for each juror they seek to strike with a challenge for cause, the attorneys submit their selections and respective explanations to the Judge. If the Judge sets the deadlines to prevent duplication of challenges for cause, the judge is instructed to make the Plaintiff Attorney submit his challenges for cause first before allowing the Defense Attorney to submit his challenges for cause. The purpose of setting the Plaintiff Attorney's deadline for exercising his/her challenges for cause at an earlier date than that of the Defense Attorney is to prevent both attorneys from exercising challenges for cause from being exercised on the same jurors. Thus, once the Plaintiff Attorney exercises his challenges for cause first, the Defense Attorney will be allowed to view those challenges for cause and exercise his challenges for cause on different jurors. Therefore, each attorney will get the full benefit of their allotted number of challenges for cause or unlimited number of challenges for cause, and neither attorney will exercise their challenges for cause on the same juror.

Thus, if the Judge sets the Plaintiff Attorney's deadline at an earlier date, and the Plaintiff Attorney does not submit his/her challenges for cause and explanations within the deadline, the Judge is sent an email message to his/her personal email account notifying him/her that he/she has the option of logging onto the website and reject the Plaintiff Attorney's challenge for cause selections and respective explanations as well as compare the date such selections and explanations were submitted with the respective judicial deadlines. Thus, when the judge logs onto the website to view the Plaintiff Attorney's challenges for cause, he is first shown the judicial deadline and the date the Plaintiff Attorney submitted his challenges for cause.

As long as the Judge does not reject/prevent the Plaintiff Attorney from submitting challenges for cause, the Plaintiff Attorney is still allowed to submit his/her challenges for cause. Once the Plaintiff Attorney submits his/her challenges for cause passed the respective judicial deadline, the Judge is notified with an email message to his/her personal email account informing him/her that he/she may view the Plaintiff Attorney's challenges for cause and their respective explanations, and he/she may reject them since they were submitted after the respective judicial deadline.

If the Judge decides to reject them, both the Plaintiff Attorney and the Defense Attorney are notified with an email message informing them that the Plaintiff Attorney's challenges for cause will not be considered, and that, if the attorneys are allowed to submit rebuttals after their counterpart's challenge for cause submissions, the Defense Attorney will not be allowed to submit rebuttals to the Plaintiff Attorney's challenges for cause since they were rejected. If the attorneys are not allowed to submit rebuttals or are allowed to submit rebuttals after both parties have exercised challenges for cause, then the Defense Attorney is notified that he/she may now submit his/her challenges for cause and explanations. The Court Reporter is also sent an email message notifying him/her that he/she must print the Plaintiff Attorney's challenges for cause and explanations, the date they were submitted, the respective judicial deadline, and the Court Order rejecting them for not being submitted within the judicial deadline and explaining that the Defense Attorney's rebuttals were not necessary since the Plaintiff Attorney's challenges for cause were not to be considered by the Judge if attorneys were allowed to submit rebuttals. Also, the Court Reporter is instructed to print, through the website, the email message sent to the Plaintiff Attorney notifying him that he may now submit his challenges for cause. Such email message will contain the email address of the Plaintiff Attorney and the date it was sent to the Plaintiff Attorney.

Also, if the judge rejects after the deadline, he will have the option of resetting the Defense Attorney's deadline for submitting challenges for cause to a later date due to any delay, and if the judge elected to have each attorney submit rebuttals directly after the exercise of their counterpart's challenges for cause deadline, than the judge will also have the option of extending the deadline for the Defense Attorney to submit his rebuttals.

If the Judge decides to accept the Plaintiff Attorney's challenges for cause, the Defense Attorney is then allowed to submit rebuttals to the Plaintiff Attorney's challenges for cause or exercise his challenges for cause if the judge did not allow for rebuttals. If the Judge accepts the Plaintiff Attorney's challenges for cause after the judicial deadline, the Judge then has the option of resetting the judicial deadline for the Defense Attorney to submit rebuttals to a later date due to the Plaintiff Attorney's delay in submitting challenges for cause, or if the judge does not allow rebuttals or sets the date for both attorneys to submit rebuttals at the same time after both attorneys have submitted their challenges for cause, the judge would have the option of resetting the judicial deadline for the Defense Attorney to submit his challenges for cause on a later date. Once the deadline is reset, the Defense Attorney is then notified with an email message informing him/her that he/she must now submit his/her rebuttals to the Plaintiff Attorney's challenges for cause through the website, or if no rebuttals are allowed or set after both attorneys have exercised their challenges for cause than the Defense Attorney is notified with an email message informing him that he must now submit his challenges for cause. The Court Reporter is than sent an email message notifying her that she must now print the Plaintiff Attorney's challenges for cause, the date they were submitted, and the respective judicial deadline. Also, the Court Reporter is instructed to print, through the website, the email message sent to the Plaintiff Attorney notifying him that he may now submit his challenges for cause. Such email message will contain the email address of the Plaintiff Attorney and the date it was sent to the Plaintiff Attorney.

If the Plaintiff Attorney submits his/her challenges for cause within the respective judicial deadline, the Judge is sent an email message to his/her personal email account informing him/her that he/she may now view the Plaintiff Attorney's challenges for cause and explanations and compare the respective judicial deadline with the date the Plaintiff Attorney submitted his/her challenges for cause. The Defense Attorney is automatically notified with an email message that he/she may now submit rebuttals to the Plaintiff Attorney's challenges for cause within the judicial deadline, or challenges for cause if not allowed to submit rebuttals or the deadline for both attorneys was set at the same time after each attorney has exercised challenges for cause. The Court Reporter is than sent an email message notifying her that she must now print the Plaintiff Attorney's challenges for cause, the date they were submitted, and the respective judicial deadline. Also, the Court Reporter is instructed to print, through the website, the email message sent to the Plaintiff Attorney notifying him that he may now submit his challenges for cause. Such email message will contain the email address of the Plaintiff Attorney and the date it was sent to the Plaintiff Attorney.

If the judge did not allow attorneys to make rebuttals to challenges for cause or allowed for rebuttals after all challenges for cause have been exercised, the Defense Attorney exercises his challenges for cause in the exact same way the Plaintiff Attorney exercised his challenges for cause, and he is allowed to view the Plaintiff Attorney's challenge for cause exercises to prevent duplication. If the Defense Attorney causes delay, the Plaintiff Attorney rebuttal deadline may be extended. If no rebuttals are allowed, peremptory challenge deadlines may be extended if they are an option.

If the judge elected to have the Plaintiff Attorney and the Defense Attorney submit their challenges for cause within the same deadline, and either or both attorneys do not submit them within such deadline, the judge may reject and prevent them from submitting. If the judge does not reject, they may still submit. If they submit after the deadline, the judge still has the option of rejecting. If he rejects, both attorneys are notified and the court reporter is notified. If the judge allows for rebuttals, the judge may extend the deadline for the attorney's counterpart to a later date. If no rebuttals are allowed, the judge may reset the deadlines for peremptory challenge exercises if they are an option.

Also, both the Plaintiff Attorney an the Defense Attorney submit their rebuttals to their counterpart's challenges for cause in the exact same way. Allowing attorneys to submit rebuttals to their counterpart's challenges for cause is an option for the judge.

When either attorney logs onto the website to rebut their counterpart's challenges for cause, he is shown the respective statute that specifies the grounds for exercising challenges for cause at the top of the screen in a narrow rectangular box with a scroll bar affixed to the right to allow him to view the entire statute. The text of this statute initially appears in blue text. Directly above this statute appears the judicial deadline for the defense attorney to submit his rebuttals. To the immediate right of this deadline appears the current date. To the right of this date appears the judicially limited number of challenges for cause their counterpart was allowed to exercise or the word "unlimited" will appear if the judge allowed each attorney to exercise an unlimited number of challenges for cause. To the immediate right of this number or word "unlimited" is the total number of challenges for cause their counterpart actually submitted. He is also shown the names or anonymous numbers of the jurors he has challenged for cause. The names or anonymous numbers are interactive. If an attorney clicks on the name or number, that Juror's questionnaire responses appears on the screen. To the left of each juror's name or anonymous number appears a sequential number to indicate how many challenges for cause their counterpart exercised. Directly below the Juror's name or number appears the counterpart's explanation for striking the juror with a challenge for cause which initially appears in red text. Directly below this explanation is designated space labeled "Rebuttal." To make a rebuttal, the attorney simply views the statute for challenges for cause, reads their counterpart's explanation, types a rebuttal in the designated space, and after he has done this for all his counterpart's challenge for cause explanations, he selects submit. When the attorney types a rebuttal in the space the text initially appears in green. To allow the attorney to view all of their counterpart's explanations and juror names, a scroll bar is affixed to the right of the screen. The attorney is instructed that he must type a rebuttal for each challenge for cause explanation before he selects the submit button. Thus, all rebuttals must be submitted at once. The attorney is also presented with the option of changing the color and size of the font of his counterpart's explanations, his respective rebuttals, and the statute specifying the grounds for challenges for cause to where they are all different colors and sizes. Additionally, the attorney is presented with a spelling option that allows him to correct any spelling errors in his rebuttals before he submits them. Also, when either attorney clicks on the interactive name or anonymous number of a juror on the list of their counterpart's challenges for cause and the typed questionnaire appears, the attorney will be presented with the option of listening to the juror respond to the whole questionnaire or any particular question by making a check mark in the small box to the right of any question. Also, if the judge exercised the option of video recording jurors respond, the attorneys will be able to view each juror respond. Thus, they will be able to view and listen to a juror respond to any particular question by placing a check mark in the small square box to the right of any particular question. If they do not place any check marks in any of the boxes, the attorneys will begin viewing and listening to the juror respond to the oath followed by all questions on the questionnaire. Thus, the attorneys will also have pause, rewind, fast forward, play, and stop options.

If the attorney does not submit his rebuttals within the judicial deadline, the Judge is sent an email message to his personal email account informing him that the attorney has not submitted his rebuttals within the deadline and the Judge may reject/prevent the attorney from sending any rebuttals. If the Judge decides to reject, the attorney is prohibited from submitting any rebuttals to his counterpart's challenges for cause. The Defense Attorney and Plaintiff Attorney are sent email messages notifying them of this rejection. Additionally, the Court Reporter is sent an email message notifying her that she must print the Court Order that the attorney's rebuttals were rejected and would not be considered by the Court through the website. Also, the Court Reporter is instructed to print, through the website, the email message sent to the attorney notifying him that he may now submit his rebuttals to his counterpart's challenges for cause. Such email message will contain the email address of the attorney and the date it was sent to the attorney. Also, the Judge is sent an email message that he may go ahead and rule on the counterpart's challenges for cause through the website.

If the Judge accepts an attorney's submitted rebuttals after the respective judicial deadline, the Court Reporter is notified with an email message that she must print through the website the attorney's submitted rebuttals, the date they were submitted, and the respective judicial deadline. Also, the Court Reporter is instructed to print, through the website, the email message sent to the attorney notifying him that he may now submit his rebuttals to his counterpart's challenges for cause. Such email message will contain the email address of the attorney and the date it was sent to the attorney. The Judge is then sent an email message notifying him that he may now rule on the counterpart's challenges for cause and the attorney's respective rebuttals. The opposing attorney is then sent an email message that he may now view his counterpart's submitted rebuttals.

As long as the Judge does not exercise his option to reject after the judicial deadline for the attorney to submit rebuttals has passed, the attorney is still permitted to submit his rebuttals. Once the attorney submits his rebuttals after the judicial deadline, the Judge is notified with an email message that he must log onto the website and either accept the attorney's rebuttals or reject them. If the Judge rejects them, both attorneys are notified with email messages of the attorney whose rebuttals will not be considered by the Court. Additionally, the Court Reporter is notified with an email message that she must print through the website the attorney's submitted rebuttals, the date they were submitted, their respective judicial deadline, and the Court Order rejecting them. Also, the Court Reporter is instructed to print, through the website, the email message sent to the attorney notifying him that he may now submit his rebuttals to his counterpart's challenges for cause. Such email message will contain the email address of that attorney and the date it was sent to that attorney. The Judge is then sent an email message notifying him that he must now make a ruling on the counterpart's challenges for cause without the attorney's rebuttals.

If the attorney submits his rebuttals to his counterpart's challenges for cause within the respective judicial deadline, the counterpart is automatically notified with an email message that he may log onto the website and view the respective rebuttals. The Judge is notified with an email message that he may now rule on the challenges for cause and the respective rebuttals. The Court Reporter is sent an email message notifying her that she must now print through the website the attorney's rebuttals, the date they were submitted, the respective judicial deadline. Also, the Court Reporter is instructed to print, through the website, the email message sent to the attorney notifying him that he may now submit his rebuttals to his counterpart's challenges for cause. Such email message will contain the email address of the attorney and the date it was sent to the attorney.

The Judge then logs onto the website and rules on the challenges for cause and the respective rebuttals. When the Judge logs onto the website, the judge is shown the judicial deadline for when the attorney was to have submitted his challenges for cause. The Judge is also shown the date the attorney submitted his challenges for cause. Also, the judge is shown the judicial deadline for when the opposing attorney was to have submitted his rebuttals. He is also shown the date the attorney actually submitted his rebuttals. On the next screen, the statute specifying grounds for challenges for cause appear in the top ¼ of the screen in a narrow rectangular box with a scroll bar affixed to the right side to allow the judge to view the entire statute inside this box. The text of this statute initially appears in blue text. The juror's name or anonymous number that is being challenged for cause appears and is interactive. By clicking on the name or number, that Juror's questionnaire appears on the screen. To the left of the Juror's name or number appears a box labeled "sustained" and a box labeled "overruled." Below these boxes and the Juror's name or number appears the Challenge for Cause explanation or grounds in red text. Below these grounds is the opposing attorney's rebuttal which initially appears in green text. Below the rebuttal is space labeled Explanation of Judicial ruling. To make a ruling the Judge simply click's in either the box labeled "sustained" or the box labeled "overruled." When the judge clicks in one of these boxes a check mark appears. If the judge makes a check mark in the sustained box, a strike through line will appear through the respective juror's name or anonymous number to indicate that that juror and his questionnaire will be stricken from the venire upon the judge selecting submit. The Judge has the option of typing an explanation for his ruling. If the judge types an explanation, the text will initially appear in blue text. The judge must check either the "sustained" box or the "overruled" box for each challenge for cause presented to him on the screen before he submits his rulings to the attorneys and court reporter. To make such rulings on each challenge for cause, there is a scroll bar affixed to the right side of the screen to allow him to view all challenges for cause and respective rebuttals. The judge is presented with an option that allows him to change the font size and color for the statute specifying the grounds for challenges for cause, the plaintiff attorney's explanations for challenges for cause, the defense attorney's rebuttals, and any explanations that he may type to where they are all different sizes and colors to make viewing and ruling easier for him. The judge is also presented with a spelling option that allows him to correct any spelling errors in any explanations he may type before submitting his rulings to the attorneys and court reporter.

After checking either the "sustained" box or the "overruled" box and/or typing an explanation for each challenge for cause, the Judge simply selects submit. If the Judge selected "sustained" for a challenge for cause, that respective Juror and Questionnaire are stricken from the venire upon selecting submit. The Court Administrator is then notified with an email message containing a list of all jurors who have been stricken, and she is also notified that she must submit a letter or call that Juror informing him/her that he/she will not need to appear in court for jury duty on the respective case. Also, included with each juror's name who had been excluded with a challenge for cause is the juror's address so the court administrator can conveniently send them notices that they are no longer needed for jury duty on this case.

If an attorney's challenge for cause is overruled, the Juror's Questionnaire and Juror remain in the venire. The Judge repeats this process for each juror being challenged. After the judge has made a ruling on each juror being challenged for cause by an attorney and the Judge selects submit, the Court Reporter is then notified with an email message that she must print through the website the judicial rulings and the date they were submitted. The Plaintiff Attorney and Defense Attorney are both sent email messages that they may now view the Judge's rulings through the website.

If the judge set the deadlines for both attorneys to submit their challenges for cause at the same time, and likewise the judge set the deadlines for both attorneys to submit their rebuttals at the same time, the judge will only be allowed to submit his rulings after the deadline for submitting rebuttals has passed. If the judge has set the deadline for the Plaintiff Attorney to submit his challenges for cause at an earlier date than that of the Defense Attorney and the Defense Attorney is to submit rebuttals directly after the deadline for the Plaintiff Attorney to submit Challenges for Cause, the judge may exercise his rulings after the Defense Attorney has submitted his rebuttals. He also may wait and submit his rulings on both the Plaintiff Attorney's challenges for cause and the Defense Attorney's respective rebuttals and his rulings on the Defense Attorney's challenges for cause and Plaintiff Attorney's rebuttals after both attorneys have exercised their challenges for cause and respective rebuttals.

If the Judge set the Plaintiff Attorney's deadline for submitting challenges for cause at an earlier date than that of the Defense Attorney, and he set the Defense Attorney's deadline for rebuttals directly after the Plaintiff Attorney's deadline for challenges for cause and the judge opted to submit rulings on the Plaintiff Attorney's challenges for cause directly after the deadline for the Defense Attorney to submit his rebuttals, the judge may extend the deadline for the Defense Attorney to submit his challenges for cause and the deadline for the Plaintiff Attorney to submit rebuttals for any delay caused by the judge in submitting rulings. If new deadlines are set for the Defense Attorney to submit challenges for cause and the Plaintiff Attorney to submit rebuttals, the Plaintiff Attorney and the Defense Attorney are notified with email messages of the new deadlines. Additionally, the Court Reporter is notified with an email message that she must now print the new deadlines.

When the judge submits rulings after the deadline for the Plaintiff Attorney to submit rebuttals to the Defense Attorney's challenges for cause, he may, for any delay caused, reset the deadlines for the attorneys to submit their peremptory challenges if the judge selected the option of allowing attorneys to exercise peremptory challenges.

To clarify, if the judge sets the deadlines to where the Plaintiff Attorney submits his challenges for cause first and the deadline for the Defense Attorney to submit rebuttals second and the deadline for the Defense Attorney to submit his challenges for cause third and the Plaintiff Attorney to submit his rebuttals fourth, the judge may reset the deadline for the defense attorney to submit his rebuttals for any delay caused by the plaintiff attorney in submitting his challenges for cause or any delay caused by the judge. Likewise, if the defense attorney submits his rebuttals after the deadline or the judge delays the process by issuing rulings than the judge may reset the Defense Attorney's deadline to submit his challenges for cause. Also, if there is a delay caused by the Defense Attorney in submitting his challenges for cause the judge may reset the deadline for the Plaintiff Attorney to submit his rebuttals.

If the judge sets the Plaintiff Attorney deadline for challenges for cause first and the Defense Attorney's deadline for challenges for cause second and then schedules both attorney's rebuttals thereto at the same time after both attorneys have exercised challenges for cause, the judge may reset the deadline for the Defense Attorney to submit his challenges for cause for any delay caused by the Plaintiff Attorney in the submission of his challenges for cause. Likewise, the judge may reset both attorneys deadlines for submission of rebuttals for any delay caused by either attorney in the submission of their challenges for cause.

If the judge sets the deadlines for both attorneys to submit their challenges for cause at the same time and the judge allows attorneys to submit rebuttals on the same deadline after the deadline for challenges for cause have passed, the judge may reset the deadline for either attorney to submit their rebuttals for any delay caused by their counterpart in the submission of his challenges for cause or any delay caused by the judge.

If the judge did not allow the attorneys the option of submitting rebuttals to their counterpart's challenges for cause, then the judge will be sent an email message informing him that he may rule upon either attorney's challenge for cause exercises immediately upon submission or he may reserve the submission of his rulings until after each attorney has exercised their challenges for cause.

2. Expand the Grounds of Challenges for Cause Exercised Through the Website WITH Listening and/or Viewing Juror Responses to Include Inconsistent Juror Responses This option only may be selected if the judge selects the option of "Exercise Challenge for Cause WITH Listening and/or Viewing Juror Responses." If the option of "Exercise Challenges for Cause WITH Listening and/or Viewing Juror Responses" is selected and this expanded ground option is selected, the court's respective jurisdictional statutory grounds for excluding jurors with challenges for cause will be expanded to allow attorneys to exclude jurors who have any typed responses to any particular questions on the questionnaire that are inconsistent with a juror's physical gestures and/or voice responses when answering such questions. Thus, under this expanded ground, if a juror's physical gestures and/or voice response to a particular question is inconsistent with the context of his/her response, an attorney may exclude such juror with a challenge for cause.

Hypothetically, if a particular juror is asked the question if she believes in the death penalty and she responds by saying "Yes" and she was shaking her head no, she may be excluded with a challenge for cause under this expanded standard. Another example is a particular juror is asked if he has ever imbibed alcohol and he responds by stating "No." However, when he said the word "No" he had a sarcastic tone of voice. He too could be excluded with a challenge for cause under this expanded standard.

Thus, if this option is selected the following wording will be conspicuously added to the end of the Court's respective jurisdiction statute specifying the grounds for exclusion of a juror with a challenge of cause that appears to the attorneys when they submit their challenges for cause through the website, and to the attorneys when they submit their rebuttals for challenges for cause through the website, and to the judge when he submits rulings on each attorney's challenges for cause and respective rebuttals through the website:

"Each party may challenge any prospective juror for cause if a juror's physical gesture(s) and/or audio voice response is inconsistent with the context of his/her response to any question presented on the invention questionnaire."

Thus, attorneys are advised that they may challenge for cause those juror's whose responses are inconsistent based on this added provision of the statute, and the judge will be advised that he may exclude a juror for cause whose responses are inconsistent based on this added provision of the statute.

Additionally, if this option of expanded standard is selected, both attorneys and the judge will be conspicuously informed of this expanded standard and will be informed of the above mentioned hypotheticals to help each attorney and the judge grasp the concept of this expanded standard and use it as an additional tool for detecting bias and excluding jurors.

Before the judge will be able to select this expanded ground option of inconsistent responses, he will be provided a warning that states the following: "If your jurisdiction's legislature has not amended its statute specifying grounds to exclude juror's with challenges for cause to include this above stated ground of inconsistent responses, selecting this feature of Griebat Jury Selection that expands your jurisdiction's statutory grounds for challenges for cause may be illegal or considered to be a violation of your jurisdiction's separation of powers doctrine. Such a violation could result in a mistrial. Therefore, you are advised to not include this feature until your respective legislature amends its challenge for cause statute to include the above proposed expanded ground or you have received approval from appropriate authorities that parallels the effect of such legislative amendment."

3. Exercise Peremptory Challenges WITH Listening and/or Viewing Juror Responses

The invention provides the option of allowing attorneys to exercise peremptory challenges to strike Jurors through the website based on their voice responses and typed responses to the questionnaire. Also, if the judge has exercised the option of video recording jurors respond to the questionnaire, which is an option described in detail below, the attorneys also will be able to exercise their peremptory challenges based on the juror's physical appearance, and gestures when responding to the questionnaire.

If the Judge selects this option, he must then select the number of jurors that will be eligible for exclusion with peremptory challenges. For example, if there are 200 jurors in the jury pool and the judge wishes to use the panel system of jury selection where the lawyers only question the jurors in the panel and the allotted number of alternates, the judge would enter a number that includes the total number of jurors to be in the panel plus the number of alternates. For example, if there are to be 12 jurors in the panel plus 2 alternates, the judge would enter the number 14. Thus, only 14 juror questionnaires will be allowed to be viewed by the attorneys for peremptory challenge exercises.

Before the judge decides how many jurors shall be eligible for exclusion with a peremptory challenge, he must first decide the number of jurors to be empaneled, and, secondly, he must decide whether or not he wishes to have the alternate jurors selected at the same time along with the jury panel or have the alternate jurors selected separately only after the jury has been empaneled.

If the judge elects to have the jury panel and the alternates selected at the same time, he will be advised that he needs to make the number of jurors eligible for exclusion with a peremptory challenge to be big enough to encompass the number of jurors to be empaneled plus the number of alternates to be selected plus the limited number of peremptory challenges each attorney is allotted.

Additionally, if alternate jurors are to be selected separately and after the jury panel is selected, the juror questionnaires making up the number of jurors eligible for exclusion with a peremptory challenged for the selection of alternate jurors will be made up from the remaining juror questionnaires from the number of alternate jurors eligible for exclusion with challenges for cause, if challenges for cause are to be exercised for the selection of alternate jurors. If challenges for cause are not to be exercised for the selection of alternate jurors, then the number of juror questionnaires making up the alternate jurors eligible for exclusion will be made up of juror questionnaires from the jury pool. Thus, no juror questionnaires making up the number of jurors eligible for exclusion with a peremptory challenge for the selection of the panel will be included. Thus, the questionnaires for the alternates will come from the jury pool.

If the judge elects to have the alternate jurors selected separately and after the jury panel has been selected, then the judge must not only enter a number for jurors eligible for exclusion with a peremptory challenge for the jury panel and the limited number of peremptory challenges each attorney is allowed to exercise in the selection of the jury panel, but he must also enter a separate number of jurors eligible for exclusion with a peremptory challenge for the alternate jurors to be selected and the limited number of peremptory challenges each attorney is allowed to exercise in the selection of the alternate jurors. The judge will be advised that he must take into account only the number of jurors to be selected as alternates and the limited number of peremptory challenges to be exercised on the potential jurors being selected for alternate juror positions. Thus, the judge must also enter a separate limited number of peremptory challenges each attorney will be allowed to exercise in the selection of the alternates only if the alternate juror selection is to be done in a separate process after the panel is selected.

Also, if the judge elects to have the alternate juror positions selected in a separate process after the selection of the jury panel, the deadlines for all challenges for cause and any peremptory challenges and any *Batson* challenges allotted to attorneys for the selection of the jury panel must come to pass before attorneys may begin to exercise challenges for cause and/or any peremptory challenges allotted to attorneys for the selection of alternate jurors. Thus, the judge will be advised that the deadlines for all challenges for cause and any peremptory challenges for the selection of the jury panel must be set at earlier dates than the deadlines for any challenges for cause and/or peremptory challenges allowed for the selection of alternate jurors. Additionally, the deadlines for attorneys to submit peremptory challenges on alternate jurors must be at a later date than the deadline for attorneys to exercise challenges for cause on the alternate jurors.

The method for exercising peremptory challenges on alternate jurors selected separately and after the jury panel is selected is identical to the method for exercising peremptory challenges on the alternate jurors. Thus, the lawyers will only be shown the number of juror questionnaires from the jury pool equal to the number of jurors eligible for exclusion with a peremptory challenge for the selection of alternate jurors.

If the Judge was wanting to use the strike system of jury selection, the judge would be advised to enter a number that totals the sum of all peremptory challenges allotted plus the total number of jurors in the panel plus the alternates, if the court desires to empanel alternate jurors. For example, if there are to be 12 jurors impaneled with 2 alternates and each attorney is allowed to exercise 10 peremptory challenges, then the judge would enter the number 34. If the judge is only wanting to use the invention to accommodate conventional jury selection, he will be instructed to enter a number that equals the sum of all peremptory challenges the attorneys are allowed to exercise through the invention plus the sum of all challenges for cause and/or peremptory challenges each attorney is to exercise in the in court questioning of jurors plus the number of jurors to be impaneled plus the number of alternates.

Once the judge enters this number of jurors eligible for exclusion, only their questionnaires will be made viewable to the attorneys for peremptory challenges. The remaining juror questionnaires not included in this number will not be made viewable to the attorneys. Thus, the attorneys will only be allowed to make their peremptory challenges on this number of jurors. Additionally, when the judge enters this number, the software automatically makes a list of juror names or anonymous numbers up to that number based on the first jurors up to that number to respond. For example, if the judge types in 34 jurors to be eligible out of the entire jury pool, then the first 34 jurors to respond to the questionnaire will make up the list.

If the judge allowed the attorneys to exercise challenges for cause, those challenges for cause and any rebuttals allowed will be completely exercised before attorneys are allowed to exercise their peremptory challenges through the invention. Thus, the number of jurors eligible for exclusion with peremptory challenges will be made up of any questionnaires left out of the number of jurors eligible for exclusion with challenges for cause. For example, if there were 150 jurors eligible for exclusion with challenges for cause and there are 200 jurors in the pool, and the judge makes the number of jurors eligible for exclusion with peremptory challenges at 34, the 34 questionnaires will be the first 34 jurors to respond to the questionnaire that have not already been excluded with challenges for cause out of that 150.

If the Judge selects this option, he is required to select the number of peremptory challenges each attorney is allowed to exercise. Thus, the Plaintiff Attorney and the Defense Attorney are allowed to exercise an equal number of peremptory challenges.

Furthermore, the Judge must decide how he wants to utilize the invention. For example, if the Judge wants to use the software to accommodate conventional jury selection then he needs to coordinate the number of peremptory challenges he allows to be exercised through the website with the number of challenges for cause and/or peremptory challenges allowed in court.

If the Judge has selected the option of allowing attorneys to exercise challenges for cause, attorneys will only be allowed to exercise their peremptory challenges after the Judge has ruled on both the Plaintiff Attorney's and Defense Attorney's challenges for cause. If the Judge has not selected the option of allowing attorneys to exercise challenges for cause, but allows attorneys the option of exercising peremptory challenges, attorneys will only be allowed to exercise their peremptory challenges after the Jurors have answered the questionnaires and after the Judge submits the answered juror questionnaires to the attorneys for viewing.

Also, if the judge wishes to conduct all jury selection peremptory challenges through the invention using the "Strike Jury Selection Process" or the "Panel Jury Selection Process" he will be advised of how to set it up through the invention.

Therefore, when the judge selects the option of peremptory challenges to be exercised, he must select how the peremptory challenges will be exercised through the invention process from the following two options: 1) "Strike Process;" or 2) "Panel Process."

A. Juror Questionnaire Review Process for Both Strike Process and Panel Process

Regardless of whether the Judge chooses the "Strike Process" or the "Panel Process," the attorneys first task in either of these two options is to review each jurors questionnaire that is eligible for exclusion with a peremptory challenge, make confidential notes on each juror's questionnaire that would be pertinent to a peremptory challenge decision, and assign a rating on each juror's questionnaire with the higher the ranking the stronger the desire of the attorney to exclude the juror with a peremptory challenge. Thus, attorneys perform these reviewing, note taking, and rating functions in the same way for either the Strike Process or the Panel Process.

Thus, the attorneys will be shown each juror's respective questionnaire responses through the website. Each juror's name or anonymous number will appear on the questionnaire. Attorneys view each juror's responses by using a scroll bar affixed to the right margin. The questions initially appear in black text, and the responses initially appear in green text. At the bottom of the screen, there is a rectangular box which is designated for typing confidential notes for the specifically named juror or her anonymous number. As attorneys read through the questionnaire, they are instructed to type notes in this box that are pertinent to making a peremptory challenge decision on that juror.

When an attorney types notes in this box they initially appear in red text. The notes typed in the box are completely confidential and cannot be viewed by anyone. A scroll bar is affixed to the right side of this box to allow attorney to make as many notes as they desire. Attorneys are also presented with the option of changing the font color and size of the questions, the juror responses, and the confidential notes so that they are all different colors and sizes to make them easier to view.

Also, on this screen there is an option labeled "Listen to Juror Responses." By selecting this option, attorneys can listen to the juror respond to the questionnaire. Thus, upon listening to the juror responses they are advised to take additional notes in their confidential notes box as to the sincerity of the juror's voice or how articulate the juror is.

If the judge selects the option of video recording juror responses which will be described below, then on this screen the attorneys would have the option labeled "Listen and View Juror Responses." Thus, if this option is selected, attorneys would be advised to take confidential notes on not only the sincerity of the juror's voices but also their appearance and physical gestures or any other notes regarding the juror's appearance and voice that may be pertinent to making a peremptory challenge decision.

At the top of the screen of each Juror questionnaire that is viewable by the attorneys, there is a rating system from 1-10 to mark the strength of the attorney's desire to exclude a juror with a peremptory challenge which appears to the left of each juror's name or anonymous number. Thus, this rating system consists of a rectangular box with a horizontal scroll bar affixed to the bottom. To the left of the box is the word "Keep." To the right of the box is the word "Exclude." When the scroll bar moves from left to the word exclude, the number from 1-10 increases.

Thus, the higher the number between 1 and 10 the stronger the attorney's desire to exclude the juror with a peremptory challenge. Thus, such a rating is simply to help the attorney remember his initial impression of the juror's questionnaire upon reviewing after the attorney has reviewed all of the juror questionnaires. When the attorney has finished reading a juror's questionnaire, has made confidential notes, and has rated the juror from 1-10, the attorney then selects "Next Juror" and repeats this process for each juror questionnaire that is eligible for exclusion.

B. Strike Process

If the judge decides that peremptory challenges must be exercised through the invention with the "Strike Process," the judge will be presented with 3 options: 1) Set the deadlines for both the Plaintiff Attorney and the Defense Attorney to exercise their peremptory challenges a the same time. If this option is selected each attorney is allowed to exercise their allotted number of peremptory challenges on any of the jurors eligible for exclusion with peremptory challenges. Thus, each lawyer may duplicate their peremptory challenges with those of their counterpart. 2) Set the deadline for the Plaintiff Attorney at an earlier date than that of the Defense Attorney which would allow him to prevent duplicating his peremptory challenges with the Plaintiff Attorney. Thus, if this method is chosen the Defense Attorney will only be able to exercise his peremptory challenges on the jurors who are eligible for exclusion who have not already been excluded with the Plaintiff Attorney's peremptory challenges. 3) Set one deadline and exact time where both attorneys log onto the website at the same time and alternate their peremptory exercises back and forth until they have none left to exercise or they are satisfied with the jurors remaining.

1) Strike Process: Peremptory Challenge Submission Process for Attorneys Submitting at the Same Time or the Plaintiff Attorney Submitting at an Earlier Date than the Defense Attorney.

In the Strike Process, the peremptory challenge submission process for both attorneys submitting their peremptory challenges at the same time or the Plaintiff Attorney submitting his peremptory challenges at an earlier date than that of the Defense Attorney is identical with the only exception being the respective deadlines each attorney is to submit their peremptory challenges.

Thus, regardless of whether the judge elects to have both attorneys submit their peremptory challenges at the same time or have the Plaintiff Attorney submit at an earlier date than that of the Defense Attorney, attorneys, after having read each juror's questionnaire, made notes on each questionnaire, and assigned a rating from 1-10, will be instructed to submit their peremptory challenges by selecting the option of "Peremptory Challenge Submission Screen" in the bottom margin of the screen.

On the submission screen, the names or anonymous numbers of jurors will appear with their respective notes directly below them. Additionally, the rating number from 1-10 will appear to the left of each juror name or Anonymous number. The names or anonymous numbers of the Jurors on the submission screen are interactive. If an attorney clicks on the name, the Juror's questionnaire appears on the screen in full with the options of listening to the juror respond. On the submission screen, attorneys can quickly view the confidential notes that they typed for each juror's questionnaire and compare questionnaires. They can also view their initial ratings from 1-10 on each juror.

Also, to the left of each juror's name or anonymous number appears a small square box labeled "Strike." By clicking in this strike box, a check mark will appear. Only check marks in the "Strike" box will remove a juror with a peremptory challenge upon clicking submit at the bottom of the screen. At the top of the screen, the judicial limit of peremptory challenges appears with the number of check marks in the "strike" box appearing to the right of this limit. Attorneys are not allowed to exercise peremptory challenges over the judicial limit. Therefore, attorneys will have to take out check marks in the strike boxes of jurors until they are at the limit. After the attorneys have made check marks in the strike boxes and have not made marks over the limit, they are instructed to select submit. Only upon selecting submit will the check marks in the strike box remove a juror with a peremptory challenge. The notes attorneys type for each juror will not be made accessible to the Judge or opposing counsel or anyone. They are completely confidential.

2) Strike Process: Referring to Both Attorneys Submitting their Peremptory Challenges at the Same Time.

If attorneys were allowed to exercise challenges for cause, and the Plaintiff Attorney's deadline and the Defense Attorney's deadline were set at the same time and the judge selected the "strike process," both attorneys will be shown a rectangular box labeled "jurors excluded with challenges for cause." The names or anonymous numbers of jurors inside the box will be interactive. Thus, both attorneys will then be shown the same box labeled "Jurors eligible for exclusion with peremptory challenges. Thus, both attorneys will be allowed to exercise their peremptory challenges on these jurors eligible for exclusion.

If the judge selects the "Strike Process" and sets both attorneys' deadlines at the same time for the exercise of their peremptory challenges and the judge has selected challenges for cause, both attorneys will be sent email messages to submit their peremptory challenges after challenges for cause have been completed. If either attorney does not submit their peremptory challenges within their respective deadline, the judge may reject immediately before they submit. If the judge rejects, both attorneys are notified with an email message of the attorney who did not submit within the deadline and they will receive the order rejecting his peremptory challenges. Additionally, the court reporter will be notified with an email message that she must now log onto the website and print this court order as well as the email message to the attorney notifying him that he is permitted to submit his peremptory challenges. As long as the judge does not log onto reject, either attorney is still allowed to submit their peremptories. Once they submit after the deadline, the judge once again has the right to reject. If he rejects both attorney and court reporter are sent the court order rejecting. If the judge accepts an attorney's late peremptories and the judge has allowed attorneys to exercise *Batson* challenges through the invention, the judge may reset the deadline for when opposing counsel may submit his *Batson* challenges to a later date.

If the judge elected to have both attorneys submit their peremptory challenges at the same time for the selection of the panel, and the judge elected to have the alternates chosen separately and after the complete selection of the jury panel, both attorneys will also be instructed to submit their peremptory challenges at the same time for the selection of alternates. Thus, the judge will be instructed to only set one deadline for attorneys to submit peremptory challenges on the alternates.

3) Strike Process: Referring to Plaintiff Attorneys Submitting His Peremptory Challenges at an Earlier Date than that of the Defense Attorney.

Thus, if the Judge has selected the option of allowing attorneys to exercise challenges for cause, and the judge has selected the "Strike Process" and the judge has opted to have the Plaintiff Attorney exercise his peremptory challenges before the Defense Attorney, the Plaintiff Attorney will be allowed to exercise peremptory challenges after the Judge submits rulings on the Defense Attorney's challenges for cause and the Plaintiff Attorney's respective rebuttals. The judge is instructed to set the Plaintiff Attorney's deadline for sometime after he has had adequate time to issue rulings on the challenges for cause and rebuttals for both attorneys. He will then be instructed to set the defense attorney's judicial deadline for sometime after the plaintiff attorney's judicial deadline. After the Judge makes such rulings, he will have the option of resetting the judicial deadlines for the Plaintiff Attorney and the Defense Attorney to submit their peremptory challenges to a later date due to any delay caused by the attorneys in submitting their challenges for cause and rebuttals or the Judge submitting rulings on them. Once the Judge make such rulings, the Plaintiff Attorney and Defense Attorney are then sent email messages to their personal email account informing them that the Plaintiff Attorney may now exercise his peremptory challenges. If the Judge resets the Judicial deadline, such deadline will be included in the email.

If the Judge did not allow attorneys the option of exercising challenges for cause and the judge has selected the "Strike Process" and elected to have the Plaintiff Attorney submit peremptories first, the Plaintiff Attorney may exercise his peremptory challenges after the Judge has viewed the answered juror questionnaires and after the Judge submits the answered juror questionnaires to the attorneys for viewing. The judge is instructed to set the deadline for the Plaintiff Attorney to be sometime after he has had adequate time to review juror responses and submit juror responses to attorneys for viewing. The judge is then instructed to set the defense attorney's judicial deadline for sometime after the plaintiff attorney's deadline. Thus, after the Judge submits the questionnaires to the attorneys for viewing, the Plaintiff Attorney is sent an email message to his personal email account notifying him that he may now exercise his peremptory challenges. Additionally, after the Judge views the questionnaires, he will have the option of resetting the deadlines for attorneys to exercise their peremptory challenges if their was any delay caused by the Jurors not responding to the questionnaires within the deadline or the Judge viewing the questionnaires. Thus, if new deadlines are set, both attorneys are sent emails notifying them of the new dates.

If the attorneys were allowed to exercise challenges for cause, and the judge set the Plaintiff Attorney's deadline at an earlier date then that of the Defense Attorney, and the judge selected the "Strike Process," any jurors that were excluded with challenges for cause will have their names or anonymous numbers appear in a rectangular box with a horizontal scroll bar affixed to the bottom. The names or anonymous numbers inside this box are interactive. If an attorney wishes to view a name or number, he simply clicks on it and its respective questionnaire appears in full.

Also, appearing with this questionnaire are the options of listening to the jurors respond and/or if the judge selected the option of viewing jurors respond, the option of viewing the juror respond will appear. Attorneys are instructed that they are not allowed to exercise their peremptory challenges on those jurors in this box since they have already been excluded with challenges for cause. Thus, all jurors who have not been excluded with a challenge for cause will appear in a separate rectangular box with scroll bar affixed to the bottom and interactive juror names or anonymous numbers. This box will have a label above entitled remaining jurors subject to peremptory challenges.

This box will be directly below the box containing juror names or numbers who have been excluded with challenges for cause. Thus, the Plaintiff Attorney is instructed that he must exercise his peremptory challenges on any of the names or numbers appearing in this box. After the Plaintiff Attorney exercises his peremptory challenges, the Defense Attorney will be shown not only the box of juror names or numbers that have been excluded by challenges for cause, but also a box below it entitled Jurors Excluded with Plaintiff Attorney's Peremptory Challenges. Thus, the box contains interactive names or numbers of jurors who were excluded with the Plaintiff Attorney's peremptory challenges. Directly below this box will be another rectangular box containing interactive names or numbers of jurors still remaining and subject to peremptory challenges. The Defense Attorney is then instructed that he may only exercise his peremptory challenges on the juror names or numbers appearing in the box entitled "Remaining Jurors Subject to Peremptory Challenges.

If attorneys were not allowed to exercise challenges for cause, and the Plaintiff Attorney's deadline was set at an earlier date than that of the Defense Attorney, all juror questionnaires will be made viewable to the Plaintiff Attorney. Once the Plaintiff Attorney has exercised his peremptory challenges the Defense Attorney is still shown the box of juror names or numbers entitled Jurors Excluded with Plaintiff Attorney's Peremptory Challenges. Thus, the Defense Attorney is instructed that he may only exercise his peremptory challenges on the Remaining Jurors Subject to Peremptory Challenges.

If the judge selects the "Strike Process and sets the Plaintiff Attorney's deadline at an earlier date than that of the Defense Attorney, and if attorneys are allowed to exercise challenges for cause, the Plaintiff Attorney will only be shown the juror questionnaires that have not been excluded with challenges for cause by both attorneys. If attorneys were not allowed to exercise challenges for cause, the plaintiff attorney is allowed to view all juror questionnaires. If the Plaintiff Attorney does not submit his peremptory challenges within the judicial deadline, the judge is notified with an email message that he may exercise the option of preventing the Plaintiff Attorney from submitting peremptory challenges.

If the Judge does not allow the Plaintiff Attorney to submit peremptory challenges, both the Plaintiff and Defense attorneys are sent email messages notifying them of this rejection and informing them that the Defense Attorney may now submit his peremptory challenges. After the Judge makes such a rejection, the Judge has the option of resetting the deadline for the Defense Attorney to submit peremptory challenges to a later date due to any delay caused by the Plaintiff Attorney.

This new deadline is then sent to both the Plaintiff and Defense Attorney in an email message. Additionally, the Court Reporter is sent an email message instructing her that she must now print the Court Order that the Plaintiff Attorney is prevented from submitting peremptory challenges due to not meeting the deadline. Also the Court Reporter is instructed to print the judicial deadline for the Plaintiff Attorney to submit peremptory challenges. Also, the Court Reporter is instructed to print, through the website, the email message sent to the Plaintiff Attorney notifying him that he may now submit his peremptory challenges. Such email message will contain the email address of the Plaintiff Attorney and the date it was sent to the Plaintiff Attorney. As long as the Judge does not reject the Plaintiff Attorney's peremptory challenges after the deadline, the Plaintiff Attorney is still allowed to submit peremptory challenges.

Once the Plaintiff Attorney submits his peremptory challenges, the Judge is again immediately notified with an email message that the Plaintiff Attorney has submitted his peremptory challenges and the Judge must make a decision to reject them or accept them. If the Judge accepts them, the Judge has the option of resetting the Defense Attorney's peremptory challenge deadline to a later date for any delay caused by the Plaintiff Attorney. The Defense Attorney and the Plaintiff Attorney are both notified with an email message informing them of the Defense Attorney's new deadline and that the Defense Attorney must now view the Plaintiff Attorney's peremptory challenge decisions and exercise peremptory challenges on the juror questionnaires that have not been excluded by the Plaintiff Attorney's peremptory challenges or both attorney's challenges for cause. Thus, the defense attorney will be provided with a list of juror names or anonymous numbers that the Plaintiff Attorney excluded with peremptory challenges.

The list of juror names or anonymous numbers excluded by the plaintiff attorney with peremptory challenges will appear in a narrow rectangular box with a scroll bar affixed to the bottom margin. The names or anonymous numbers are interactive. By clicking on a name or number, that juror's respective questionnaire will appear in full on the screen with the options of listening and/or viewing. Additionally, the juror names or anonymous numbers that were excluded by both attorneys with challenges for cause will also appear in a narrow rectangular box directly above the list of juror names or numbers excluded by the Plaintiff Attorney's peremptory challenges.

A scroll bar will be affixed to this box to allow the defense attorney to view the entire list inside this box. Finally, the defense attorney will be shown a list of questionnaires that were not excluded by both attorneys challenges for cause or the plaintiff attorney's peremptory challenges. This is the list the defense attorney is to exercise his peremptory challenges from. Thus, if the defense attorney wishes to view such an excluded questionnaire, he simply click's on it in its respective list above. The Court Reporter is sent an email message notifying her that she must now print the Plaintiff Attorney peremptory challenges, the date they were submitted, and the respective judicial deadline.

The Court Reporter is instructed to print, through the website, the email message sent to the Plaintiff Attorney notifying him that he may now submit his peremptory challenges. Such email message will contain the email address of the Plaintiff Attorney and the date it was sent to the Plaintiff Attorney. If the Judge rejects the Plaintiff Attorney's peremptory challenges, both the Plaintiff Attorney and the Defense Attorney are notified of this decision, and they are both notified that the Defense Attorney may now submit his peremptory challenges on any of the juror's who responded to a questionnaire and were not previously excluded by a challenge for cause. Thus, the defense attorney will only be allowed to exercise his peremptory challenges on the juror questionnaires that were not excluded by both the plaintiff and defense attorneys challenges for cause.

An interactive list of juror names or anonymous numbers will appear in a narrow box at the top of the screen for jurors who were excluded by both attorneys' challenges for cause with a scroll bar affixed to the bottom. To view an excluded juror's questionnaire, the defense attorney simply clicks on the name or number and it will appear in full on the screen. The Court Reporter is then notified with an email message that she must now print the Plaintiff Attorney's submitted peremptory challenges, the date they were submitted, the respective judicial deadline, and the Court Order rejecting them from consideration due to the Plaintiff Attorney's untimely submissions.

Also, the Court Reporter is instructed to print, through the website, the email message sent to the Plaintiff Attorney notifying him that he may now submit his peremptory challenge. Such email message will contain the email address of the Plaintiff Attorney and the date it was sent to the Plaintiff Attorney. If the Plaintiff Attorney submits his peremptory challenges within the respective Judicial deadline, the Defense Attorney is automatically notified with an email message that he may now submit his peremptory challenges. The Court Reporter is notified that she must print the Plaintiff Attorney's peremptory challenges, the date they were submitted, and the respective judicial deadline. Also, the Court Reporter is instructed to print, through the website, the email message sent to the Plaintiff Attorney notifying him that he may now submit his peremptory challenges. Such email message will contain the email address of the Plaintiff Attorney and the date it was sent to the Plaintiff Attorney. The Judge is then sent an email message notifying him that he may now view the date the Plaintiff Attorney submitted the peremptory challenges and compare it with the judicial deadline, and view the Plaintiff Attorney's peremptory challenge exercises.

Once the Defense Attorney is allowed to exercise peremptory challenges, he exercises them in the exact same way the Plaintiff Attorney exercised his peremptories. Also, the exact same options provided to the Judge in regards to deadlines and viewing for the Plaintiff Attorney's exercising of peremptory challenges applies to the Defense Attorney when he exercises peremptories. Finally, the Court Reporter's functions of printing are also the same for the Defense Attorney as they were for the Plaintiff Attorney. If the Defense Attorney causes delay, the judge may reset the deadlines for *Batson* challenges if attorneys are allowed to exercises *Batson* challenges. If the judge elected to have the Plaintiff Attorney submit his peremptory challenges at an earlier date than that of the Defense Attorney for the selection of the jury panel, and the judge elected to have the alternates chosen separately and after the complete selection of the jury panel, both attorneys will also be instructed that the Plaintiff Attorney will submit his peremptory challenges at an earlier date than that of the Defense Attorney for the selection of alternates. Thus, the judge will be instructed to set the deadline for the Plaintiff Attorney to submit peremptory challenges for the selection of alternates at an earlier date than that of the Defense Attorney.

4) Strike Process: Both Attorneys Logging on to Website on the Same Date and Time and Exercising Their Peremptory Challenges by Alternating Back and Forth.

If the alternating method of the Strike Process is selected the judge, the judge sets the exact date and time when both attorneys are to log onto the website to exercise their peremptory challenges. The judge also sets the number of minutes each lawyer is to have to make a peremptory challenge decision. For example, the judge may select that each attorney is to have 5 minutes to make a decision. When both attorneys log onto the website at the scheduled date and time, the Plaintiff Attorney is automatically designated to exercise a peremptory challenge first. Once the Plaintiff Attorney exercises his first peremptory challenge, the Defense Attorney is then instructed to exercise his first peremptory challenge. Each attorney will be shown a digital clock on their screen that counts down the allotted time they have to make a decision. This digital clock counts down minutes and seconds. If an attorney does not make a decision within 5 minutes, his peremptory challenge is forfeited, and the opposing attorney is then allowed to exercise another one of his peremptory challenges. If a lawyer fails to log on at the designated time, the software will continue to alternate and each time the time limit expires that attorney will lose a peremptory challenge until the process is complete.

Before this date and time they are scheduled to log onto the website and alternate their peremptory challenges, each lawyer will be notified with an email message telling them to log onto the website and pre-rank or pre-order the jurors on the list with jurors most desired for exclusion with peremptory challenges receiving a higher ranking. The purpose of this ranking process is to prepare lawyers to make their desired peremptory challenges within the limited time constraints when they both log onto the website and exercise their peremptory challenges by alternating back and forth. If the judge allowed the attorneys to exercise challenges for cause, the lawyers will receive this email notification directly after all challenges for cause and/or rebuttals have been ruled upon by the judge. If the judge did not allow attorneys to exercise challenges for cause, the lawyers will receive this email message after the judge has submitted the juror responses to the attorneys and court reporter for viewing and printing.

Thus, if the Judge selects the "Strike Process" with lawyers logging onto the website on the same date and time and exercise their peremptory challenges by alternating back and forth, the lawyers, after having reviewed each juror's questionnaire eligible for exclusion and having made confidential notes and having rated each juror, will be instructed to select the option of "Peremptory Challenge Ranking Screen" in the bottom margin of the screen the lawyer reviewed all juror questionnaires.

Thus, on the peremptory challenge ranking screen, the lawyers will be shown the complete list of names or anonymous numbers eligible for exclusion. The lawyer will be instructed to rank each questionnaire from the most desired questionnaire to be excluded having the rank of 1 and the juror questionnaire least desired to be removed being the equivalent of the entire number of jurors eligible for exclusion. Thus, on the ranking screen, the names or anonymous numbers of jurors will appear with their respective confidential notes directly below them. Additionally, the rating number from 1-10 will appear to the left of each juror name or anonymous number. The names or anonymous numbers of the Jurors on the ranking screen are interactive. If an attorney clicks on the name, the Juror's questionnaire appears on the screen in full with the options of listening to the juror respond. On the ranking screen, attorneys can quickly view the confidential notes that they typed for each juror's questionnaire and compare questionnaires. They can also view their initial ratings from 1-10 on each juror. Thus, such ratings will help the attorneys rank each juror.

Also, to the left of each juror's name or anonymous number appears a small square box labeled "Rank." Lawyers are instructed to type the number of the ranking they wish to assign to each juror's questionnaire in their respective box next to their name or anonymous number. Each time a lawyer puts a ranking number in the box of a juror, the software automatically places the juror's name or anonymous number in its sequential ranking order on a separate list in the left margin of the screen.

Once the lawyers rank each juror name or anonymous number, they are advised to log onto the website on the scheduled date and time and make their selections by alternating back and forth. When each lawyer logs onto the website to alternate their peremptory challenges, they will be shown a numerical list. Both attorneys exercise their peremptory challenges from this same list. On the Plaintiff Attorney's screen to the left of this list will be his personal and confidential list of the jurors he pre-ranked that will not appear to the Defense Attorney. This list will be the juror's names or anonymous numbers the Plaintiff Attorney has ranked in order with the juror's name or anonymous number most desired to be excluded with a peremptory challenge with the highest ranking of one. The names or anonymous numbers on this ranked list are interactive. By clicking on a name on the ranked list, that jurors questionnaire and confidential notes will appear on the screen along with the option of listening to the juror respond and/or viewing. Likewise, on the Defense Attorney's screen to the left of the list of jurors he is to exercise his peremptory challenges on will appear his personal and confidential interactive list of jurors he wishes to exclude with peremptory challenges with the jurors most desired to be excluded with higher rankings. Thus, the Defense Attorney's list will not be made viewable to the Plaintiff Attorney.

The Plaintiff Attorney will be designated to go first and he will put a check mark in a small square box to the left of the juror's name or anonymous number that he wishes to exclude with a peremptory challenge. Thus, the Plaintiff Attorney is instructed before logging onto the website that the count down will begin at the exact time attorneys are to have logged on with the Plaintiff Attorney being the first to exercise a peremptory challenges.

When the Plaintiff Attorney places this check mark in the square box, a strike through line will automatically appear through the juror's name or anonymous number. This strike through line and check mark will appear on both the Plaintiff Attorney's screen and the Defense Attorney's screen. On the top left corner of the screen their will be the words Plaintiff Attorney and on the top right corner of the screen their will be the words Defense Attorney. Below their names will be the judicially allotted number of peremptory challenges each attorney is allowed to exercise. To the immediate right of this number will be the number of peremptory challenges each attorney has made. For example, if each attorney is allowed 15 peremptory challenges, the number 15 will appear to the left by the words judicial limit. After the Plaintiff Attorney exercises his first peremptory challenge, the number one will appear to the left of the judicial limit of 15 and under the words number exercised.

Also, at the top of the screen will be a digital clock that will count down the minutes and seconds that the judge has limited for each attorney to submit a peremptory challenge before the peremptory challenge decision alternates to the opposing attorney. Thus, once this clock counts down to zero, the attorney is precluded from exercising his peremptory challenge and the opposing attorney is then allowed to exercise a peremptory challenge.

After the Plaintiff Attorney makes a strike, the check mark next to the juror and strike through line will simultaneously appear on the Defense Attorney's screen, and the Defense Attorney will be instructed that it is his turn to select. This process will go back and forth until the attorneys have maxed out their peremptory challenges or they select the option that they are finished.

To further clarify and illustrate this process, the list that each attorney exercises his peremptory challenges on is the same and is viewable in black type with a square box to the left of each juror name or anonymous number. For example, to exercise a peremptory challenge, the number one ranked juror to be excluded on the Plaintiff Attorney's confidential ranked list is "John Smith." The Plaintiff Attorney simply finds John Smith on the list of jurors viewable by each attorney and places a check mark in the box next to John Smith. A strike through line will appear through the name of John Smith on this list as well as the confidentially ranked list of the Plaintiff Attorney. After the selection, the Plaintiff Attorney will be asked if he is sure he wanted to make that selection. If he is sure he selects submit and the Defense Attorney is then notified that he must now select. He too is provided with the same features such as his confidential interactive list of ranked jurors, the count down digital clock etc. This process goes back and forth until both lawyers have exhausted their peremptory challenges.

Furthermore, if a lawyer does not log onto the website, he will forfeit his peremptory challenge at the end of each count down that he does not exercise a peremptory challenge on. Also, appearing on both attorneys' screens will be the judicially scheduled date and time each attorney was to have logged onto the website to exercise their peremptory challenges and to the left of this will be the current date and time.

Also, the Court Reporter will be sent an email message notifying her to print each juror excluded by the Plaintiff Attorney and each juror excluded by the Defense Attorney. Thus, in the Court Reporter program, each attorney's peremptory challenge exercises on the list of jurors will be on separate distinguishable lists. Also, the exact time and date each juror was excluded will be on each attorney's respective list. Also, the Court Reporter will be instructed to print the email messages sent to both attorneys informing both attorneys of the exact time and date each attorney was to log onto the website. These email messages will contain the date they were sent as well as the respective email addresses of each attorney they were sent to.

If this alternating system is used, the judge will have to coordinate with both attorneys in setting an exact date and time when both attorneys may log onto the website to alternate the exercising of their peremptory challenges. Therefore, the Plaintiff Attorney will be sent an email message instructing him to type in several proposed dates and times for when he will be able to log onto the website and alternate his peremptory challenges with the Defense Attorney. Thus, the Plaintiff Attorney will be instructed to enter at least 5 proposed dates and times. When the Plaintiff Attorney enters these proposals, he simply selects submit date and time proposals to the Defense Attorney. The Defense Attorney is then sent an email message to log onto the website and either select a one of the proposed dates and time of the Plaintiff Attorney. If the Defense Attorney selects one of these proposed dates, the Plaintiff Attorney, Defense Attorney, Judge, and Court Reporter are then sent email messages informing them of the exact date and time both attorneys are to log onto the computer and exercise their peremptory challenges by alternating with the Plaintiff Attorney going first.

If the Defense Attorney cannot alternate his peremptory challenges with the Plaintiff Attorney on any of the Plaintiff Attorney's proposed dates, the Defense Attorney is then instructed to submit counter proposals of at least five exact date and times when he may be able to log onto the website and alternate peremptory exercises. Once he selects the option of submitting date and time proposals to the Plaintiff Attorney, the Plaintiff Attorney is then sent an email message to log onto the website to select a date and time or resubmit new counter proposals. This process may continue back and forth until they can agree on a date and time to log onto the website to alternate their peremptory challenge exercises. Also, the Court Reporter is sent an email to print the submitted date and time proposals that each attorney sends to his counterpart as to when they may log onto the website and alternate their peremptory challenge exercises. Also, when both attorneys agree on a specific date and time to alternate their peremptory exercises, the judge is sent an email message notifying him of this date and time and that he is to log onto the website and type in this date and time and submit it to both attorney and the court reporter in the form of an order. Thus, the attorneys are then sent an email message confirming the date and time each attorney is to log onto the website and alternate their peremptory challenge exercises. The Court Reporter is also sent an email message notifying her to print this order of the date and time.

Also, if the Defense Attorney strikes a juror on the list, that is also on the confidential ranked list of the Plaintiff Attorney, a strike through line will appear through the name of that respective juror on the Plaintiff Attorney's confidential ranked list. Likewise, if the Plaintiff Attorney exercises a peremptory challenge that was on the confidential ranked list of the Defense Attorney, a strike through line will appear through that juror's name or anonymous number on the Defense Attorney's confidential list. If the judge elected to have both attorneys submit their peremptory challenges by logging onto the website at the same time and alternating for the selection of the panel, and the judge elected to have the alternates chosen separately and after the complete selection of the jury panel, both attorneys will also be instructed to submit their peremptory challenges by logging onto the website at a designated time for the selection of alternates. Thus, the judge will be instructed to set a specific time and date for attorneys to submit peremptory challenges on the alternates by alternating back and forth.

C. Panel Process

In conventional jury selection some jurisdictions allow jurors to be selected with the panel system where the lawyers are only allowed to question the jurors making up the panel and the allotted number of alternates. They are not allowed to question the rest of the people in the pool. The Plaintiff Attorney exercises peremptory challenges first. The jurors excluded by the Plaintiff Attorney are replaced with new jurors from the pool. The Plaintiff Attorney then ask those new jurors the same questions. Upon questioning these new jurors, the Plaintiff Attorney may strike any of them with a peremptory challenge and then replace them with new jurors. The Plaintiff Attorney can do this until he runs out of peremptory challenges, or if he is satisfied with the new jurors questioned and still has peremptory challenges remaining, he may tender the panel to the Defense Attorney. The Defense Attorney then exercises peremptory challenges and the jurors excluded are replaced. The Defense Attorney then asks the new jurors the same questions. The Defense Attorney can strike any of the new jurors and upon their replacements he can question them and either strike them or tender the panel back to the Plaintiff Attorney. This tendering of the panel between the Plaintiff Attorney and the Defense Attorney goes on until the attorneys have maxed out their peremptory challenges or they are satisfied with the panel and alternates.

The invention allows for this "Panel Process." If the Judge selects the "Panel Process" for peremptory challenge exercises, each attorney is only able to view the questionnaires of the jurors eligible for exclusion. The judge sets the deadline for when the Plaintiff Attorney is to have the panel tendered to the Defense Attorney for the first time. The Plaintiff Attorney then logs onto the website and submits peremptory challenges on the jurors he wishes to exclude. For example, if the Plaintiff Attorney excludes three jurors out of the 14 questionnaires, the software will automatically provide him with 3 new juror names or anonymous numbers from the jury pool. He will then be advised to review their questionnaires and strike any of them if he has peremptory strikes remaining. If he strikes any of the new jurors, he will then be provided with new questionnaires equal to the number of jurors he just excluded. He may continue this process until he is satisfied with the panel or he runs out of peremptory challenges. If he is satisfied with the new juror questionnaires shown, he will be advised to select the option "Tender to Defense Attorney." If he runs out of peremptory challenges, the panel will automatically be tendered to the Defense Attorney. Once he selects "Tender to Defense Attorney," the Defense Attorney is sent an email to his personal email account informing him that he must now log onto the website and begin the same process. At the top of each attorney's screen will be the Plaintiff Attorney's judicial limit of peremptories and the number of peremptories he had exercised in the top left corner, and to the top right corner, will be the Defense Attorney's judicially limited number of peremptory challenges and the number of peremptories he had excluded.

If the judge selects the panel system, he will set the deadline for the first time the Plaintiff Attorney is to tender the panel to the Defense Attorney. The judge will also set a deadline for when the Defense Attorney is to have tendered the panel back to the Plaintiff Attorney. The judge must set the deadline for the Plaintiff Attorney to be at an earlier date than that of the Defense Attorney to simulate the conventional panel process in traditional jury selection. Additionally, the Judge will initially set four deadlines for the Plaintiff Attorney to tender the panel to the Defense Attorney and initially set four deadlines for the Defense Attorney to tender the panel back to the Plaintiff Attorney. If either attorney tenders the panel more than four times, the judge will have to set new deadlines for each attorney to tender the panel.

If the panel process is selected and, for example, the Plaintiff Attorney does not exercise any peremptory challenges and does not tender the panel by the deadline, the judge immediately will be sent an email message to his personal email account notifying him that he may now tender the panel to the Defense Attorney or wait for the Plaintiff Attorney to tender the panel. If the judge does not tender, the Plaintiff Attorney may still exercise peremptory challenges and tender the panel. If the judge decides to tender the panel and the Plaintiff Attorney had not exercised any peremptory challenges, the Plaintiff Attorney will be deemed to be satisfied with the panel, and the Defense Attorney will be allowed to exercise his peremptory challenges.

Thus, if the Plaintiff Attorney does not tender, and the judge then tenders the panel to the Defense Attorney, and the Defense Attorney then exercises three peremptory challenges, the Defense Attorney then reviews the new juror questionnaires that replaced the juror questionnaires he struck with peremptory challenges. The Defense Attorney is satisfied with the three new juror questionnaires. He then tenders panel back to the Plaintiff Attorney. The Plaintiff Attorney then may only exercise his peremptory challenges on the three new jurors due to the fact that he was deemed to be satisfied with the rest of the panel when he did not exercise any peremptory challenges or tender the panel.

If the judge decides to wait for the Plaintiff Attorney to exercise his peremptory challenges and tender the panel, the judge may extend the Defense Attorney's deadline for tendering the panel back to the Plaintiff Attorney. Thus, the judge will have these same options if the Defense Attorney does not tender the panel back to the Plaintiff Attorney by the deadline. Likewise, if the Defense Attorney does not exercise any of his peremptory challenges and he does not tender, he will be deemed to be satisfied with any jurors not excluded by the Plaintiff Attorney when the panel is tendered back to the Defense Attorney. This tendering process will continue back and forth until each attorney has run out of peremptory challenges or each attorney does not exercise a peremptory challenge on any freshly replaced jurors.

If either attorney has exercised peremptory challenges on jurors in the panel, but they do not tender within the deadline, the judge may wait for the attorney to exercise more peremptory challenges if the attorney still has peremptories remaining or the judge may tender to the opposing attorney. If the judge tenders, any peremptory challenges exercised before this tendering will remain as long as the attorney is within his limit of peremptory challenges. Thus, tendering is not necessary for the peremptory challenges to be properly exercised.

Furthermore, if either attorney does not tender the panel by the deadline, the judge has the option of resetting the opposing attorney's deadline for tendering to a later date due to any delay caused by the attorney.

To further clarify, if the judge tenders the panel to the Defense Attorney due to the Plaintiff Attorney's delay, the Plaintiff Attorney will be deemed to be satisfied with the panel. If the Defense Attorney exercises, for example, two peremptory challenges and is satisfied with the two replacement jurors and tenders back to the Plaintiff Attorney, the Plaintiff Attorney may only exercise any of his remaining peremptory challenges on the two new replacement jurors since he was deemed to be satisfied with the rest of the panel when the Judge tendered the panel to the Defense Attorney. These same rules apply to the Defense Attorney if he does not tender the panel to the Plaintiff Attorney within the deadline.

When each attorney runs out of peremptory challenges or the tendering stops, the judge is notified with an email message informing him that he may now review the peremptory challenges, and if attorney's are allowed to exercise *Batson* challenges, they will both be notified with email message that they may begin exercising *Batson* Challenges.

Furthermore, if the judge selects the panel process, as stated above, the each lawyers first task will be to review each juror's questionnaire eligible for exclusion with a peremptory challenge. The attorneys take confidential notes on each juror's questionnaire and rate each juror's questionnaire from 1-10. After the lawyers review, make confidential notes, and rate each juror in the panel process, they are instructed to select "Peremptory Challenge Submission & Tendering Screen."

On the submission and tendering screen, the names or anonymous numbers of jurors will appear with their respective notes directly below them. Additionally, the rating number from 1-10 will appear to the left of each juror name or anonymous number. The names or anonymous numbers of the Jurors on the submission screen are interactive. If an attorney clicks on the name, the Juror's questionnaire appears on the screen in full with the options of listening to the juror respond. On the submission and tendering screen, attorneys can quickly view the confidential notes that they typed for each juror's questionnaire and compare questionnaires. They can also view their initial ratings from 1-10 on each juror.

Also, to the left of each juror's name or anonymous number appears a small square box labeled "Strike." By clicking in this strike box, a check mark will appear. Only check marks in the "Strike" box will remove a juror with a peremptory challenge upon clicking "Submit" at the bottom of the screen. Also, in the bottom margin of the screen to the right of this submit button is a button labeled "tender." By selecting tender, the panel will be tendered to opposing counsel. Attorneys are instructed to not select tender until they have reviewed any replacement juror questionnaires after they have submitted peremptory exercises and are completely satisfied with the new questionnaires. Thus, if they wish to exercise peremptory challenges on any of the new replacement questionnaires, they may do so by making a check mark and selecting submit. Thus, each time a check mark is placed and the submit button is selected, the marked questionnaire is excluded with a peremptory challenge and replaced with a new questionnaire until the attorney runs out of peremptory challenges. Therefore, attorneys are sternly warned against tendering the panel to opposing counsel until they are completely satisfied with the panel.

At the top of the screen, the judicial limit of peremptory challenges appears with the number of check marks in the "strike" box appearing to the right of this limit. Attorneys are not allowed to exercise peremptory challenges over the judicial limit. Therefore, attorneys will have to take out check marks in the strike boxes of jurors until they are at the limit. After the attorneys have submitted any desired peremptory challenges with in the limit and are satisfied with the panel and any replacement jurors in the panel, they are advised to select "Tender." Thus, upon selecting tender the opposing attorney will be notified with an email message to his personal email account notifying him that he may now submit peremptory challenges and then tender back to his counterpart upon being satisfied with the panel.

Thus, when the panel is tendered back to an attorney, the attorney may only question any newly replaced jurors of his counterpart and exercise any remaining peremptory challenges on these jurors and their subsequent replacements.

If the judge elected to have peremptory challenges exercised by the panel process to select the jury panel, and the judge elected to have the alternates chosen separately and after the complete selection of the jury panel, both attorneys will also be instructed to use the panel process to exercise their peremptory challenges for the selection of alternates. Thus, the judge will be instructed to set the deadline for the Plaintiff Attorney to have tendered the panel to the Defense Attorney at an earlier date than the Defense Attorney is to tender the panel back to the Plaintiff Attorney. For example, if a jury panel is to have two alternates, the Plaintiff Attorney will only be shown two new juror questionnaires from the jury pool. He will then have an option of exercising a peremptory challenge or tendering to the Defense Attorney etc.

4. Panel Process Allowing Attorneys to Exercise Challenges for Cause WITH Listening and/or Viewing and Exercise Peremptory Challenges WITH Listening and/or Viewing Before Tendering the Panel to Their Counterpart.

If the judge selects this option, jurors will be selected with the panel process through the website and attorneys will be allowed to exercise not only peremptory challenges WITH listening and/or viewing before tendering the panel to their counterpart, but they will also be able to exercise challenges for cause WITH listening and/or viewing before tendering the panel to their counterpart.

If the judge selects this option, he must first decide if he wants to have alternate jurors chosen at the same time as the panel or after the panel has been completely selected. The judge will then be instructed to enter the number of jurors eligible to be excluded with challenges for cause WITH listening and/or viewing and peremptory challenges WITH listening and/or viewing. If the judge elects to have alternates selected at the same time as the jury panel, this number should be equal to the number of jurors to be empaneled plus the number of alternates.

If the judge elects to have alternates selected separately and after the panel is selected, the number eligible for the jury panel should only be the equivalent of the number of jurors to be empaneled. The judge must then enter the number of juror eligible to be excluded with challenges for cause and peremptory challenges for alternates which should be the equivalent of the number of alternates to be selected. Also, the judge must set deadlines for when the alternates should be selected which will be after the jury panel is completely selected.

The judge will also select whether or not attorneys will be allowed to submit rebuttals to their counterpart's jury selection questions. Only if the judge elects to allow attorneys to submit rebuttals to their counterpart's challenges for cause, the judge must enter the number of hours or day(s) each attorney will have to submit rebuttals to their counterpart's challenges for cause after their counterpart submits challenges for cause. For example, once an attorney submits challenges for cause, and the judge has allowed attorneys to submit rebuttals within 48 hours, the opposing counsel will be sent an email message instructing him that he may now log onto the website and submit rebuttals to his counterpart's challenges for cause. Such email will include the date the challenges for cause were submitted. The email will also notify the attorney of the date and time he is to have submitted his rebuttals. Thus, if the judge allows attorneys 48 hours to submit rebuttals, and the Plaintiff Attorney, for example, submitted his challenges for cause on Mar. 5, 2005 at 5:00 p.m., the Defense Attorney's email message instructing him log onto the website and submit rebuttals will set the Defense Attorney's deadline for rebuttal submissions on Mar. 7, 2005 at 5:00 p.m. Thus, the software automatically adds the number of hours or days each attorney will have to submit rebuttals to the date and time an attorney submitted his challenges for cause.

Then the judge will first set a deadline for when the Plaintiff Attorney is to have exercised all challenges for cause and peremptory challenges and is to have tendered the jury panel to the Defense Attorney. This deadline will be after the jurors have responded to the questionnaire and after the judge has had adequate time to review and/or edit the questionnaires and after the Plaintiff Attorney has had adequate time to review the juror questionnaires and exercise challenges for cause and peremptory challenges. If the judge allows attorneys to submit rebuttals to their counterparts challenges for cause, the judge will be advised to provide the Plaintiff Attorney more time as necessary for the completion of these additional functions. Thus, he will be advised to take into account the number of hours each attorney is to be allotted for submitting rebuttals.

The judge will then set a deadline for when the Defense Attorney is to have exercised all challenges for cause and peremptory challenges and is to have tendered the jury panel back to the Plaintiff Attorney. This deadline will be after the Plaintiff Attorney's deadline for tendering the panel to the Defense Attorney and after the Defense Attorney has had adequate time to review the juror questionnaires and exercise challenges for cause and peremptory challenges. If the judge allows attorneys to submit rebuttals to their counterparts challenges for cause, the judge will be advised to provide the Defense Attorney more time as necessary for the completion of this additional function. Thus, he will be advised to take into account the number of hours each attorney is to be allotted for submitting rebuttals.

In this panel process of jury selection, the Plaintiff Attorney will be sent an email message notifying him, for the first time, to log onto the website and first submit any challenges for cause WITH listening and/or viewing he wishes to exercise on the juror questionnaires making up the jury panel and/or alternates. He will be sent this email message, after the judge has finished reviewing the juror responses and/or editing such responses and after the judge has submitted the juror questionnaire to the attorneys.

Thus, when the Plaintiff Attorney logs onto the website to exercise challenges for cause and peremptory challenges for the first time, he will only be shown the juror questionnaires making up the entire number of jurors eligible for exclusion which will be the number equivalent to the number of jurors to be empaneled and/or the number of alternates to be selected, if alternates are selected at the same time as the panel. The Plaintiff Attorney will then review these juror questionnaires in the same fashion as described above in the option labeled "Exercise Challenges for Cause WITH Listening and/or Viewing Jurors Respond to the Questionnaire." Thus, the Plaintiff Attorney will be provided with all the same features described in that section such as the jurisdiction's statute for excluding jurors with a challenge for cause appearing on every screen and the space designated at the bottom of the screen for explanations etc.

In the bottom margin of the Plaintiff Attorney's screen will be two options labeled as follows: 1) "Submit Challenges for Cause WITH Listening and/or Viewing, and 2) "Pass for Cause and Exercise Peremptory Challenges." After the Plaintiff Attorney reviews each juror questionnaire, he may submit challenges for cause through the process mentioned above by making the necessary check marks in the strike boxes, typing explanations for such challenges for cause, and then selecting the option labeled "submit challenges for cause WITH listening and/or viewing. If the Plaintiff Attorney submits such challenges for cause, and the judge has allowed attorneys to submit rebuttals within a designated time period, the Defense Attorney will then be sent an email message notifying him to log onto the website and submit any rebuttals. In such email message, the exact date and time the Defense Attorney is to submit the rebuttals is included. As mentioned above, the software automatically adds the number of hours or day(s) attorney are allowed to submit rebuttals to the date and time the challenges for cause were submitted. The Court Reporter will be notified with an email message informing her to log onto the website and print the submitted challenges for cause for transcript/appeal purposes.

After the Defense Attorney submits his rebuttals, the judge is then notified with an email message to rule on the plaintiff attorney's challenges for cause and the Defense Attorney's rebuttals. The Court Reporter is then sent an email message notifying her to log onto the website and print the Defense Attorney's rebuttals, the date they were submitted, the respective judicial deadline. If the judge does not allow rebuttals, he will be sent an email message to rule on the Plaintiff Attorney submits his challenges for cause to submit rulings. If the judge grants any of the Plaintiff attorney's challenges for cause, the software will then automatically replace any juror questionnaires excluded with a challenge for cause with new juror questionnaires from the jury pool that have not yet been reviewed. For example, if three of the Plaintiff Attorney's challenges for cause were granted, the Plaintiff Attorney will only be shown three new juror questionnaires that he has not yet reviewed. The Plaintiff Attorney will then be sent an email message notifying him that he may now log onto the website and exercise any challenges for cause on the 3 new juror questionnaires that he has not yet reviewed.

Thus, once the Plaintiff Attorney logs on to complete this task he will only be shown a list of the new juror questionnaires that he has not yet reviewed. He will once again be provided with all the features and options mentioned above for properly excluding jurors with challenges for cause through the software. Also, within the bottom margin of the Plaintiff Attorney's screen, he will once again be presented with the two options of "Submit Challenges for Cause WITH Listening and/or Viewing," and "Pass for Cause and Exercise Peremptory Challenges." For example, if the Plaintiff Attorney submits 1 challenge for cause on a juror questionnaire on a list of 3 new juror questionnaires and it is subsequently granted, the software will replace such questionnaire with a new juror questionnaire from the jury pool and the Plaintiff Attorney once again will be presented with an email instructing him to log on and exercise a challenge for cause on the new juror questionnaire. Thus, only one new juror questionnaire will appear.

If, for example, the Plaintiff Attorney does not wish to exercise a challenge for cause on this new juror, and he selects the option of "Pass for Cause and Exercise Peremptory Challenges, he will be shown all juror questionnaires originally appearing in the jury panel that have not previously been excluded with a challenge for cause including any new juror questionnaires that replaced any juror questionnaires excluded with challenges for cause that have not been excluded with a challenge for cause themselves.

The Plaintiff Attorney will then be allowed to review these questionnaires making up the panel and exercise peremptory challenges in the exact same manner as the panel process mentioned above under the option entitled "Exercise Peremptory Challenges WITH Listening and/or Viewing Jurors Respond to the Questionnaire." Also, in the bottom margin of the screen, the Plaintiff Attorney will be shown two options labeled as follows: 1) "Submit Peremptory Challenges," and 2) "Tender the Panel to the Defense Attorney."

For all peremptory challenges that were excluded, the software will then automatically replace such excluded questionnaires with new juror questionnaires from the jury pool that have not yet been reviewed by the Plaintiff Attorney. For example, if the Plaintiff Attorney was able to exclude 3 juror questionnaires with peremptory challenges, the Plaintiff Attorney will then be instructed that he may now review these 3 new questionnaires and either exercise challenges for cause on them or pass for cause and exercise peremptory challenges on these new questionnaires. Thus, once the Plaintiff Attorney logs on, he will once again be allowed to exercise challenges for cause on these 3 new jurors. If, for example, he exercises a challenge for cause on 1 of these new juror questionnaires and it is granted, the software will then replace the excluded juror's questionnaire with a new juror questionnaire. He will then be sent an email message instructing him that he may now submit another challenge for clause on the 1 new juror questionnaire or pass for cause and exercise peremptory challenges. If the Plaintiff Attorney passes for cause and exercises peremptory challenges, he will only be allowed to exercise peremptory challenges on the 3 new juror questionnaires that will include the new juror questionnaire that replaced a juror questionnaire excluded with a challenge for cause. Thus, for every new juror questionnaire that is excluded with a challenge for cause or peremptory challenge, the Plaintiff Attorney is first given an opportunity to exercise a challenge for cause on only the newly replaced juror questionnaires and if he does not wish to exercise such challenges for cause then he is given an opportunity to exercise peremptory challenges on any new juror questionnaires that he did not exclude with a challenge for cause.

If the Plaintiff Attorney does not wish to submit any more peremptory challenges, he will be advised to select "Tender the Panel to the Defense Attorney." Once the Plaintiff Attorney selects this option, he will be sent an email message informing him to log onto the website and begin submitting any challenges for cause on the juror questionnaires making up the panel. Thus, he will be shown all juror questionnaires making up the panel plus alternates, if alternates are selected at the same time. These juror questionnaires will consist of any juror questionnaires replaced by the Plaintiff Attorney and any other juror questionnaires that were not excluded by the Plaintiff Attorney at the time the Plaintiff Attorney tendered the panel to the Defense Attorney. Thus, the juror questionnaires that were presented and reviewed by the Plaintiff Attorney at the time the Plaintiff Attorney tendered the panel will also only appear to the Defense Attorney.

The exact process of exercising challenges for cause and peremptory challenges and replacing juror questionnaires for the Plaintiff Attorney mentioned above is also the exact same process the Defense Attorney will use to exercise challenges for cause and peremptory challenges in this panel process system. Thus, when the panel is tendered to the Defense Attorney for the first time, he will be allowed to exercise challenges for cause and/or peremptory challenges on all juror questionnaires included in the panel and alternates, if alternates are selected along with the panel. Thus, these juror questionnaires will contain any juror questionnaires replaced by the Plaintiff Attorney.

When the Defense Attorney tenders the panel back to the Plaintiff Attorney, the Plaintiff Attorney will only be allowed to exercise challenges for cause and/or peremptory challenges on any new juror questionnaires replaced by the Defense Attorney that the Plaintiff Attorney had not yet reviewed. Thus, once the Defense Attorney tenders the panel back to the Plaintiff Attorney, the judge is sent an email message informing him that he must enter a new deadline for the Plaintiff Attorney to tender the panel back to the Defense Attorney. Plaintiff Attorney will be sent an email message instructing him to log on review any newly replaced juror questionnaires by the Defense Attorney and either exercise challenges for cause and/or pass for cause and exercise peremptory challenges in the same manner mentioned above. Also, included in this email message will be the new deadline the judge set for the Plaintiff Attorney to tender the panel back to the Defense Attorney. Once the Plaintiff Attorney again tenders the panel back to the Defense Attorney, the Defense Attorney will only be allowed to exercise challenges for cause and/or pass for cause and exercise peremptory challenges on any newly replaced questionnaires by the Plaintiff Attorney that the Defense Attorney had not yet reviewed. The judge will be sent an email message instructing him to set a deadline for the Defense Attorney to tender the panel back to the Plaintiff Attorney. The Defense Attorney is then sent an email message notifying him that he may now submit any challenges for cause and/or pass for cause and exercise peremptory challenges on any new juror questionnaires replaced by the Plaintiff Attorney that he has not yet reviewed.

This tendering process will continue to go back and forth between the two attorneys until one attorney does not replace any of the juror questionnaires after the panel is tendered to him by his counterpart. Thus, if an attorney tenders the panel back to his counterpart without replacing any juror questionnaires and the counterpart had previously tendered the panel, the software will end this jury selection process and will send email messages to both attorneys, the judge, and Court Reporter notifying them that the process is over and completed. The Court Reporter will be additionally notified that she must now log onto the website and print the final juror questionnaires that will make up the jury panel plus alternates if alternates were to be selected at the same time as the panel. Each time an attorney tenders the panel to his counterpart, the judge first sets a deadline for when the counterpart must tender the panel back after each attorney has tendered the panel for the first time.

If an attorney does not tender the panel within the deadline, the judge will be notified with an email message informing him that he may wait for the attorney to tender or he may log onto the website and tender the panel himself to the opposing attorney. As long as the judge does not tender the panel after the deadline, the attorney may still continue to exercise challenges for cause and/or peremptory challenges or tender the panel to his counterpart. Once the attorney tenders after the deadline, the judge will be notified with an email message that he may reject any challenges for cause and/or peremptory challenges submitted after the tendering deadline. If the judge decides to reject, the software will automatically restore any juror questionnaires that were replaced after the tendering deadline, and the panel will automatically be tendered to opposing counsel. If the attorney was unable to replace any juror questionnaires before the tendering deadline, and the attorney's counterpart has already tendered the panel on at least one prior occasion, the jury selection process will be deemed over and complete.

If the judge tenders the panel due to an attorney not tendering the panel within the deadline, the opposing attorney may exercise challenges for cause and/or pass for cause and exercise peremptory challenges on any newly replaced juror questionnaires of the attorney who failed to tender on time. If the attorney who failed to tender did not replace any juror questionnaires, the jury selection process will be deemed completed and the opposing attorney will not be allowed to make anymore challenges for cause and/or peremptory challenges.

Each time an attorney submits a challenge for cause, rebuttal, or peremptory challenge, and each time the judge submits a ruling, the Court Reporter is sent an email message informing her to log onto the website and print such information, the date it was submitted, and any respective deadlines.

Also, on every screen the judicially allotted number of challenges for cause will appear along with the number of challenges for cause each attorney has exercised. If attorneys were allowed to exercise an unlimited number of challenges for clause, then the software will state that attorneys are allowed to exercise an unlimited number of challenges for cause. Additionally, the judicially allotted number of peremptory challenges each attorney is allowed to exercise will appear at the top of each screen along with the number of peremptory challenges that each attorney has exercised.

If an attorney exercises all his allotted number of peremptory challenges, the software will not allow him to exercise anymore peremptory challenges. However, if the process has not been completed, an attorney may still exercise any challenges for cause he has remaining when the panel is tendered back to him and his counterpart had replaced juror questionnaires.

5. Video Record Juror's Orally Respond to the Questionnaire

This option allows the judge and attorneys to view each juror respond to the questionnaire on the same screen as attorney's view the typed questionnaire responses of the jurors. If this option is selected, an alternative interactive voice response unit equipped with a video recording device will have to be used to administer and record the responses of the jurors other than a standard telephone. Thus, the Courthouse will have to furnish a facility where the jurors can respond to the questionnaire and be video recorded in the process. Thus, while the automated voice of the invention audibly reads the questionnaire a particular juror and records his oral responses, the juror is video recorded. If this option is selected, the judge or attorney may view each juror respond to the questionnaire on the same screen they view the juror responses in a typed format and listen to the voice responses of each juror. Thus, if this option is selected, an option will appear in the bottom margin of each screen that allows the judge and the attorneys to view the juror questionnaires in a typed format. Thus, every interactive list of juror names or anonymous numbers that shows the juror's questionnaire in full will have this option. Thus, the option is entitled "View/Listen to Juror's Responses." If this option is selected, the juror's body will appear in a rectangular box in the right margin of the screen to the right of the juror's typed questionnaire responses. Thus, the juror's typed responses will still be made completely viewable. Affixed to the bottom of the box containing the juror will be a horizontal scroll bar. Directly below this scroll bar will be six buttons labeled "Play", "Pause," "Rewind," "Fast forward," "Stop," and "Close." Thus, the judge and attorneys can skip forward or backward to view and listen to a juror answer a particular question or take the oath or simply play the entire questionnaire. Also, attorneys can place a check mark in the small square box next to a particular question.

5. Allow Jurors to Respond to the Questionnaire by Typing their Answers Through the Website This option allows jurors to respond to the questionnaire through the designated website. Thus, when jurors are instructed to respond to the questionnaire they log onto the same website that the attorneys, judge, court reporter, and court administrators log onto. To respond to the questionnaire, jurors enter their first name, last name, case number, confidential code, and then they select their individual program which is "Juror."

Once the juror enters the program to respond, the standard features that appear on every screen in all programs such as the invention logo, the name of the courthouse, the address of the courthouse, the case number, courthouse troubleshooting number, and program title which for jurors would be "Juror Program for Case No. 04 CR 1984," for example, would all appear at the top of the screen.

Once in the program, jurors are presented with instructions asking the jurors if they speak English and can read and write English. If they do speak English, they are instructed to begin the process of responding. If they do not speak English they are instructed to log off of the website and contact the appropriate court administrator at the troubleshooting number at the top of the screen. These instructions inquiring whether or not a juror speaks English will be written in several languages such as: Spanish, French, German, Italian, Russian, Chinese, Japanese etc.

Once in the program, jurors are informed that they must answer all of the questions on the questionnaire and that failure to do so would be deemed a refusal or failure of their jury duty and could subject them to penalty under the law.

Jurors are instructed that they do not have to answer all questions in one setting. They may log onto the website and type their questions as many times as needed until they completely answer all of the questions, However, they are instructed that they must completely answer all of the questions by the judicial deadline.

Thus, when jurors enter their program to answer questions, the judicial deadline for the completion of their answers appears at the top of the screen. To the right of this deadline is the current date. To the right of the screen there is a scroll bar that allows the juror to view the entire questionnaire that he is to answer. Every question is in numerical order. Also, at the top of the screen is the total number of questions on the questionnaire. The statutory juror qualification questions are first followed by the Plaintiff Attorney's questions, followed by the Defense Attorney's questions. All questions initially appear in black text. Directly below each question is the word "ANSWER:" typed in all capital letters. The word "answer" initially appears in green text. Jurors also will be provided with a font color/size option that will allow them to change the color and size of the question font and the answer font to where they are different colors and sizes to make them easier to view.

A flashing cursor appears directly below question one next to the word "ANSWER." Jurors are instructed to type a response to each question by the "answer" prompt. When jurors type, the text of their responses initially appear in green text. Jurors are instructed to type their answers as long as they want. Thus, when a juror types, the software automatically makes room between the following questions.

Jurors are instructed that if they need to answer the questions in more than one sitting their questions will not be made accessible to anyone and will remain confidential until they decide to submit them for viewing to the judge, attorneys, and court reporter. Additionally, if jurors need to answer the questions in more than one sitting, the program will automatically save their responses when they log out of the program. That way they can pick up where they left off and will not have to retype their answers. Also, when they log back on to answer questions, the cursor will be flashing next to the answer sign underneath the first unanswered question on the questionnaire.

In the bottom margin of the screen, there will be a submit button. When jurors have finished responding to the questionnaire and are satisfied with their responses, they must select "submit" to make their responses accessible to the attorneys, judge, and court reporter. If a juror tries to submit without having answered all of the questions, he will be instructed that his questions cannot be made accessible to the attorneys, judge, and court reporter until he has finished responding to all of the questions. Also, within the bottom margin is a button labeled "Font Color/Size." This option allows jurors to change the font sizes and colors of the questions and answers to make them easier to see and review. Thus, jurors are instructed that they can make the questions a different size and color from their answers.

The jurors will also be advised that they may change or modify their responses at anytime before submitting their responses and making them accessible to the attorneys, judge, and court reporter. Jurors will be instructed that if their questionnaires have not been completed by the respective judicial deadline, their questionnaire responses will be made accessible to the judge for review.

When jurors initially log on to type their questions, they are further instructed that if they have a disability that hinders their ability to type or do not have the skill of typing, they need to call the courthouse or troubleshooting number and arrange to have a court administrator type their orally dictated responses for them. Additionally, jurors are instructed that if they do not have a computer, they are advised that many public libraries have computers available with internet access and/or there will be designated computer(s) at the courthouse for jurors to use.

If this option is selected, jurors will be able to enter their questions at anytime day or night, 24 hours a day, 7 days a week. However, if they need to use a courthouse computer or public computer their usage time may be limited to their normal business hours.

Before jurors are allowed to respond, they are instructed that no one must assist them in answering any questions and that if anyone else answers for a juror the juror will be subject to penalty under the law. Additionally, jurors are instructed that they must not confer with anyone including any other known jurors, judges, or attorneys on their responses before they have submitted their responses. Additionally, they are instructed not to read or view any other jurors responses. Thus, they are instructed that they are not to conform their responses with anyone else's opinions or responses. Also, jurors are instructed to answer their questions in private.

After jurors receive these instructions, they are presented with the oath administered to jurors in their respective jurisdiction. The oath will also include some additional features as follows: that they will answer each question truthfully, that they will not consult with any other person when answering questions, that they are a selected juror who is ordered to respond to the questionnaire under penalty or perjury of the law. The juror is instructed to read this oath and if they will abide by this oath, they are instructed to select the option labeled "I will abide by this oath." Once they select this option, the flashing cursor will begin flashing by the "ANSWER" prompt directly below question one of the questionnaire. The jurors will have to respond to this oath each time they log onto the website to continue answering questions.

If the judge selects this option, the judge will be presented with three additional options: 1) Allow jurors to respond to the questionnaire by typing through the website AND allow jurors to respond to the questionnaire by orally responding by the telephone; 2) Allow jurors to respond to the questionnaire only by typing their responses through the website; and 3) Allow jurors a spelling option that allows them to correct their spelling before they submit their questionnaires to the attorneys.

If the judge selects option (1), the jurors will have their choice of either responding to the questionnaire by phone or typing through website. To clarify, if a juror, in one sitting, responds to questions 1-11 by phone, on the next sitting, he may respond to question 12 and any additional questions by typing through the website. Thus, when the juror logs onto the website to type at question 12, his oral responses that he gave over the phone will appear in a typed format initially appearing in green text. Thus, he will have a chance to go back and correct any of his previously typed oral responses.

If the judge selects option (2), the jurors will only be allowed to answer the questionnaire through the website, and will be prohibited from responding over the phone. The purpose of option (3), the spelling correction option, is that some attorneys may want to see how educated jurors are by how well they can spell, or attorneys may want to see how meticulous jurors are by taking the time to correct their spelling on their won. Thus, if a juror is not allowed the option of correcting his spelling, attorneys may receive more natural responses from the jurors. If the judge allows the jurors to have a spelling option, they will be allowed to correct their spelling errors before they make their responses accessible for viewing to the judge, attorneys, and court reporter.

6. Postal Mailing and/or Emailing Questionnaires to Jurors for Handwritten and/or Typed Responses If this option is selected, the juror questionnaire will be sent to the jurors by U.S. Mail or email. Thus, after the questionnaire is completed, the judge has the option of submitting the questionnaire by U.S. Mail or email or both. The judge will also have the option of mandating that jurors type their responses or handwrite their responses or either type or handwrite. After the judge makes the decisions, the court administrator is then instructed to distribute the questionnaire in accordance with the judge's instructions. Thus, if the judge allows for emailing the court administrator would email it to each juror with instructions that they are to either handwrite or type their responses and mail it back to the Court administrator. Once the court administrator receives the juror questionnaires by the deadline, the court administrator then scans the questionnaires into the invention. The handwritten or typed juror questionnaire are then made viewable to the attorneys for printing or making juror selections in the same process mentioned above through the website.

7. Attorneys Submitting Jury Selection Questions by Telephone

If this option is selected, attorneys will be able to submit their jury selection questions orally by telephone. The judge will have the option of either allowing lawyers to enter their jury selection questions orally over the phone or by website or both. The attorneys will acquire the telephone number to access the software and submit their questions. When the attorney dials the number, the software will ask the person orally a series of questions: 1) the case number for which the jury selection is to take place. If the wrong case number is entered, the software will state audibly that no such case number exists and that they should try again. 2) The attorney must state whether he is the Plaintiff Attorney or the Defense Attorney. 3) The attorney must also orally state his confidential code. 4) The attorney must also state his full name. After this information is entered, the software will audibly instruct the attorney to begin orally stating his jury selection questions. After the attorney has finished stating all of his questions, the software will audibly advise the attorney that if he wishes to have all of the questions repeated to him, he simply needs to state the words "repeat all questions." The software will then audibly repeat all questions entered by the attorney in the computer generated voice. The software will also advise the attorney that if he wishes to have any question repeated when ever entered, the attorney simply needs to state the word "repeat" followed by the number of the question he desires to have repeated. The software will then advise the attorney that if he wishes to redo any question the attorney needs to state the word "redo" or "restate" followed by the number of the question he wishes to redo or restate.

8. Standard Objections to Attorney Jury Selection Questions WITHOUT Race and Gender as Grounds If the judge selects this option, attorneys will be allowed to submit objections to their counterpart's jury selection questions before they are submitted to the judge. The process and deadlines are identical to the objection process listed below under the options to prevent racial and gender discrimination. Thus, lawyers will be able to object to their counterpart's jury selection questions before they are submitted to the judge. However, when this option of standard objections to attorney jury selection questions is selected, lawyers will not be advised that they may object to their counterpart's jury selection questions that may solicit the race and/or gender of jurors.

Options to Prevent Racial & Gender Discrimination

Striking Jurors from the venire based on their race and/or gender is unconstitutional. The invention method provides several options of preventing jurors from being struck due to their race or gender. These options will be most effective if challenges for cause and/or peremptory challenges are exercised through this software before attorneys actually view and question the jurors or have any information on the race or gender profiles of jurors.

1. Objecting to Questions Soliciting Race & Gender

To further prevent attorneys from excluding jurors from the venire with a challenge for cause and/or peremptory challenge based on the race or gender of jurors, the invention provides the option of allowing attorneys to object to any juror statutory qualification questions and their counterpart's jury selection questions that directly or indirectly solicit the race and gender profiles of jurors. Thus, lawyers will be advised that they may make any of the standard objections that they may typically make to their counterpart's jury selection questions like a question being outside of the scope of permissible questions, and lawyers additionally be advised that they may object to any questions that directly or indirectly solicit the race and gender of jurors. Examples of such questions are the following: "What is your name?; What country are your ancestors from?; Are you a member of the NAACP?" Additionally, attorneys will be advised that they may object to questions that could provide the investigative means of obtaining the race an gender profiles of jurors. An example, of such a question would be the following: "What is your home address?, What is the address of your place of employment?" Ultimately, questions that ask the names, races, genders, addresses, and names of employers of jurors are objectionable.

If the Judge selects this option, attorneys will be able to submit their objections to the juror statutory qualification questions and their counterpart's jury selection questions after each attorney has had an opportunity to submit jury selection questions and before such jury selection questions are reviewed, edited, and/or selected by the judge and then answered by the jurors.

If the Judge initially sets the Plaintiff Attorney's deadline at an earlier date than that of the Defense Attorney, each attorney may submit objections after the Defense Attorney submits jury selection questions within the deadline or after the Judge accepts the Defense Attorney's jury selection questions after the deadline. Thus, after either one of these two occurrences, the Plaintiff Attorney and the Defense Attorney are sent email messages to their personal email accounts notifying them that they may now submit their objections to the juror statutory qualification questions and their counterpart's jury selection questions within their respective deadlines.

Similarly, if the judge initially set the deadlines for both the Plaintiff Attorney and the Defense Attorney to submit their jury selection questions on the same date, each attorney may submit objection after the deadline for both attorneys to submit their jury selection questions.

If the Plaintiff Attorney's jury selection questions were rejected by the Judge, and the Defense Attorney's jury selection questions were submitted within their respective deadline or accepted by the Judge after the deadline, both the Plaintiff Attorney and the Defense Attorney will be sent email messages notifying them that the Plaintiff Attorney may submit objections to the Defense Attorney's jury selection questions and the juror statutory qualification questions and the Defense Attorney will not need to submit objections to the Plaintiff Attorney's jury selection questions since the Plaintiff Attorney's questions were rejected by the Judge and will not be administered to the jurors. Thus, the Defense Attorney will be notified that he may submit objections to the juror statutory qualification questions and will not be allowed to submit objections to the Plaintiff Attorney's jury selection questions since such questions were rejected.

Conversely, if the Defense Attorney's jury selection questions were rejected by the Judge, and that Plaintiff Attorney's jury selection questions were submitted within their respective deadline or accepted by the Judge after the deadline, both the Defense Attorney and the Plaintiff Attorney will be sent email messages notifying them that only the Defense Attorney may submit objections to the Plaintiff Attorney's jury selection questions within their respective judicial deadline and that the Plaintiff Attorney will not need to submit objections to the Defense Attorney's jury selection questions since the Defense Attorney's questions were rejected by the Judge and will not be administered to the jurors. However, the Plaintiff Attorney will be notified with an email message that he may log onto the website and make objections to any juror statutory qualification questions. Thus, the Plaintiff Attorney will not be allowed to submit objections to the Defense Attorney's jury selection questions since such questions were rejected.

If both the Plaintiff Attorney and the Defense Attorney had their jury selection questions rejected by the Judge, each attorney will be sent email messages informing them that they may submit objections to the juror statutory qualification questions.

Referring to setting judicial deadlines for attorney's to submit their objections to jury selection questions, the Judge may set the judicial deadlines for the Plaintiff Attorney and the Defense Attorney to submit their objections at the same time. Thus, setting these deadlines at the same time will help speed up the jury selection process.

Each attorney submits objections to any juror statutory qualification questions and their counterpart's jury selection questions in the same way through the website. Through the website, the word "Objection" initially appears in red text directly below each juror statutory qualification question and each question opposing counsel had submitted. Questions initially appear in black text with their sequential number appearing to the left. Attorneys are instructed to read each question. There is a scroll bar affixed to the right margin to allow attorneys to view all of the questions on this screen. To make an objection, attorneys are instructed to move the cursor next to the word objection below the question they wish to object to and type their explanation for their objection. As they type their explanations for their objections, the words will initially appear in red so their objection is easily recognizable to the judge and opposing counsel. Attorneys are also presented with an option that allows them to change the font color and size of the questions and their objections so they are different sizes and colors to make them easier to view. Attorneys are also instructed to make their objection explanations as long as they want. Thus, as attorney's type, the screen will automatically provide additional room between their explanation and the following question.

After attorney's viewed all questions and made all the objections they desire, they are instructed to select submit within the bottom margin of the screen. Thus, attorneys are instructed that all of the objections they wish to make must be submitted at the same time.

If either attorney does not submit his/her objections within the respective judicial deadline, the Judge is automatically notified with an email message to his/her personal email account immediately after the respective deadline passes informing him that he may log onto the website and reject the attorney's objections which would have the effect of preventing that attorney from submitting objections to his counterpart's jury selection questions and objections to any juror statutory qualification questions. If the Judge decides to reject an attorney's objections before they are submitted, both attorneys are notified with an email message informing them of the attorney that did not meet the deadline and informing them that that attorney is prevented from submitting objections. Additionally, the Court Reporter is notified with an email message informing him/her that he/she must print the judicial deadline for that attorney to submit objections, the date the attorney submitted the objections, and the court order stating that attorney's objections were rejected and will not be considered by the Judge. Also, the Court Reporter is instructed to print, through the website, the email message sent to that Attorney notifying him that he may now submit his objections. Such email message will contain the email address of that Attorney and the date it was sent to that Attorney.

As long as the Judge does not reject the objections after the respective deadline has passed, an attorney is still allowed to submit his objections. Once an attorney submits his objections after the deadline, the Judge is sent another email message notifying him of which attorney submitted his objections after the deadline and informing the Judge that he may log onto the website and reject that attorney's objections. If the Judge rejects an attorney's objections after the deadline, both attorneys are notified with an email message informing them of the attorney who did not submit objections within the deadline and informing them that that attorney's objections will not be considered by the Judge. The Court Reporter is notified with an email message informing her that she must log onto the website and print the respective judicial deadline, the date the attorney submitted the objections, the objections submitted by the attorney, and the Court Order rejecting those questions for being untimely submitted. Also, the Court Reporter is instructed to print, through the website, the email message sent to that Attorney notifying him that he may now submit his objections. Such email message will contain the email address of that Attorney and the date it was sent to that Attorney.

If an attorney has submitted his objections after the respective deadline, the Judge also has the option of accepting those objections. If the Judge accepts an attorneys objections after the deadline, the Court Reporter is sent an email message that she must print those objections, the respective judicial deadline, and the date the attorney submitted them. If the Judge selects the option of allowing attorneys to submit rebuttals to their counterpart's objections to jury selection questions, the Judge also has the option of extending the judicial deadline for the opposing attorney to submit a rebuttal to the attorney's objections due to the delay caused by that attorney. If the Judge extends a deadline for an attorney to submit objections, both attorneys are notified with an email message that the opposing attorney's judicial deadline was extended due to a delay. The Court Reporter is sent an email message that she must now print, through the website, this new extended deadline for the opposing attorney to submit rebuttals to the attorney's objections.

If either attorney submits his objections within their respective deadline, the Judge is notified with an email message that he may view these objections and compare the judicial deadline with the date of submission. If the judge selects the option of allowing attorneys to submit rebuttals to their counterpart's objections, the opposing attorney is automatically sent an email message that he may now submit his rebuttals to the attorney's objections within his judicial deadline and before the Judge submits rulings on the attorneys objections. If the judge does not elect to have attorneys submit rebuttals to their counterpart's objections, and attorneys submits their objections within the deadline, the judge is sent an email message to his personal email account that he may now log onto the website and rule on that attorney's objections. Whenever an attorney submits his objections within the deadline, the Court Reporter is notified with an email message informing her that she must print, through the website, the attorney's objections, the date they were submitted, and the respective judicial deadline. Also, the Court Reporter is instructed to print, through the website, the email message sent to that Attorney notifying him that he may now submit his objections. Such email message will contain the email address of that Attorney and the date it was sent to that Attorney.

If the judge selects this option of allowing attorneys to submit objections to their counterpart's jury selection questions, the judge also has the option of allowing lawyers to submit rebuttals to their counterpart's objections. If an attorney's objections are submitted within the judicial deadline or accepted by the Judge after the deadline and the judge has elected to allow lawyers to submit rebuttals to their counterpart's jury selection questions, the opposing attorney is allowed to submit rebuttals to each of those objections before the Judge rules on those objections. If an attorney's objections were rejected by the Judge for being untimely submitted, both attorneys are notified with an email message that the opposing attorney will not need to submit rebuttals to the attorney's objections since they were rejected and will not be considered by the Court.

If the judge allows lawyers to submit rebuttals to their counterpart's objections, the Judge sets a judicial deadline for each attorney to submit rebuttals to their counterpart's objections. The Judge may set the judicial deadlines at the same time for both the Plaintiff Attorney and the Defense Attorney to submit rebuttals to speed up the invention process.

Attorneys submit rebuttals to their counterpart's objections through the website. When an attorney logs onto the website to make rebuttals, only the objected questions from the questionnaire initially appear in black text. Below each question, the objection explanation of the opposing attorney initially appears in red text. Below each opposing attorney objection explanation, there are the words "Plaintiff Attorney Rebuttal" or "Defense Attorney Rebuttal" depending on which attorney is making the rebuttals which initially appear in green text. Attorney's are instructed to type their rebuttal next to their respective prompt. When an attorney types their rebuttal, the words will appear in green text. The reason the objections are in red and the rebuttals are in green is so they can be easily distinguished. Thus, the attorneys are provided with an option that allows them to change the font size and color of the questions, objections, and rebuttals to where they are different colors and sizes to make them easier to view. If there is more than one objection, attorney's are instructed to type a rebuttal below each objection at the respective prompt. Thus, submitting one rebuttal under one objection will not be presumed to be a blanket rebuttal for all objections. Also attorneys are instructed that they must submit all of their rebuttals at the same time. Therefore, before they submit they must make a rebuttal for each objection they desire.

Once an attorney has finished typing all his rebuttals and is satisfied with them, he is instructed to select submit. If an attorney fails to submit his rebuttals within their respective judicial deadline, the Judge is notified with an email message immediately after this deadline lapses informing him of which attorney failed to submit his rebuttals within the deadline and informing him that he may reject this attorney's rebuttals and prevent the attorney from submitting rebuttals. Additionally, this email message will notify the Judge that if he rejects this attorney's rebuttals he may go ahead and rule on the opposing attorney's objections. If the Judge decides to reject an attorney's rebuttals before the attorney submits his rebuttals, both attorneys are notified with an email message informing them of the attorney who did not submit his rebuttals within the deadline and informing them that attorney will not be allowed to submit rebuttals and that the Judge will submit rulings on the opposing attorney's objections without the attorney's rebuttals. The Court Reporter is notified with an email message that she must now print the judicial deadline the attorney was to have submitted his rebuttals and the Court Order stating the attorney's rebuttals were rejected and were not considered by the court. Also, the Court Reporter is instructed to print, through the website, the email message sent to that Attorney notifying him that he may now submit his rebuttals. Such email message will contain the email address of that Attorney and the date it was sent to that Attorney.

As long as the Judge does not reject an attorney's rebuttals after their respective deadline, that attorney may still submit his rebuttals. Once an attorney submits his rebuttals after the deadline, the Judge is immediately notified with an email message informing him that he may reject this attorney's rebuttals or accept them. If the Judge rejects them, both attorneys are notified with an email message of the attorney whose rebuttals were rejected and informing them that those rulings will not be considered when the Judge submits rulings on the attorney's counterpart's objections. The Court Reporter is notified with an email message that she must now print through the website this attorney's submitted rebuttals, the date they were submitted, their respective judicial deadline, and the Court Order rejecting these rebuttals from consideration. Also, the Court Reporter is instructed to print, through the website, the email message sent to that Attorney notifying him that he may now submit his rebuttals. Such email message will contain the email address of that Attorney and the date it was sent to that Attorney. If the Judge accepts an attorney's rebuttals after their respective deadline, both attorney's are notified of this acceptance, and they are notified that the Judge will now enter a ruling on those objections and rebuttals. The Court Reporter is notified with an email message to print these rebuttals, the date they were submitted, and their respective judicial deadline. Also, the Court Reporter is instructed to print, through the website, the email message sent to that Attorney notifying him that he may now submit his rebuttals. Such email message will contain the email address of that Attorney and the date it was sent to that Attorney. The judge is then notified with an email message notifying him that he may now log onto the website and rule on the objections and accepted rebuttals.

If an attorney submits his rebuttals within their respective judicial deadline, the Judge is notified with an email message that he may now log onto the website, compare the date of submission of the rebuttals with their respective judicial deadline, and submit rulings on these objections and rebuttals. The Court Reporter is notified with an email message instructing her that she must now print these rebuttals, the date they were submitted, and their respective judicial deadline. Also, the Court Reporter is instructed to print, through the website, the email message sent to that Attorney notifying him that he may now submit his rebuttals. Such email message will contain the email address of that Attorney and the date it was sent to that Attorney. Both attorneys are notified with an email message instructing them that they may now log onto the website and view the submitted rebuttals.

When the Judge logs onto the website to rule on attorney objections and/or rebuttals, he will be presented with two options: 1) Rule on Plaintiff Attorney Objections to jury selection questions; and 2) Rule on Defense Attorney Objections to jury selection questions. Upon selecting one of these options, the Judge will be shown each question that the respective attorney has objected to which will initially appear in black text. Directly below each objected question will be the attorney's grounds for each objection initially appearing in red text. Directly below these grounds will appear the opposing attorney's respective rebuttal initially appearing in green text if the judge allows lawyers to submit rebuttals.

A box labeled "Sustained" and a box labeled "Overruled" will appear to the left of the objected question. To make a ruling on an objected question, the Judge is instructed to read the objection explanation and its respective rebuttal and click his cursor in the box labeled "sustained" or "Overruled." Upon clicking a box, a check mark will appear. After making such check marks in the boxes by every question being objected to, the Judge is instructed to select submit within the bottom margin of the screen. The judge is instructed that he must submit his rulings all at once. Therefore, he must rule on each objection and respective rebuttal before submitting.

If a check mark appearing in the "Sustained" box is submitted, this program will automatically exclude its respective question from the final questionnaire, and, in turn, the jurors will not be asked such a question. Additionally, a strike through line will appear through the question indicating that the question has been stricken. If a check mark appearing in the "Overruled" box is submitted, the question will remain included on the questionnaire or will remain to be included as a recommendation to the judge. If any objections are sustained and the judge submits them, the question will automatically be stricken and the remaining questions on the questionnaire will be renumbered to where they are in sequential order.

If a Judge wishes to include explanations for each of his rulings on objections, there is a prompt labeled "Explanation of Judicial Ruling on Objection" directly below each rebuttal to an objected question if rebuttals are allowed. When the judge types an explanation next to this prompt, the text initially appears in blue. The judge will be presented with an option to change the font color and size of the objections, rebuttals, and any explanations for rulings he may type to where they are all different colors and sizes. Ultimately, the judge is not required to type an explanation to properly submit his rulings.

When a judge has submitted his rulings and any explanations, both attorneys will be notified with email messages to their personal email accounts informing them that they may now log onto the website and view the judge's rulings and explanations on their objections and rebuttals if allowed. The Court Reporter is sent an email message instructing her that she must now print the Judicial Rulings to attorney objections as well as any judicial explanations of those rulings, and the date the rulings were submitted. The Judge will be sent an email message instructing him to making any edits to the questionnaire and submit the attorney formulated jury selection questionnaire to the jurors for responses. The Judge will also be informed that he may extend the deadline for jurors to respond to the questionnaire if there was any delay caused by the Judge in making rulings or the attorneys causing delay in submitting objections and/or rebuttals. If the Judge extends the deadline for jurors to respond to the questionnaire, both attorneys will be sent and email message notifying them of this new deadline and the Court Reporter will be sent an email instruction her that she must print this new deadline.

The respective Court Administrator assigned to the case will also be sent an email message instructing her to include this new deadline in the letter sent to the juror's on how and when they are to respond to the questionnaire. Thus, once the Judge submits the questionnaire to the jurors for responses, the Court Administrator is notified with an email message to send out letters to all jurors chosen for the case instructing the jurors on how they are to respond to the questionnaire and any information they will need to respond to the questionnaire.

2. Substitute Anonymous Numbers for Juror Names on Questionnaires

Since a person's name can reveal his/her race and gender and the investigative means of learning a person's race and gender, the invention provides the option of preventing attorneys from viewing the actual names of jurors on their respective questionnaires. Thus, the invention provides the option of substituting juror names on questionnaires with anonymous numbers. If a Judge selects this option, attorneys will not be allowed to view the names of jurors on their respective questionnaires. Instead, an anonymous number will randomly be assigned to each juror's name and only such number will appear on their respective questionnaires in place of their actual names when they are initially viewed by the attorneys. Thus, attorneys will review questionnaires without knowing the names of the jurors who responded to the questionnaires. Attorneys will only know each questionnaire by their assigned anonymous number.

This option of substituting names with anonymous numbers, undoubtedly, would help prevent attorneys from exercising their challenges for cause and/or peremptory challenges based on the race or gender of jurors since a person's name can reveal his/her race and gender and the investigative means of learning a person's race and gender.

If this option is selected by the Judge, the invention automatically assigns a random anonymous number to each juror's name logged into the invention for that Judge's specific case. Jurors are not informed of their assigned anonymous numbers when they respond to the questionnaire over the phone or through some other interactive voice response unit. Thus, the Judge and Court Administrators are told not to reveal the anonymous numbers of the juror's to the juror's themselves. By preventing jurors from learning their anonymous numbers, the chance of attorney's learning the juror names behind the anonymous numbers will decrease.

As stated in the basic the invention process, the Judge is sent an email message to his personal email account immediately after the judicial deadline for jurors to respond to the questionnaire has lapsed. The Judge is instructed to log onto the website and view the questionnaires. The Judge is specifically instructed to check questionnaires that are yellow flagged which means they are incomplete or contain profane language. As stated above, when the Judge logs on the website to complete this task, he is provided an interactive list of every juror's name that was scheduled to respond to the questionnaire. If the Judge selects this option of substituting anonymous numbers for juror names, this interactive list will only contain the jurors' assigned anonymous number in place of the Jurors' actual name. When the Judge clicks his cursor on an anonymous number, the respective juror's questionnaire will appear on the screen with the Juror's anonymous number and the Juror's actual name appearing at the top of the questionnaire. Only the Judge is allowed to view both the actual name of a juror and their respective anonymous number. The Judge must be able to have access to each juror's name in case he needs to contact a juror in regards to not completely responding to the questionnaire or responding to the questionnaire with profane language.

When the Judge completes this viewing task of the juror questionnaires and is satisfied with the juror participation in responding to the questionnaires, the Judge is then instructed to make the questionnaires accessible to the attorneys for viewing. When the Judge submits the questionnaires for viewing, the actual Juror names are not revealed to the attorneys. Thus, the attorneys are provided with the same interactive list with only the juror's assigned anonymous numbers in place of their actual names. Additionally, when attorney's click their cursor on the anonymous number of a juror, the respective juror's questionnaire appears on the screen with only the juror's respective anonymous number appearing at the top. Thus, the actual juror's name does not appear to the attorney's as they did appear to the Judge. When the attorney's then exercise their challenges for cause and/or peremptory challenges on the questionnaires, they make their exercises on the anonymous numbers instead of the Jurors' names.

Furthermore, if the Judge selects this option, the invention equips the Court with the option of revealing the jurors' actual names and addresses with their respective anonymous numbers to the attorneys and court reporter only after Challenges for Cause WITHOUT Listening and/or Viewing Juror Responses and/or the option of Peremptory Challenges WITHOUT Listening and/or Viewing Juror Responses and rulings thereto have been completed through the invention process.

To clarify, the invention allows attorneys to exercise up to two sets of challenges for cause and two sets of peremptory challenges in the following order: 1) Exercise Challenges for Cause WITHOUT Listening and/or Viewing Jurors Respond; 2) Exercise Peremptory Challenges WITHOUT Listening and/or Viewing Jurors Respond; 3) Exercise Challenges for Cause WITH Listening and/or Viewing Jurors Respond; and 4) Exercise Peremptory Challenges WITH Listening and/or Viewing Jurors Respond.

The options of Exercise Challenges for Cause WITHOUT Listening and/or Viewing Jurors Respond; and Exercise Peremptory Challenges WITHOUT Listening and/or Viewing Jurors Respond will be explained in detail below. The basic premise of these two functions are to prevent lawyers from exercising challenges for cause and peremptory challenges on jurors based on their race and gender. Thus, if these options are selected, lawyers will not be allowed to listen and/or view jurors respond to the questionnaire. If the lawyers are not allowed to listen to the voices of jurors and/or view the physical appearances of jurors before they exercise their challenges for cause and peremptory challenges the potential for lawyers to discriminate against the jurors based on their race and gender obviously will decrease.

Thus, the basic premise of this option of assigning random numbers is to prevent the race and gender of jurors from being revealed. Therefore, to preserve the purpose and intention of exercising challenges for cause and peremptory challenges WITHOUT lawyers being allowed to listen and/or view the jurors respond to the questionnaire, the judge will not be allowed to reveal the names and addresses of the jurors with their respective anonymous numbers until these challenges for cause and/or peremptory challenges WITHOUT lawyers listening and/or viewing jurors respond have been completed and ruled upon. Thus, once they have been completed and ruled upon only the judge will be provided with the option of revealing the names and addresses of the jurors with their respective anonymous numbers. Thus, the judge will be sent an email message to his personal email address notifying him of this revealing option. The software will not automatically reveal the names and addresses of the jurors until the judge exercises this revealing option. The reason for this is to allow the judge to clear up any problems with such challenges for cause and/or peremptory challenges.

Hypothetically, if the judge selects all four options, the Challenges for Cause WITHOUT Listening and/or Viewing Jurors Respond and the Peremptory Challenges WITHOUT Listening and/or Viewing Jurors Respond would both be exercised before the Challenges for Cause WITH Listening and/or Viewing Jurors Respond and the Peremptory Challenges WITH Listening and/or Viewing Jurors Respond. After both the Challenges for Cause and Peremptory Challenges WITHOUT Listening and/or Viewing Juror Responses have been exercised the Judge would be presented with the option of revealing the names and addresses of the jurors with their respective anonymous numbers before the challenges for cause and peremptory challenges WITH listening and/or viewing would be exercised. Thus, the premise of the exercising challenges for cause and peremptory challenges WITH listening and/or viewing jurors respond is to provide attorneys with as much information of jurors as possible before they exercise their challenges for cause and peremptory challenges. Therefore, the judge should have the option of revealing the names and addresses of the jurors with their respective anonymous numbers before the challenges for cause and peremptory challenges WITH listening and/or viewing are exercised by the attorneys.

Ultimately, the judge will not have the option of revealing the names and addresses of the jurors with their respective anonymous numbers until after the options of challenges for cause and/or peremptory challenges WITHOUT listening and/or viewing jurors respond have completed. The judge may reveal the names and addresses of the jurors with their respective anonymous numbers at any time after the challenges for cause and peremptory challenges WITHOUT listening and/or viewing jurors respond have been completed.

The reason the Judge is provided with this option to reveal the names and addresses of jurors to attorneys after jurors have been assigned anonymous numbers is to provide attorneys with as much information as possible if they are allowed to exercise challenges for cause and/or peremptory challenges WITH listening and/or viewing jurors respond to the questionnaire through the invention process and because if attorneys are allowed to further question jurors in court and after the invention process, they will need to know the names and addresses of jurors so they can use the questionnaire responses as a reference tool for further questioning of jurors in Court. Additionally, attorneys would need to know the names and addresses of jurors with their respective anonymous numbers to investigate fraud in the answering of the questionnaire.

3. Edit Juror Responses to Questionnaire

To help decrease the probability of jurors from being excluded from the venire based on their race or gender, the invention provides the option of allowing the Judge to edit Juror responses that are directly or indirectly suggestive of their race or gender profiles. Thus, this function allows the Judge to view each juror's responses to the questionnaire and make edits to responses that reveal the juror's racial and gender characteristics before the attorneys exercise their challenges for cause and/or peremptory challenges. Thus, this option is most effective when exercised with Challenges for Cause and/or Peremptory Challenges WITHOUT Listening and/or Viewing Juror Responses.

If the Judge selects this option, he will be allowed to edit Juror responses after the judicial deadline for jurors to respond to the questionnaire has passed and before the attorneys are allowed to view the juror responses to the questionnaires. Thus, immediately after the judicial deadline passes for jurors to respond to the questionnaire, the Judge is sent an email message to his personal email account notifying him that he may now log onto the website and, as stated above, view the juror questionnaires for profane language and incomplete questionnaires and contact those jurors if necessary. Additionally, the email message will advise the Judge that he may also log onto the website and view and edit questionnaire responses that directly or indirectly suggest the race and gender profiles of jurors. Also, after all challenges for cause and/or peremptory challenges have been exercised, the Court Reporter is sent an email message to her personal email account instructing her that she must now log onto the website and print each juror's original unedited responses to the questionnaire, the respective judicial deadline for all jurors to have finished responding to the questionnaire, and the date each juror made their final attempt at responding to the questionnaire. When a judge makes edits to a juror's response, such edits will not appear on the original responses that the Court Reporter is instructed to print. The Court Reporter is sent the email to print the original responses only after all challenges for cause and peremptory challenges have been exercised to further prevent the original responses of the jurors from being disclosed to the attorneys. Thus, the Court Reporter is only allowed to print the original responses after all challenges for cause and/or peremptory challenges have been exercised.

When the Judge logs onto the website to view the questionnaires for incomplete responses and edit responses that are suggestive of a jurors race and gender, as stated above, the Judge is shown an interactive list of every juror's name or anonymous number who was ordered to respond to the questionnaire. As stated above, a yellow flag will appear to the left of each jurors interactive name or anonymous number which indicates that that specific juror did not completely respond to the questionnaire or the juror used profane language. If the Judge selects this option of editing juror responses, a red flag will appear to the left of each juror's interactive name or anonymous number when their questionnaire responses contain words that are directly or indirectly associated or descriptive of a person's race and gender. If a juror's questionnaire is incomplete or contains profane language and contains words that reveal the juror's race and/or gender, a yellow flag will appear to the immediate left of the juror's name or anonymous number and a red flag will appear to the left of the yellow flag.

The purposes of the red and yellow flags are to make the Judge's responsibility of reviewing questionnaires for completeness, profane language, and descriptive words of race and gender quicker. Once the Judge sees a juror's name or anonymous number with a flag to the left of it, he simply clicks his cursor on the name or anonymous number and that jurors questionnaire appears in full. As stated above, questions that were not responded to by a juror will be highlighted when the Judge views the questionnaire. Additionally, profane words will also be highlighted. If a judge selects this option of editing juror responses, words that suggest race or gender will be highlighted. Such words may include colors like black, white, red etc. Such words may also include organizations like the NAACP and United Negro College Fund or black colleges and words of ethnicity like Hispanic, Chinese etc.

To properly edit a response, the judge is instructed to read the whole response that contains words descriptive or suggestive of race and/or gender. To assist the judge in this task, a scroll bar is affixed to the right of the screen to allow the judge to view the entire questionnaire. To delete words, the judge is instructed to click the flashing cursor next to a word he wishes to delete. By pressing the delete key a line will strike through each letter he deletes. If the judge adds new letters they will appear in bold so he can easily see his edits. When the judge is satisfied with his edits for a particular jurors questionnaire, he is instructed to select the submit edits option. The questionnaire will appear with his edits hidden which is how they will appear to the attorneys. Thus, any new words added in bold will appear in regular face type. Words that were deleted will not appear on the screen at all. The judge is then instructed to view his edits one final time before editing another questionnaire or ultimately submitting all of the questionnaires to the attorneys and court reporter. Thus, the judge is instructed that he is to make the responses he edits to appear as if they have not been edited so they do not draw the attention of attorneys or give attorneys clues as to the race or gender of jurors. Once the judge views his edited responses one final time in a natural format and/or makes any additional edits, he is then instructed to review and edit any other juror questionnaires he desires through the same process. The judge will only be allowed to make all questionnaires accessible to the jurors at the same time. Making all questionnaires accessible to attorneys at the same time will prevent attorneys from suspecting which questionnaires have been edited by when they are made accessible. Thus, after the judge is satisfied with all of his edits and has finished editing the questionnaires, he is instructed to select the option of Make All Juror Questionnaires Accessible to Attorneys and Court Reporter. If the Judge has selected the option of allowing attorneys to exercise challenges for cause and/or peremptory challenges, the Judge will be presented with the option of extending the judicial deadline for attorneys to submit their challenges for cause and/or peremptory challenges for any delay caused in contacting jurors or editing juror responses. Such an option to extend a deadline will be presented to the Judge after he selects the option of making all juror questionnaires accessible to attorneys.

Once the Judge makes all juror questionnaires accessible to attorneys and the Court Reporter, both the Plaintiff Attorney and Defense Attorney and the Court Reporter are advised that they may now log onto the website and view/print the juror questionnaires. If attorneys are allowed to exercise challenges for cause and peremptory challenges, they will be instructed to exercise their challenges for cause in the email message since challenges for cause are exercised first, and if the deadline for exercising challenges for cause was extended, that new date will appear in the email message. If attorneys are allowed to exercise peremptory challenges without challenges for cause, they will be instructed to exercise their peremptory challenges in this email message and if their respective deadline was extended it will also be included. The Court Reporter will also be sent an email message to her personal email account only after all challenges for cause and/or peremptory challenges have been exercised instructing her that she must now print each juror's questionnaire that was edited by the Judge. Thus, each edit made by the Judge will appear. Thus, letters and punctuation marks that were deleted will appear with a line through them. Letters and punctuation marks that were added by the Judge will appear in bold face type. Additionally, the Court Reporter will be instructed to print the date the judge submitted all questionnaires to the attorneys. The reason this email message is sent to the Court Reporter only after all challenges for cause and/or peremptory challenges have been exercised is to prevent the edited responses from being revealed to the attorneys. Thus, the Court Reporter will be prevented from printing such edited responses until all challenges for cause and/or peremptory challenges have been exercised.

4. Exercise Challenges for Cause WITHOUT Listening and/or Viewing Juror Responses to the Questionnaires This option allows for challenges for cause to be exercised in the exact same manner as the challenge for cause WITH listening and/or viewing jurors respond process mentioned above where lawyers submit their challenges for cause through the website and they submit their rebuttals to their counterpart's challenges for cause and the judge submits rulings to these challenges for cause and respective rebuttals. However, the only exception is that lawyers will be prevented from listening and/or viewing the jurors respond to the questionnaire when making such challenge for cause exercises and rebuttals to their counterpart's challenges for cause. Obviously, if attorneys are not allowed to listen to the voices of jurors and are not allowed to view the physical appearance of jurors before lawyers exercise their challenges for cause the probability of a juror being excluded with a challenge for cause based on his/her race and/or gender will decrease. Thus, neither attorney will be allowed to view and/or listen to the jurors respond to the questionnaire before exercising their challenges for cause. Additionally, as mentioned above, the invention provides the option of expanding the standard of challenges for clause to include inconsistent responses. This expanded standard option is not available to accommodate this option of exercising challenges for cause WITHOUT listening and/or viewing jurors respond to the questionnaire. Thus, this expanded standard can only be used when exercising challenges for cause WITH listening and/or viewing jurors respond to the questionnaire is selected.

In the invention, the judge may select up to two sets of challenges for cause and two sets of peremptory challenges. Thus, he may select all of the following options and exercise them through the invention Process: 1) Challenges for Cause WITHOUT Listening and/or Viewing the Jurors Respond; 2) Peremptory Challenges WITHOUT Listening and/or Viewing the Jurors Respond; 3) Challenges for Cause WITH Listening and/or Viewing the Jurors Respond; and 4) Peremptory Challenges WITH Listening and/or Viewing the Jurors Respond. Therefore, if the judge selects all four options, he must set deadlines for the completion of Challenges for Cause WITHOUT Listening and/or Viewing Jurors Respond before any of the other options. Thus, the premise of exercising challenges for cause WITHOUT listening and/or viewing the jurors respond is to prevent the attorneys from gaining information on the juror race and gender. Therefore, such challenges for cause must be completed before attorneys are allowed to gain insight into the race and gender of jurors. Thus, all respective deadlines of challenges for cause WITHOUT listening and/or viewing jurors respond will have to be before the deadlines for the proper completion of the Peremptory challenges WITHOUT Listening and/or Viewing Jurors Respond and the proper completion of challenges for cause and peremptory challenges WITH Listening and/or Viewing Jurors Respond. Ultimately, the first deadline for this function will be sometime after the Judge has had adequate time to review, contact, and/or edit juror responses.

5. Exercise Peremptory Challenges WITHOUT Listening and/or Viewing Juror Responses to the Questionnaires This option allows for peremptory challenges to be exercised in the exact same manner as the process of peremptory challenge WITH listening and/or viewing jurors respond option mentioned above where lawyers submit their peremptory challenges through the website. However, the only exception is that lawyers will be prevented from listening and viewing the jurors respond to the questionnaire when making such peremptory challenge exercises. Obviously, if attorneys are not allowed to listen to the voices of jurors and are not allowed to view the physical appearance of jurors before lawyers exercise their peremptory challenges the probability of a juror being excluded with a peremptory challenge based on his/her race and/or gender will decrease. Thus, neither attorney will be allowed to view and/or listen to the jurors respond to the questionnaire before exercising their peremptory challenges.

If the Judge selects this option he will have to set the judicial deadlines for the completion of this function to be after all deadlines for the proper completion of Challenges for Cause WITHOUT Listening and/or Viewing Jurors Respond and before the deadlines for the proper completion of any and all challenges for cause and/or peremptory challenges WITH listening and/or viewing jurors respond to the questionnaire. The reason the deadlines for this option is to come after the exercise of challenges for cause WITHOUT listening and/or viewing the jurors respond is to simulate conventional jury selection procedure and to give lawyers a "safety valve" in that those jurors they are unable to get excluded with a challenge for cause WITHOUT listening and/or viewing the jurors respond they can get them excluded with a peremptory challenge WITHOUT listening and/or viewing the jurors respond. Also, a basic premise of this option of exercising peremptory challenges WITHOUT listening and/or viewing jurors respond is to prevent the attorneys from gaining information on the races and gender of jurors. Therefore, such peremptory challenges must be completed before attorneys are allowed to gain insight into the race and gender of jurors and exercising challenges for cause and peremptory challenges WITH listening and/or viewing jurors respond.

Panel Process Allowing Attorneys to Exercise Challenges for Cause WITHOUT Listening and/or Viewing and Exercise Peremptory Challenges WITHOUT Listening and/or Viewing Before Tendering the Panel to Their Counterpart.

This option is identical to the process mentioned above with the only exception being that attorneys will not be allowed to listen and/or view the jurors respond to the questionnaire when attorneys review the juror questionnaires and exercise challenges for cause and/or peremptory challenges.

7. Instructions Concealing Juror Race & Gender

Ultimately, the best way of preventing attorneys from striking a juror based on their race or gender is to conceal the race and gender profiles of jurors until attorneys have finished selecting jurors. Thus, this option is designed to accommodate and uphold the purpose of either or both of the options of exercising challenges for cause WITHOUT listening and/or viewing jurors respond and/or peremptory challenges WITHOUT listening and/or viewing jurors respond. Thus, if this option is selected, the invention will instruct the Court Administrators, Judge, Plaintiff Attorney, Defense Attorney, Court Reporter, and Jurors that the identifications of jurors and their racial and gender profiles must not be disclosed or revealed to attorneys until all Challenges for Cause and/or Peremptory Challenges WITHOUT Listening and/or Viewing Jurors Respond to the Questionnaire have been completed, and the Judge allows for such juror identifications and juror race and gender profiles to be revealed to the attorneys.

Consequently, Court Administrators, the Judge, and the Court Reporter assigned to the case are instructed that they are not to reveal to anyone the following information of jurors: names, addresses, places of employment, races and genders, and any other information that could allow attorneys and their agents from investigating the race and gender profiles of jurors until the Judge authorizes the disclosure of such information to the attorneys. They will also be instructed that such information is to remain completely confidential until the Judge authorizes the disclosure of such information to the attorneys. Therefore, they are all instructed that the jury list of names and addresses selected for the jury pool are not to be disclosed to the attorneys until the Judge authorizes the disclosure of such information to the attorneys.

Ultimately, the Judge will only be allowed to authorize the disclosure of identifications of jurors and the race and gender profiles of jurors after the completion of Challenges for Cause and/or Peremptory Challenges WITHOUT listening and/or viewing jurors respond to the questionnaire. Additionally, if the judge allows attorneys to exercise *Batson* Challenges to any Peremptory Challenges WITHOUT Listening and/or Viewing Jurors Respond to the Questionnaire and the Judge chooses not to allow attorneys to make such *Batson* Challenges by listening and/or viewing jurors respond to the questionnaire, then the Judge would not be allowed to authorize the disclosure of identifications of jurors and race and gender profiles of jurors to attorneys until such *Batson* challenges have been completed. Thus, after the completion of peremptory challenges WITHOUT listening and/or viewing have been completed and/or *Batson* Challenges thereto WITHOUT listening and/or viewing have been completed, the judge will be sent an email message to his personal email account instructing him that he may now authorize the disclosure of juror identifications and the race and gender profiles of jurors to attorneys.

When the judge logs onto the website and allows such authorization of disclosure, both attorneys, the Court Reporter, and Court Administrator will be notified with email messages to their personal email accounts that attorneys may now have access to juror identifications and juror race and gender profiles. The Court Reporter will be instructed to print this email message which will include the name of the judge giving the authorization and the order authorizing the disclosure and the date the email was sent. Also, if the Judge selected the option of substituting random numbers to juror names, he will also be instructed in the email to his personal email account that he may now authorize the revealing of juror names and addresses with their respective anonymous numbers at the same time he authorizes the disclosure of juror identifications and race and gender profiles of juror to attorneys.

Ultimately, the judge, court reporter, and court administrator will be given these instructions concealing the race and gender profiles of jurors each time they log onto the website and before they perform any of their respective functions. Additionally, they will be warned that revealing such information to anyone before the Judge authorizes the disclosure of such information to the attorneys can subject them to criminal penalty under the law and may be grounds for a mistrial.

Before the jurors respond to the questionnaire, they will be instructed that they are not allowed to reveal their race and/or gender identities, names, addresses, place of employment, or any other information that would directly or indirectly reveal the race and/or gender identities or provide the investigative means to discover such identities when responding to the questionnaire. Ultimately, they will be instructed that they are not to reveal to anyone the particular case captioned name or case number that they have been called upon for jury duty. They are to keep the case name and number confidential until the Judge authorizes the disclosure of such information to the attorneys. Thus, such information must be kept confidential because attorneys will not be provided with the names and addresses of jurors until the Judge authorizes the disclosure of such information to the attorneys.

Additionally, they are instructed that they are not allowed to notify any of the attorneys involved in the case or their respective agents of such information until the Judge authorizes the disclosure of such information to the attorneys. These instructions will be provided to jurors regardless of the means chosen for jurors to respond to the questionnaire. Thus, these instructions will be provided to jurors through the phone if jurors are instructed to respond to the questionnaire through the phone, and these instructions will be provided to jurors through the website if they are instructed to respond through the website, and these instructions will be provided to jurors through postal mail and/or email if jurors are sent the questionnaires through the mail or email to respond in handwriting or typing.

Also, jurors will be advised before responding that certain words commonly used specifically among certain races of people likely will imply the juror's race. The jurors will be given examples of words of ebonics that are primarily or most commonly used among African Americans and how such words likely will imply that the juror may be black. Thus, to prevent these implications, jurors are instructed to be mindful of such words and try not to use them to tip off the attorneys and prevent them from being possibly excluded from the venire based on discrimination. Thus, these instructions and examples will be provided through whatever means are chosen for jurors to respond to the questionnaire which would be phone, website, typing, handwriting etc.

If this option is selected, both the Plaintiff Attorney and the Defense Attorney will be instructed each time they log onto the website and before they perform any of their designated functions that one of the primary purposes of this jury selection method is to prevent unconstitutional racial and gender discrimination in the selection of jurors. To achieve this aim, the Plaintiff Attorney and the Defense Attorney and any and all of their agents are prevented from gaining knowledge of the race and gender profiles of jurors until the Judge authorizes the disclosure of such information to the attorneys. Thus, attorneys are instructed that they and any of their agents are not allowed to obtain the names, addresses, places of employment, and any and all other information that could provide the investigative means of discovering the race and gender of jurors until the Judge authorizes the disclosure of such information to the attorneys.

The attorneys will be further instructed that obtaining such identities of jurors before the Judge authorizes the disclosure of such information to the attorneys would be deemed as a fraud on the court and prejudicial to the administration of justice. Thus, such an act would violate ABA Model Rule 8.4(c) and (d) which states: "It is professional misconduct for a lawyer to: (c) engage in conduct involving dishonesty, fraud, deceit or misrepresentation; (d) engage in conduct that is prejudicial to the administration of justice." Furthermore, comment [3] of Model Rule 8.4 states: "A lawyer who, in the course of representing a client, knowingly manifests by words or conduct, bias or prejudice based upon race, sex, religion, national origin, disability, age, sexual orientation or socioeconomic status, violates paragraph (d) when such actions are prejudicial to the administration of justice." Such a violation of this rule could warrant the suspension of a lawyer's right to practice or disbarment.

To clarify, this option of instructing that the race and gender profiles of jurors be concealed is more effectively utilized when the judge selects either or both of the two options: 1) Exercise Challenges for Cause WITHOUT Listening and/or Viewing the Jurors Respond to the Questionnaire; and 2) Exercise Peremptory Challenges WITHOUT Listening and/or Viewing the Jurors Respond to the Questionnaire.

8. Allow Attorneys to Submit *Batson* Challenges to Peremptory Challenges Exercised WITHOUT and/or WITH Listening and/or Viewing Jurors Respond to the Questionnaire This option allows attorneys to contest their counterpart's peremptory challenges that appear to have excluded jurors based on race or gender. Peremptory challenges based on a juror's race and/or gender is unconstitutional. Thus, the United States Supreme Court in *Batson* v. *Kentucky,* 476 U.S. 79 (1986) devised a solution to prevent jurors from being excluded based on their race. *Batson* held that an attorney may challenge his/her counterpart's peremptory challenges by demonstrating a prima facie case that his/her opposition exercised peremptory challenges based on their race. If the judge deems this prima facie case sufficient or sustains it, then the burden shifts to the opposing counsel to show non-discriminatory reasons to preserve his/her peremptory challenges. If the judge overrules an attorney's prima facie case, then the burden does not shift to the opposition, and the opposition's peremptory exercises remain preserved. If the burden shifts to the opposition and the opposition's non-discriminatory reasons are deemed sufficient, then the opposition is entitled to have their contested peremptory challenges exclude their respective jurors from the venire. If the opposition's non-discriminatory reasons are deemed to be insufficient, then the opposition is not entitled to exercise his contested peremptory challenges on the juror's he intended to exclude. This holding in Batson was expanded through subsequent cases to allow both the defense attorney and the Plaintiff Attorney in criminal and civil cases to make such Batson Challenges. Additionally, the scope of Batson challenges was expanded to include the prevention of peremptory challenges based on gender.

The inventive program and method allow attorneys to make Batson challenges to their counterpart's "Peremptory Challenges WITHOUT Listening and/or Viewing Jurors Respond to the Questionnaire" and/or "Peremptory Challenges WITH Listening and/or Viewing Jurors Respond to the Questionnaire" that are based on race and gender through the website and consistent with the holding of the Batson Court. To clarify, if attorneys are allowed to exercise two sets of peremptory challenges through the invention process which would include exercising peremptory challenges WITHOUT Listening and/or Viewing Jurors Respond and peremptory challenges WITH Listening and/or Viewing Jurors Respond, then the Judge could allow attorneys to exercise two sets of Batson Challenges which would include Batson Challenges for peremptory challenges WITHOUT Listening and/or Viewing Jurors Respond and Batson Challenges for peremptory challenges WITH Listening and/or Viewing Jurors Respond.

If the judge selects the option of Submit Batson Challenges to Peremptory Challenges WITHOUT Listening and/or Viewing Jurors Respond to the Questionnaire, his first task is to set the judicial deadlines for when both the Plaintiff Attorney and the Defense Attorney are to submit such Batson challenges through the website. Both attorneys are only allowed to make their Batson challenges on their counterpart's peremptory challenges; therefore, neither the Defense Attorney or the Plaintiff Attorney will have duplicative Batson contests. As a result, the judge is advised to set the judicial deadlines for both the Plaintiff Attorney and the Defense Attorney at the same time to speed up the jury selection process. Attorneys may only make Batson Challenges to peremptory challenges WITHOUT Listening and/or Viewing Jurors Respond if the judge has allowed attorneys to exercise peremptory challenges WITHOUT Listening and/or Viewing Jurors Respond. Thus, if the judge has selected the option of attorneys exercising peremptory challenges WITHOUT Listening and/or Viewing Jurors Respond and has allowed attorneys to exercise Batson challenges on Peremptory Challenges WITHOUT Listening and/or Viewing Jurors Respond, the Batson challenges on Peremptory Challenges WITHOUT Listening and/or Viewing Jurors Respond may only be made after attorneys are finished exercising peremptory challenges WITHOUT Listening and/or Viewing Jurors Respond. Also, such a deadline for Batson Challenges for Peremptory Challenges WITHOUT Listening and/or Viewing Jurors Respond must be before any deadlines for exercising challenges for cause and/or peremptory challenges WITH Listening and/or Viewing Jurors Respond.

Likewise if the judge selects the option of Submit Batson Challenges to Peremptory Challenges WITH Listening and/or Viewing Jurors Respond to the Questionnaire, his first task is to set the judicial deadlines for when both the Plaintiff Attorney and the Defense Attorney are to submit such Batson challenges through the website. Both attorneys are only allowed to make their Batson challenges on their counterpart's peremptory challenges; therefore, neither the Defense Attorney or the Plaintiff Attorney will have duplicative Batson contests. Thus, the software keeps track of each attorneys peremptory challenge exercises and presents them in a list format for their counterpart's review and exercise of Batson contests. Any juror questionnaires that were ruled to be excluded with a discriminatory peremptory challenge through this Batson process of Griebat Jury Selection will automatically be included in the jury panel or as alternate jurors depending on whether or not the discriminatory peremptory challenge was made on a juror to be considered for the panel or as an alternate. Thus, the juror questionnaires excluded with a discriminatory peremptory challenge will replace just enough of the last juror questionnaires chosen on the panel or as alternates to allow for inclusion of such juror questionnaires to complete the number of jurors to be selected for the panel or as alternates. As a result, the judge is advised to set the judicial deadlines for both the Plaintiff Attorney and the Defense Attorney at the same time to speed up the jury selection process. Attorneys may only make Batson Challenges to peremptory challenges WITH Listening and/or Viewing Jurors Respond if the judge has allowed attorneys to exercise peremptory challenges WITH Listening and/or Viewing Jurors Respond. Thus, if the judge has selected the option of attorneys exercising peremptory challenges WITH Listening and/or Viewing Jurors Respond and has allowed attorneys to exercise Batson challenges on Peremptory Challenges WITH Listening and/or Viewing Jurors Respond, the Batson challenges on Peremptory Challenges WITH Listening and/or Viewing Jurors Respond may only be made after attorneys are finished exercising peremptory challenges WITH Listening and/or Viewing Jurors Respond.

Once the Judge sets these judicial deadlines, both the Plaintiff Attorney and the Defense Attorney are notified with email messages to their personal email accounts of these judicial deadlines for both attorneys. The Court Reporter is also sent an email notifying her that she must print these judicial deadlines.

If the judge selects the option of Submit Batson Challenges on Peremptory Challenges WITHOUT Listening and/or Viewing Jurors Respond, the Judge will be presented with an option of allowing lawyers to listen and/or view jurors respond to the questionnaires and reveal the names and addresses of jurors and their respective anonymous numbers if such anonymous numbers were substituted for juror names and addresses and authorize the disclosure of the jurors races and gender only for purposes of submitting Batson Challenges. Thus, if the judge elects to allow lawyers to listen and/or view jurors respond to the questionnaire and allow disclosure of juror names, addresses, respective anonymous numbers, races and gender for submitting Batson Challenges, the lawyers would be allowed to listen to the jurors voiced responses and/or view physical appearances when responding only for submitting Batson Challenges. They would also be allowed to review the names and addresses of jurors and their respective anonymous numbers.

The reason the judge is presented with this option is because to make a *Batson* Challenge, a lawyer has to show that his counterpart made a peremptory challenge based on the juror's race or gender. Thus, if a lawyer is able to physically see or hear the jurors or otherwise gain knowledge of each jurors race or gender excluded by his counterpart with peremptory challenges, his *Batson* Challenges or prima facie cases will be confirmed or more well grounded. Thus, given all of the options of the invention, actually detecting a juror's race or gender could be quite difficult, and without being able to see or hear the jurors or gain insight into the jurors race and gender, a lawyer potentially could be led to make a prima facie case of discrimination against a juror that is not of the same race or gender of any of the other jurors in his prima facie case.

However, by not allowing lawyers to see or hear the jurors excluded by their counterpart's Peremptory Challenges WITHOUT Listening and/or Viewing Jurors Respond, lawyers will be prevented from making ungrounded *Batson* Challenges. To elaborate, if lawyers are not allowed to see or hear the jurors they exclude with their peremptory challenges, and the lawyers had no information on the race and gender profiles of jurors they excluded with their peremptory challenges, it is still possible to inadvertently and unintentionally exclude several jurors of the same race. For example, a lawyer could unknowingly exclude all six African Americans in the jury pool. Thus, based on the questionnaires on all 6 of those African Americans there was absolutely no evidence or implication of the races of those 6 jurors. Nonetheless, if the opposing attorney is allowed to see and hear these jurors respond he would be able to make a *Batson* prima facie case against his counterpart even though his counterpart presumptively had no idea he excluded 6 black jurors. Therefore, by not allowing lawyers to see and hear jurors respond while submitting *Batson* Challenges to peremptory challenges WITHOUT listening and/or viewing jurors respond would prevent lawyers from submitting unsupported *Batson* Challenges.

Conversely, if there was no evidence of the races or gender of the jurors in their questionnaire responses that were excluded with an attorney's peremptory challenge, and the attorney ended up excluding 6 African Americans, a prima facie case of discrimination could be made that the attorney fraudulently discovered the race of these jurors before he exercised his peremptory challenges on them. Ultimately, the judge has the decision as to whether or not attorneys should be allowed to hear and/or see the jurors respond when making *Batson* Challenges to Peremptory Challenges WITHOUT Listening and/or Viewing the Jurors Respond.

If the Judge selects the option of "Submit *Batson* Challenges to Peremptory Challenges WITH Listening and/or Viewing Jurors Respond to the Questionnaire, the lawyers will automatically be allowed to listen and or view the jurors respond to the questionnaire to assist them in submitting *Batson* Challenges. Additionally, the judge will be advised that he should reveal the names and addresses of jurors and their respective anonymous numbers if such anonymous numbers replaced the juror names before the attorneys exercise their *Batson* Challenges on Peremptory Challenges WITH Listening and/or Viewing Jurors Respond to the Questionnaire.

Other than this disclosure option of juror names, addresses, respective anonymous numbers, race, and gender of *Batson* Challenges for Peremptory Challenges WITHOUT Listening and/or Viewing Juror Responses, *Batson* Challenges for both sets of Peremptory Challenges are conducted in the same way.

If the Plaintiff Attorney was not allowed to submit peremptory challenges for not meeting the judicial deadline, both attorneys will be notified with an email message that the Defense Attorney will not need to submit any *Batson* challenges since the Plaintiff Attorney's peremptory challenges were not accepted. Similarly, if the Defense Attorney was not allowed submit peremptory challenges for not meeting the judicial deadline, both attorneys will be notified with an email message that the Plaintiff Attorney will not need to submit any *Batson* challenges since the Defense Attorney's peremptory challenges were not accepted.

Both the Plaintiff Attorney and Defense Attorney make their *Batson* challenges in the same way. Attorneys are instructed that to make a *Batson* challenge they must make a sufficient prima facie case that their opposition exercised peremptory challenge(s) based on the race and/or gender of jurors. Each attorney will only be allowed to view the juror questionnaires that were excluded by their counterpart's peremptory challenges. Thus, when attorneys log onto the website and begin the process of forming a prima facie case of discrimination, the respective judicial deadline for submitting a prima facie case of discrimination appears at the very top of the screen.

To the left of this deadline appears the current date. Below this deadline and current date, they will be shown a narrow horizontal rectangular box at the top of the screen. Inside this box, will be an interactive list of each juror's name or anonymous number that was excluded by the attorney's opposition with a peremptory challenge. When the attorney click's his cursor on a juror's name or anonymous number, that juror's respective questionnaire appears on the same screen below this rectangular box containing this list. This rectangular box is also equipped with a horizontal scroll bar affixed to the bottom to allow attorneys to view each juror's name or anonymous number excluded with a peremptory challenge by their opposition. The juror's name or anonymous number appears on the selected juror's questionnaire at the top. Directly to the left of this juror's name or anonymous number appears a rating system from 1-10. The rating system consists of a rectangular box with a scroll bar affixed to the bottom. To the left of this box is the number 1. To the right of the box is the number 10 with the word "Contest" to the right of this number 10. By moving the scroll bar from left toward the number 10 and the word "Contest," the number increases. The higher the number the stronger the desire of the attorney is to contest the peremptory challenge. This rating number is simply used to help the attorney remember his initial impression of his desire to contest a particular peremptory challenge in light of all peremptory challenge decisions he has to review.

Attorneys are instructed to read each questionnaire on the screen. Thus, a scroll bar is attached to the right of the questionnaire to allow attorneys to view the entire questionnaire on this screen. The questions will initially appear in black text and the juror's responses will initially appear in green text. After reading each questionnaire, attorneys are instructed to enter a number between 1 and 10. This rating number only serves as a reminder of the attorney's initial impression as to whether he wishes to contest the questionnaire. At the bottom of the screen will be another rectangular box labeled "Confidential Prima Facie Notes." Attorneys are advised to type notes in this box as they read through the questionnaire for responses that tend to reveal a juror's race or gender.

These notes will initially appear in red text. Attorneys are provided with an option to change the font color and size of the questions and the juror responses so they are different colors and sizes which ultimately makes them easier to view for attorneys. These notes will not be reviewed or made accessible to anyone. They are strictly confidential. They are to help the attorney remember the questionnaire in light of all other questionnaires he has to view. A scroll bar is affixed to the right to allow attorneys to type as many notes as they desire. In the bottom margin below this box, is an option entitled "next juror."

When an attorney finishes reading a juror's questionnaire, typing notes, and check marking a box consistent with his initial impression, he can select this next juror option and another juror's questionnaire excluded with a peremptory challenge will appear. Attorney's are instructed to perform the above mentioned tasks on each juror excluded by their opposition's peremptory challenges. Also, in the bottom margin is an option labeled "submission screen." After an attorney has performed these reviewing tasks for each juror questionnaire excluded by their opposition's peremptory challenges, they are instructed to select "submission screen."

The submission screen is where attorneys submit their prima facie cases to the Judge and opposing counsel. On the submission screen, the judicial deadline for submitting a prima facie case appears at the very top with the current date to its immediate right. Directly below this deadline and current date, the interactive name or anonymous number of each juror the opposing attorney has selected to exclude with a peremptory challenge appears in a vertical list. By clicking the cursor on the name or anonymous number of a juror, his/her respective questionnaire appears in full. Directly below each juror's interactive name or anonymous number are the confidential prima facie notes the attorney took as he read through that juror's questionnaire. To the left of each juror's name or anonymous number on the list is a box labeled "contest." By clicking in the box, a check mark will appear. Directly above this box appears the rating number the attorney assigned to the juror's questionnaire. At the bottom of this list of juror names or anonymous numbers and their respective notes is a rectangular box with the words "Prima Facie Case" typed on the inside of it with a flashing cursor. Attorneys are instructed that on this submission screen, attorneys must make sure that the juror questionnaires they wish to make a *Batson* challenge for must have a check mark in the box labeled "Contest."

When a check mark appears in the contest box, the juror's name or anonymous number will automatically appear in the rectangular box labeled prima facie case, and the flashing cursor will appear to the right of this name or anonymous number indicating that the attorney must type an explanation for including this juror in his prima facie case. Thus, to make a sufficient prima facie case, attorney's must include the name or anonymous number of each juror's questionnaire they are making a *Batson* challenge for, and explanation as to why they are including that particular juror's questionnaire in their prima facie case. An attorney's prima facie case will not be sufficient if it does not specify which juror questionnaires are being challenged through *Batson* and a reason why.

When attorney's type their explanation for including a juror's name or anonymous number in their prima facie case, they are instructed to review their confidential notes that they made for that juror appearing in the list. Ultimately, none of the confidential notes will be made accessible to anyone. Only the explanations and juror names or anonymous numbers appearing in the box labeled prima facie case and check marks in the "contest" boxes will be made accessible to the judge, opposing attorney, and court reporter. In the bottom margin of the screen there is an option labeled spelling. Thus, by selecting this option, the attorney can correct any misspelled words in his prima facie case before submitting it. Additionally, there is an option labeled submit. When an attorney is satisfied with his prima facie case, he must select the submit option for his prima facie case to be made accessible to the judge, opposing counsel, and court reporter.

When an attorney submits his prima facie case within its respective deadline, the judge is immediately sent an email message to his personal email account notifying him that he must now log onto the website and rule on the attorney's prima facie case. The opposing attorney is sent an email message to his personal email account notifying him that he may log onto the website and view his counterpart's *Batson* prima facie case. He will also be instructed that he need not submit non-discriminatory reasons for his peremptory exercises challenged by his counterpart through *Batson* until the judge rules that the prima facie case is sustained.

The burden shifts to opposing counsel only when the prima facie case is sustained by the judge. The Court Reporter is sent an email message that she must now log onto the website and print this prima facie case, the respective judicial deadline, the date it was submitted, and the email message notifying that attorney that he may now submit his prima facie case. Such email notification will contain the email address of that attorney and the date it was sent to that attorney.

If an attorney does not submit his prima facie case within his respective judicial deadline, the judge is immediately sent an email message after the deadline passes notifying him of the attorney that did not submit within the deadline and informing the judge that he may now log onto the website and prevent or reject that attorney from submitting *Batson* challenges. If the judge logs onto the website and rejects the attorney's prima facie case, that attorney will not be allowed to submit a prima facie case. Both attorneys will be notified by email message of this rejection and that the opposition will not need to rebut any *Batson* challenges to his peremptory exercises due to this rejection. Additionally, the Court Reporter will be notified with an email message that she must now log onto the website and print this Court Order rejecting this attorney's prima facie case and the respective judicial deadline for that attorney to submit his prima facie case. Also, the Court Reporter is instructed to print the email message notifying that attorney that he may now submit his prima facie case. Such an email message will contain the email address of that attorney and the date it was submitted to that attorney.

As long as the judge does not log onto the website and reject an attorney's prima facie case after its respective judicial deadline, the attorney is still allowed to submit a prima facie case. Immediately after an attorney submits his prima facie case after the judicial deadline and before the judge rejects, the judge is sent an email message that he may now log onto the website and either choose to accept or reject the attorney's prima facie case. If the judge rejects, both attorneys are sent email messages notifying them of the attorneys prima facie case being rejected due to a late submission and that the opposing attorney will not need to submit any rebuttal or non-discriminatory reasons to preserve his peremptory exercises. The Court Reporter is sent an email that she must now log onto the website and print the submitted prima facie case, its respective judicial deadline, the date it was submitted, and the Court Order rejecting it. Also, the Court Reporter is instructed to print the email message notifying that attorney that he may now submit his prima facie case. Such an email message will contain the email address of that attorney and the date it was submitted to that attorney.

If the judge decides to accept the late prima facie case, both attorneys are notified by an email message that it has been accepted by the court and the judge will now rule on it. Thus, the judge is sent an email message that he must now rule on the prima facie case immediately after he opts to accept it. The Court Reporter is sent an email message notifying her that she must now log onto the website and print this prima facie case, the judicial deadline, the date it was submitted, and the Court Order accepting it after the deadline. Also, the Court Reporter is instructed to print the email message notifying that attorney that he many now submit his prima facie case. Such an email message will contain the email address of that attorney and the date it was submitted to that attorney.

When the Judge logs onto the website to rule on an attorney's prima facie case, the judge is first shown the judicial deadline and the date of submission. On the next screen at the top will appear a narrow rectangular box containing the names or anonymous numbers of jurors included in an attorney's prima facie case. The names or anonymous numbers are interactive. By clicking on a name or anonymous number that juror's respective questionnaire responses appears in full on the screen for the judge's viewing. This rectangular box is equipped with a scroll bar affixed directly below to allow the judge to view all of the names or anonymous numbers of jurors included in the attorney's prima facie case. Directly below this rectangular box of juror names or anonymous numbers appears a much larger rectangular box containing the attorney's prima facie case.

This box is equipped with a scroll bar affixed to the far right side to allow the judge to view the entire prima facie case. Directly below this prima facie case are the words "judicial ruling on attorney's prima facie case." Below these words are two boxes. One box is labeled "Sustained" and the other is labeled "Overruled." By clicking the cursor in either box, a check mark will appear. Directly below these two boxes is a rectangular box labeled "optional explanation of prima facie case ruling." A flashing cursor will appear in this box.

To make a ruling on an attorney's prima facie case, the judge is instructed that he must make a check mark in either the sustained box or overruled box. The judge is instructed that he has the option of typing an explanation of his ruling in the rectangular box below; however, such explanation is not necessary to make a proper ruling.

If a judge decides to overrule a prima facie case, he must check the box labeled overruled and/or type an explanation and then select the submit option within the bottom margin of the screen. Once he selects submit, both attorneys are notified by an email message of the attorney whose prima facie case was rejected and that the opposing attorney will not need to submit any rebuttal to the prima facie case because the burden under *Batson* did not shift. Thus, both attorney's are advised that they may log onto the website and view this prima facie case as well as the ruling. The Court Reporter is then sent an email message notifying her that she must now log onto the website and print this judicial ruling and the date such ruling was submitted.

If a judge decides to sustain a prima facie case, he must check the box labeled sustained and/or type an explanation and then the judge must set a judicial deadline for when the opposing attorney must submit non-discriminatory reasons for the exercises of his peremptory challenges included in his counterpart's prima facie case. After the judge sets this deadline, he is instructed to select submit. Once the judge submits, both attorneys are notified with an email message of the attorney whose prima facie case was sustained and that the opposing attorney may now log onto the website and submit non-discriminatory reasons for his peremptory challenges included in his counterpart's prima facie case. Additionally, this email message will contain the judicial deadline for the opposing attorney to submit his non-discriminatory reasons. Also, the Court Reporter is sent an email message notifying her that she must now log onto the website and print this judicial ruling and the date it was submitted as well as the new deadline set for opposing counsel to submit non-discriminatory reasons.

If a prima facie case is sustained, the burden shifts for the opposing attorney to submit non-discriminatory reasons to preserve his peremptory challenges included in his counterpart's prima facie case. Both the Plaintiff Attorney and the Defense Attorney submit their non-discriminatory reasons in the same way. Once an attorney receives the email message instructing him to log onto the website and submit non-discriminatory reasons, the judicial deadline and the current date will appear at the top of the screen. Directly below this deadline and current date will appear a narrow rectangular box. Inside this box will be an interactive list of the names or anonymous numbers of the jurors his counterpart included in his prima facie case of discrimination. By clicking on a name or anonymous number in the box, that juror's questionnaire will appear in full. Affixed to the bottom of this box is a horizontal scroll bar which allows an attorney to view all of the juror names or anonymous numbers included in his counterpart's prima facie case. Directly below these names or anonymous numbers is a large rectangular box containing the prima facie case of his counterpart initially appearing in red text. Below this prima facie case is the judicial ruling of the prima facie case. The judicial ruling will either be "pending," "overruled," or "sustained." Each ruling will initially appear in blue text. If the ruling is pending, that means the judge has not submitted a ruling on the prima facie case. Therefore, no non-discriminatory reasons would need to be submitted at that time. If the ruling is overruled, no non-discriminatory reasons would need to be submitted since the burden did not shift. If the ruling is sustained, a rectangular box at the bottom of the screen will appear with the words "non-discriminatory reasons" appearing with a flashing cursor.

Attorneys are instructed to read their counterpart's prima facie case and review any juror questionnaires as necessary and type their race and/or gender neutral reasons or non-discriminatory reasons at this flashing cursor. The words they type will initially appear in green text. The attorneys will be provided with an option to change the font color and size of the prima facie case so they are different colors and sizes which ultimately makes them easier to view for attorneys. Also, there is an option to correct spelling errors in the non-discriminatory reasons typed. Once the attorney is satisfied with his non-discriminatory reasons, he is instructed to select submit.

If an attorney does not submit his non-discriminatory reasons within their respective judicial deadline, the judge is sent an email message to his personal email account immediately after the deadline lapses instructing him of the attorney that did not submit within the deadline and that he may log onto the website and reject the non-discriminatory reasons of that attorney. If the judge logs onto the website and rejects, both attorneys will be notified with an email message of the attorney that did not submit within the deadline and notifying them that this attorney's non-discriminatory reasons will not be considered by the court. The Court Reporter will be sent an email message instructing her that she must now log onto the website and print the attorney who did not submit his non-discriminatory reasons within the deadline, the respective judicial deadline, and the Court Order rejecting the attorney's non-discriminatory reasons from consideration due to being untimely submitted. Also, the Court Reporter is instructed to print the email message notifying that attorney that he may now submit his non-discriminatory reasons. Such an email message will contain the email address of that attorney and the date it was submitted to that attorney.

As long as the judge does not reject after the deadline, the attorney may still submit his non-discriminatory reasons. Once the attorney submits his non-discriminatory reasons after the deadline, the judge is immediately notified with an email message that he must now log onto the website and choose to accept or reject them. If the judge rejects them, both attorneys are notified with an email message of the attorney whose non-discriminatory reasons were rejected and notified that they will not be considered by the court due to being untimely submitted. The Court Reporter will be notified with an email message that she must now log onto the website and print the name of the attorney whose reasons were rejected, their respective judicial deadline, the date they were submitted, the Court Order rejecting them from consideration, and the non-discriminatory reasons that were submitted by that attorney. Also, the Court Reporter is instructed to print the email message notifying that attorney that he may now submit his non-discriminatory reasons. Such an email message will contain the email address of that attorney and the date it was submitted to that attorney.

If the judge accepts them, both attorneys are notified with email messages of this acceptance the date they were submitted and their respective judicial deadline and notified that they both may log onto the website and view them. The Court Reporter is notified with an email message that she must now log onto the website and print these non-discriminatory reasons, their respective judicial deadline, the date they were submitted, and the Court Order accepting them after the deadline. Also, the Court Reporter is instructed to print the email message notifying that attorney that he may now submit his non-discriminatory reasons. Such an email message will contain the email address of that attorney and the date it was submitted to that attorney. The judge is sent an email message that he may now log onto the website and rule on the attorney's non-discriminatory reasons.

If an attorney submits his non-discriminatory reasons within the respective judicial deadline, the opposing attorney is automatically notified with an email message that he may now log onto the website and view the non-discriminatory reasons. The judge is automatically notified with an email message that he may now log onto the website and rule on these non-discriminatory reasons. The Court Reporter is notified with an email message that she must now log onto the website and print these non-discriminatory reasons, their respective judicial deadline, and the date they were submitted. Also, the Court Reporter is instructed to print the email message notifying that attorney that he may now submit his non-discriminatory reasons. Such an email message will contain the email address of that attorney and the date it was submitted to that attorney.

When the judge logs onto the website, the prima facie case will appear in a rectangular box at the top of the screen with a scroll bar affixed to the right of this box to allow the judge to view the whole prima facie case within the box. This prima facie case will initially appear in red text. Directly below this prima facie case will appear the judge's ruling of the prima facie case which will be sustained if non-discriminatory reasons were to be submitted. This ruling will initially appear in blue text. Directly below this ruling will appear another rectangular box containing the opposing attorney's non-discriminatory reasons which will initially appear in green text. Affixed to the right of this box is a scroll bar to allow the judge to view all of the submitted non-discriminatory reasons within this box. Below this box is another rectangular box containing a vertical interactive list of the names or anonymous numbers of jurors that were included in the prima facie case. To the left of each name on this vertical list are two boxes labeled "preserve" and "exclude."

By clicking the cursor in either box, a check mark will appear. If a judge makes a check mark in the preserve box for a particular juror's name or anonymous number, that respective juror will not be excluded from the venire with a peremptory challenge. If a judge makes a check mark in the exclude box for a particular juror's name or anonymous number, that respective juror will be excluded from the venire with a peremptory challenge. Additionally, when a check mark is made in the exclude box, a strike through line will automatically appear through the name or anonymous number of that juror to indicate that juror's exclusion. The names or anonymous numbers in this vertical list are interactive. By clicking the cursor on a name or anonymous number, that juror's questionnaire responses will appear in full on the screen. Affixed to the right of this rectangular box containing this vertical list is a scroll bar to allow the judge to view all of the names or anonymous numbers of jurors included in the prima facie case.

Below this box containing these names or anonymous numbers of juror's is another rectangular box labeled "explanations of judge's rulings on non-discriminatory reasons" with a flashing cursor to the right of it. To make rulings on the non-discriminatory reasons, the judge must place a check mark in the preserve box or the exclude box for each juror's name or anonymous number on the vertical list and select the option "submit rulings" located within the bottom margin of the screen. The judge has the option of providing explanations for each of his rulings by typing them in the designated box before selecting submit rulings. Thus, the words typed by the judge will initially appear in blue text. The judge will be provided with an option to change the font color and size of the prima facie case, the nondiscriminatory reasons, and the explanations of rulings so they are different colors and sizes which ultimately makes them easier to view for attorneys.

Once the judge selects submit rulings, both attorneys are sent email messages to their personal email accounts that they may now log onto the website and view the judicial rulings on the non-discriminatory reasons and any respective explanations. The Court Reporter is sent an email message instructing her to log onto the website and print these rulings and the date they were submitted. The Court Administrator assigned to the case is sent an email message notifying her of any jurors that were excluded from the venire with challenges for cause and/or peremptory challenges and also instructing her to send necessary mailings to those jurors instructing them that their service for jury duty is no longer required.

8. Prevent Other Types of Discrimination in Jury Selection.

This option is designed to prevent other types of discrimination along with the prevention of racial and gender discrimination. Thus, the judge will be provided with several other types of discrimination other than race and gender. The judge must choose which types of discrimination he would like to prevent. The judge will be able to choose from the following: 1) Sexual Orientation, 2) Religion, 3) National Origin, 4) Age, 5) Alienage, 6) Income or Socio-economic Status, and 6) Legitimacy. The judge may select all options. If a particular form of discrimination that the judge would like to prevent is not listed in the options, the judge will be allowed to type in the category of discrimination he would like to prevent and select submit.

When the judge makes his selections, the type of discrimination he seeks to prevent will be included in the instructions on all features selected by the judge to prevent racial and gender discrimination. For example, if the judge allows lawyers to object to their counterpart's questions that solicit race and gender they will also be instructed that they will be able to object on the additional forms of discrimination that judge selected such as sexual orientation and religious beliefs. Similarly, if instructions concealing race and gender of jurors are provided, instructions concealing the additional types of discrimination will be included. However, if the judge allows attorneys to exercise *Batson* challenges, the judge will be presented with an additional option to expand *Batson* challenges to prevent the additional types of discrimination.

Before the judge makes this decision, he will be warned that the U.S. Supreme Court has not yet expanded the scope of *Batson* to include any other type of discrimination other than race and gender. Thus, the judge will be warned against expanding *Batson* challenges until *Batson* is expanded. Thus, the judge will also be warned that expanding *Batson* could result in a mistrial. After this warning, the judge will then be allowed the option of expanding *Batson* to include his additional forms of discrimination. This option allows the judge to prevent other types of discrimination through the same features and options of the invention that prevent race and gender discrimination by including the selected or typed category of discrimination next to the words race and gender where ever they appear.

Setup of Inventive Jury Selection

A supervising court administrator is provided with a confidential code or password to setup the inventive jury selection process. Once this court administrator enters the correct code, he is instructed to enter the correct name of the courthouse that the invention is to be used for. He is then instructed to enter the address of this courthouse. He is also instructed to enter a website address that is specifically designated for the jury selection in that particular courthouse. He is instructed to enter a phone number designated for juror's to access the method and program process and answer the questions over the phone. He is also instructed to enter his own personal email address so he can receive messages to perform necessary functions of the invention. He is also instructed to enter a courthouse troubleshooting number which is designated for all users to call if there is trouble accessing the program. Once he enters all of this information, he selects the activate option. Upon selecting this option, the website program is set up and can now be accessed by this court administrator.

The program sends this court administrator an email message to the email address he entered informing him that he may now log onto the website and enter pertinent information on other court administrators for them to access the program and/or to enter pertinent information on the judge, plaintiff attorney, defense attorney, and court reporter for a particular case for them to access their respective program.

Overall, the invention includes seven different programs and they are the following: Judge Program, Plaintiff Attorney Program, Defense Attorney Program, Court Reporter Program, Juror Program, Court Administrator Program, and Supervising Court Administrator Program also known as the Master User Program. Every time the judge, plaintiff attorney, defense attorney, court reporter, jurors, court administrator, or master user log onto the website they each must type in the following information to access their respective programs: last name, first name, case number, confidential code, and then select the respective program from the menu which consists of the following: judge, plaintiff attorney, defense attorney, jurors, court reporter, court administrator, and master user.

When the Master User enters this information, he is presented with three options: 1) enter court administrator identifications, 2) enter judge, attorney, and court reporter identifications, and 3) enter juror identifications. By selecting the "enter court administrator identifications" option, the master user can enter certain necessary identification information of other court administrators so they may log onto the website and enter the necessary access information for the judge, attorneys, jurors, and court reporter for a particular case. The information that the master user must enter through the website for court administrators to access the website is the administrator's last name, first name, their personal email address, and assign a confidential code for each administrators. When the master user enters this information for a court administrator and assigns him a confidential code, the program automatically emails the court administrator an email message instructing the court administrator that she may not log onto the website and enter identification information for the judge, attorneys, court reporter, and jurors for any case. She is also instructed that she will be sent a confidential code in a separate email message to access the website and that when she decides to open this email message she needs to be in a secure location. She is also instructed that such confidential code is to be kept strictly confidential and that no one else has access to her confidential code. Thus, the program sends her a separate email message with her confidential code. Overall, a master user can enter this access information for up to 100 different court administrator.

When the master user or other court administrators seek to enter pertinent information for the judge, attorneys, and court reporter to access their respective programs through the website, they first must enter the case number for which the judge, attorneys, and court reporter are conducting jury selection for. They then enter the last name, first name, personal email address, and assign a confidential code for the judge, plaintiff attorney, defense attorney, and court reporter. Such confidential codes are not made viewable to the court administrator or anyone else. They are strictly confidential.

The master user or other court administrators are instructed to not enter the necessary juror information until they receive an email message instructing them of the number of juror identifications they are to enter. Thus, once the judge submits the number of jurors that are to answer the questionnaire, the master user or court administrator will be sent an email message that they may now enter each juror's first name, last name, the case number they are called for duty, and assign each juror a confidential code for them to enter and answer the questionnaire. Once the master user or other court administrator logs on to the website to enter this pertinent information for jurors to access the invention program by phone, website, or other interactive response device to answer questions, they first enter the case number the juror is called for jury duty on, the juror's last name, first name, and assign each juror a confidential code. Also, the Master User or Court Administrator is instructed to print these juror identification information. The Master User or Court Administrator is not to mail this information to the jurors until they receive an email message notifying them that the judge has submitted the questionnaire to the jurors and the juror's first name, last name, case number, and confidential code must be mailed to each juror. Additionally, the Master User or Court Administrator is not to mail any juror information to jurors until they receive an email message from the judge that states how the jurors are to respond to the questionnaire.

This email will specify if jurors are to respond to the questionnaire by their phone and/or through the website or receive the questionnaire via U.S. Mail or email and handwrite or type their responses and mail it back to the Courthouse. When this email specifies how jurors are to respond it will include the necessary phone number jurors are to call if they are to respond by phone and/or it will contain the designated website address for them to respond through the website or it will contain the address of the courthouse if jurors are to handwrite or type their responses and mail it back. Therefore, the phone number and/or website or the address with specific instructions on how the jurors are to respond must be included in the same mailing with the access information the jurors need such as their last name, first name, case number, and confidential code. The invention allows up to 500 jurors to be entered and access the program per case. Also, the inventive software and method can be administered for up to 100 different cases at the same time and it can be accessed 24 hours a day 7 days a week.

Once the pertinent identification information for the judge, attorneys, and court reporter for a particular case number are entered, the judge for that particular case is sent an email message instructing him that he must now log onto the website and setup the invention process for his particular case. He is also instructed that he will be sent another separate email message notifying him of his confidential code to access the program. He is instructed to be in a secure location to open this message so no one will be able to view his confidential code. Thus, the program sends him this email message with his confidential code.

Before the judge sets up the jury selection process, he is instructed to review all of the features of the inventive software and method, and decide what options, if any, he would like to utilize and whether he would like to use the disclosed invention to completely replace conventional jury selection or accommodate conventional jury selection. He is also instructed to thoroughly review all of the practical uses of the invention and its advantages and disadvantages.

If one wishes to exercise challenges for cause and/or peremptory challenges outside of court and exercise challenges for cause and/or peremptory challenges inside of court in conventional jury selection then he will be instructed to make the jury pool big enough to allow for the number of peremptory challenges and challenges for cause he wishes to have exercised through the invention and in court conventional jury selection. The judge will also be instructed that any the invention options selected must be completed before in court conventional jury selection. The judge will also be instructed that the more jury selection features are selected, the longer it will take for the invention to complete its task. Therefore, the Court must consider the time factor before the trial is to take place.

Once the judge has thought out his desired jury selection process, the Court must select what features of the invention it wishes to utilize and what traditional features of conventional in court jury selection he wishes to utilize. The purpose of this is to create one combined description of the jury selection process that has the features of invention that will be used and their respective dates and/or the features of conventional in court jury selection and the respective date they will be utilized. This description of the jury selection process will be automatically formed after the judge enters the pertinent information and selects the options of software and method and/or selects the options of conventional jury selection and enters the respective deadlines for all of the features chosen. Even if the judge simply wants to use the invention to simply question jurors and obtain responses, he still must enter pertinent deadlines for that process to be completed and he still must select the conventional in court jury selection features he wishes to utilize and the date in court conventional jury selection is to begin. This description of the process will be automatically formed and presented to the attorneys each time they log onto the website and enter their program's main menu of functions.

Once this description of the process is completed, the court reporter will be sent an email message to log onto the website and print this description of the jury selection process and file it in the court's file for transcript/appeal purposes.

When the judge logs onto the website to setup the jury selection program, he is instructed to select whether the jury selection process is for a grand jury, a jury trial, or jury for sentencing. If the jury is to be used for some purpose other than the ones listed, he will be provided with a rectangular box with a cursor to type the purpose of the jury. Thus, the invention Software can be used for any type of jury selection. The judge is then instructed to enter the number of jurors that are to be empaneled. He is then instructed to enter the number of alternate jurors that are to be selected. He then is instructed to enter the number of jurors that are to be included in the jury pool. He is then instructed to enter the jurisdiction his court is in. Thus, the jurisdiction is necessary for the program to include the appropriate statutory juror qualification questions to be asked first of the jurors before the attorney questions are asked of the jurors. Thus, once the jurisdiction is selected, the invention automatically provides the jurisdictions specific juror statutory qualification questions to the questionnaire. Selecting the appropriate jurisdiction is also necessary for the invention Software to provide the correct statute specifying the grounds for challenges for cause to the attorneys and judge if the judge elects to have any form of challenges for cause exercised.

The judge must also select how the jurors will be questioned: Lawyer Examination, Judge Examination, or Hybrid Examination. The judge also will have the option to add or amend the generic rules to each of these examinations by deleting or adding words of these generic rules with word processing keys or he may enter his own rules.

The judge must then decide the type of questioning approach: 1) Open Approach, 2) Restrictive Approach. The judge will also have the option of adding or amending the rules of each of these approaches by deleting or adding words of these generic rules with word processing keys or he may enter his own approach rules.

The judge must also decide if he wants both attorneys to submit their jury selection questions at the same time or have the Plaintiff Attorney submit his jury selection questions at an earlier date than that of the Defense Attorney.

Once the judge has entered this above required information, he is then instructed that he may select any or all of the following options provided by the invention mentioned above to meet his court's jury selection needs for his court:

1) Instructions Concealing Juror Race & Gender.

2) Objections to Questions Soliciting Race & Gender. (If the judge must selects this objection option, he must decide whether or not to allow attorneys to submit rebuttals to their counterpart's objections.)

3) Edit Juror Responses Revealing Race & Gender.

4) Substitute Anonymous Numbers for Juror Names on Questionnaires.

5) Exercise Challenges for Cause WITHOUT Listening and/or Viewing Jurors Respond. (If the judge selects this option he must enter the number of such challenges for cause each attorney is allowed to exercise or select the unlimited option which gives attorneys an unlimited number to exercise. The judge will also have to decide whether to have attorneys exercise such challenges for cause at the same time or have the Plaintiff Attorney exercise his at an earlier date than that of the Defense Attorney. The Judge will also have to enter the number of jurors eligible to be excluded with such challenges for cause. The judge must also select whether to allow attorneys to submit rebuttals to their counterpart's challenges for cause.)

6) Exercise Peremptory Challenges WITHOUT Listening and/or Viewing Jurors Respond. (If the judge selects this option he must enter the number of such peremptory challenges each attorney is allowed to exercise. He also must decide how many jurors will be eligible for exclusion with such peremptory challenges. The Judge also must decide whether such peremptories will be exercised by the "Strike Process" or "Panel Process." If the Judge selects the Strike Process, he will have to decide whether attorneys will exercise their peremptory challenges at the same time, or have the Plaintiff Attorney exercise first followed by the Defense Attorney, or have both the Plaintiff Attorney and the Defense Attorney log onto the website at the same time and exercise their peremptories by alternating back and forth. If the judge selects the strike process and has the attorneys log onto the website and exercise by alternating, the judge will have to set the time limit each attorney will have to make a peremptory challenge exercise.)

7) Submit *Batson* Challenges to Peremptory Challenges WITHOUT Listening and/or Viewing Jurors Respond. (If the judge selects this option he must make a selection as to whether or not attorneys should be allowed to listen and view jurors respond to the questionnaire and authorize the disclosure of juror names, addresses, respective anonymous numbers when attorneys submit their *Batson* Challenges.)

8) Prevent Other Types of Discrimination in Jury Selection. (If the judge selects this option he must select from either the following choices or manually type up to five additional classes not listed among the choices: 1) Sexual Orientation, 2) Religion, 3) National Origin, 4) Age, 5) Alienage, 6) Legitimacy, 7) Marital Status, 8) Socio-Economic Status, 9) Education, 10) Occupation, and 11) Employment Status.

9) Video Record Juror's Orally Respond to the Questionnaire.

10) Order Jurors to Respond to the Questionnaire by Typing Through the Website. (If this option is selected, the judge must decide if the jurors will only be allowed to respond by typing through the website or will the jurors be allowed to respond by typing through the website and respond by phone.)

11) Order Jurors to Respond to Questionnaire by Handwriting or Typing. (If the Judge selects this option, he must decide if jurors are to handwrite their responses or type their responses, and he must decide if the questionnaires are to be mailed and/or emailed to the jurors.)

12) Allow Attorneys to Submit their Jury Selection Questions by Phone.

13) Exercise Challenges for Cause WITH Listening and/or Viewing the Jurors Respond. (If the judge selects this option he must enter the number of such challenges for cause each attorney is allowed to exercise or select the unlimited option which gives attorneys an unlimited number to exercise. The judge will also have to decide whether to have attorneys exercise such challenges for cause at the same time or have the Plaintiff Attorney exercise his at an earlier date than that of the Defense Attorney. The Judge will also have to enter the number of jurors eligible to be excluded with such challenges for cause. The judge must also select whether to allow attorneys to submit rebuttals to their counterpart's challenges for cause.)

14) Expand Challenges for Cause Grounds to Include Inconsistent Responses.

15) Exercise Peremptory Challenges WITH Listening and/or Viewing the Jurors Respond. (If the judge selects this option he must enter the number of such peremptory challenges each attorney is allowed to exercise. He also must decide how many jurors will be eligible for exclusion with such peremptory challenges. The Judge also must decide whether such peremptories will be exercised by the "Strike Process" or "Panel Process." If the Judge selects the Strike Process, he will have to decide whether attorneys will exercise their peremptory challenges at the same time, or have the Plaintiff Attorney exercise first followed by the Defense Attorney, or have both the Plaintiff Attorney and the Defense Attorney log onto the website at the same time and exercise their peremptories by alternating back and forth. If the judge selects the strike process and has the attorneys log onto the website and exercise by alternating, the judge will have to set the time limit each attorney will have to make a peremptory challenge exercise.)

16) Submit *Batson* Challenges to Peremptory Challenges WITH Listening and/or Viewing Jurors Respond.

17) Panel Process Allowing Attorneys to Exercise Challenges for Cause WITHOUT Listening and/or Viewing and Exercise Peremptory Challenges WITHOUT Listening and/or Viewing Before Tendering the Panel to Their Counterpart. (If the judge selects this option, he will have to set the deadline for when the Plaintiff Attorney must tender to the Defense Attorney, and he must set a deadline for the Defense Attorney to tender back to the Plaintiff Attorney. He must also select how many jurors will be eligible for exclusion as well as the number of challenges for cause and peremptory challenges each attorney is allowed to exercise. He must also select whether attorneys are allowed to submit rebuttals and the number of hours or day(s) each attorney is allowed to submit rebuttals.

These above mentioned options are all interactive. If the judge clicks his cursor on any of these options, their complete description will appear on the screen to refresh the judge's memory. When the description appears on the screen, there is a scroll bar affixed to the right side to allow the judge to view the complete description on the screen. In the bottom margin, of this description is a close window. When the judge clicks on close, the description disappears and the above menu reappears.

Once the judge selects from the above mentioned options or refuses to select any of the above mentioned options, he then must select any features of jury selection that he wishes to use in conventional in court jury selection and they are the following: 1) Exercise Challenges for Cause with Jury Present. (If the judge selects this option, he must enter the number of challenges for cause each attorney is to exercise on jurors in court.) 2) Expand Challenge for Cause Grounds to Include Inconsistent Responses. 3) Exercise Peremptory Challenges with Jury Present. 4) Allow Attorneys to Submit *Batson* Challenges on Peremptory Challenges Exercised with Jurors Present.

Referring to option 2, expand challenge for cause grounds to include inconsistent responses, the judge will be instructed that if he selects this option to be included in conventional in court jury selection, this invention will explain in the description of the jury selection process that the jurisdiction's respective statute that specifies the grounds of excluding jurors with a challenge for cause will be expanded to allow attorneys to exclude jurors whose physical gestures and/or voice responses to a particular question are inconsistent with the concept or context of their responses to a particular question presented to them in court or on the invention questionnaire before court. Attorneys would also be instructed that his expansion of the statute would also allow attorneys to exclude a juror with a challenge for cause if the context or concept of their response to a question presented to them on the questionnaire is inconsistent with a response to a substantially similar question presented to them in conventional in court jury selection.

Hypothetically, if a particular juror is asked the question on the questionnaire before she appears in court as to whether or not she believes in the death penalty, and she responds "yes" and subsequently she is asked substantially the same question in court and she responds "Yes" but is shaking her head indicating no. She may be excluded for cause under this expanded ground of inconsistent answer.

Another hypothetical is if a particular juror is asked the question for the first time in court if he has ever drank alcohol and he responds "No," but he said the word "No" in a sarcastic tone of voice, he may be excluded for cause under this expanded ground of inconsistent answer.

If the judge selects this option of expanding his jurisdiction's statutory grounds for challenges for cause that are exercised in conventional in court jury selection, attorneys will be instructed in the description of the jury selection process each time they log onto the website and perform a function using the invention that when they are allowed to exercise their challenges for cause in conventional in court jury selection their jurisdiction's statute specifying grounds for cause has been expanded and that they will be allowed to exclude any juror whose "physical gestures and/or voice tones to a particular question presented to them either on the questionnaire and/or in court is inconsistent with the context or concept of their verbal response, and they will be allowed to exclude any juror whose response to a question presented to them in the conventional in court phase of jury selection."

If the judge selects this option of expanding his jurisdiction's statutory grounds for challenges for cause in the conventional in court selection phase both attorneys will be conspicuously informed, in the description of the jury selection process, of this expanded standard and will be informed of the above mentioned hypotheticals to help each attorney grasp the concept of this expanded standard and use it as an additional tool for excluding jurors in the conventional in court jury selection phase.

Before the judge selects this option of expanding the grounds to include inconsistent responses he will be instructed that he may only select this option if he has selected the option of exercising challenges for cause with jury present. Thus, if attorneys are not allowed to exercise challenges for cause in court then the grounds cannot be expanded. The judge will also be conspicuously warned before he selects this expanded ground option that if his jurisdiction's legislature has not amended its statute specifying grounds to exclude juror's with challenges for cause to include this above stated ground of inconsistent responses, selecting this feature of the invention that instructs attorneys in the description of the jury selection process that the statutory grounds for challenges for cause of their jurisdiction in the conventional in court jury selection phase of the process may be illegal or considered to be a violation of the jurisdiction's separation of powers doctrine. Such a violation could result in a mistrial. Therefore, the judge would be advised to not include this feature until his respective legislature amends its challenge for cause statute to include the above proposed expanded grounds or the judge has received approval from appropriate authorities that parallels the effect of such legislative amendment.

The other options of conventional in court jury selection are the rest of the same traditional features of selecting jurors in today's courts. If the judge wishes to conduct all of the jury selection process through the invention, then he will be instructed to not select any of the features presented under conventional in court jury selection features.

After the judge has entered the required information in regards to the jury pool, number of jurors to be empaneled etc., and the judge has selected and/or refused to select from any of the options presented under the invention Options and conventional in court jury selection the judge then is instructed to enter the judicial deadlines for when the features of the jury selection process is to be completed. Before the judge enters these dates, he is instructed that all features of the invention chosen must be competed before any conventional in court jury selection features may take place. Based on the features selected by the judge, the invention will automatically present exactly which deadlines need to be entered in a vertical list with the feature requiring the earliest deadline to be presented at the top of the list and the feature requiring the latest deadline to be at the bottom of the list. Thus, the vertical list requiring deadlines will be in a time sequential order with the earliest deadline at the top and the latest deadline at the bottom. The judge will be instructed that he must enter a deadline in each designated space presented in the vertical list and that each date going down the list should be later than the date directly above it unless two deadlines may be the same. For example, both the Plaintiff Attorney and the Defense Attorney may submit their *Batson* Challenges at the same time. Therefore, the judge will be instructed to set the submission of *Batson* challenges for both attorneys at the same time. The judge will also be instructed that when entering deadlines he should give each attorney adequate and equal time to complete their functions and for the judge to submit rulings before the any subsequent features are to begin.

For example, if the judge elected to have the Plaintiff Attorney submit his jury selection questions at an earlier date than that of the Defense Attorney, and if the judge selected the option of allowing attorneys to exercise peremptory challenges WITHOUT viewing and or listening to jurors respond from the invention list of options, and the judge then selected challenges for cause with jury present and the option to expand the standard of the jurisdiction's grounds for challenges for cause to include the inconsistent responses provision in the conventional in court jury selection features the deadlines presented to him would be in a vertical list as follows:

Enter judicial deadline for Plaintiff Attorney to Submit Jury Selection Questions:

Enter judicial deadline for Defense Attorney to Submit Jury Selection Questions:

Enter judicial deadline for jurors to respond to the questionnaire:

Enter judicial deadline for Plaintiff Attorney to exercise peremptory challenges WITHOUT Listening and/or Viewing Jurors Respond:

Enter judicial deadline for Defense Attorney to exercise peremptory challenges WITHOUT Listening and/or Viewing Jurors Respond:

Enter judicial deadline for when in court conventional jury selection is to take place:

In a preferred embodiment of the invention, it automatically lists all features requiring deadlines even though the judge did not select some of them from the options. Thus, attorneys submitting jury selection questions is a basic feature of the inventive program and process; therefore, they are automatically included in the list without a judge selecting them. They are also coordinated in the proper order with any optional features the judge selects. Note also that any in court features selected will all be summed up under one deadline since all features are exercised usually on the same date the jurors are questioned. Finally, the invention does not require any deadline for the expanded ground for challenges for cause; therefore, the invention does not allow space for any such deadline not required. However, the expanded ground selected option would be conspicuously mentioned in the description of the jury selection process.

As stated above, the invention also provides the additional feature of explaining the entire jury selection process created by the judge after the judge has finished entering information and/or selecting from the options of the invention, and the options of conventional in court jury selection and set all necessary judicial deadlines. Thus, once the judge finishes typing in the number of jurors to be included in the jury pool and all other information required above and the judge selects options of the software and method, or decides not to select any options of them, the invention automatically produces a "Description of the Jury Selection Process." Since the inventive software and method can accommodate conventional jury selection or can be used to completely replace conventional jury selection, a comprehensive description of the jury selection process that is to take place entirely or partly in the inventive software and method.

The purpose of this description of the jury selection process is to inform attorneys of the entire process of how jurors are to be selected. It will prevent the attorneys from becoming confused, and it will make them aware of what to expect so they can better plan their jury selection strategies. This description of the jury selection process will be presented each time the attorneys select their main menu of functions in their respective programs. Thus, their main menu of functions will only include functions that they are allowed to perform in the description of the jury selection process.

The description of the jury selection process will include the type of trial proceeding the jury selection is for which will be either grand jury, jury trial, sentencing jury or any other type of jury entered by the judge, the number of jurors to be empaneled, the number of alternate jurors to be selected, the number of jurors to be included in the jury pool, the name of the jurisdiction, the type of examination, the typed of questioning approach, the basic inventive program and process combined with any options selected by the judge and their respective deadlines, and any options of conventional jury selection selected by the judge and the deadline they are to begin. It will also specify the numbers of any and all selected types of challenges for cause and peremptory challenges each attorney will be allowed to exercise either through the unique invention(s) and/or conventional in court jury selection.

Once the description of the jury selection process is automatically formed by the invention, the judge is instructed to review the process. If the judge wishes to change the process, he simply needs to go back and make any changes in either information he entered or the options he selected. If the judge is satisfied with the description of the jury selection process, he will be instructed to select submit within the bottom margin. Upon selecting submit, the main menu of functions in the Plaintiff Attorney Program, the Defense Attorney Program, the Court Reporter Program, and the Judge Program will automatically be adjusted to only include the necessary functions that each different participant is instructed to perform in the description of the jury selection process.

Once a description of the jury selection process is automatically made, and the judge has approved this process by submitting it, the invention process begins and the Plaintiff Attorney or both the Plaintiff Attorney and the Defense Attorney is sent an email message to his personal email address notifying the Plaintiff Attorney or both the Plaintiff Attorney and the Defense Attorney to log onto the website and enter jury selection questions through the website, and that a different confidential code will be sent to each of them in a separate email message and that they should be in a secure location before opening this message so his confidential code will remain confidential and not be revealed to anyone. Thus, the Plaintiff Attorney and the Defense Attorney log onto their respective program, and they begin to enter their jury selection questions. The Master User or Court Administrator assigned to the case is sent an email message notifying her of the number of jurors who are ordered to respond to the questionnaire as well as the method jurors are to respond to the questionnaire whether it be by phone, website, etc., and she is instructed to log onto the website and enter the first name, last name, case number, and assign a confidential code for each juror up to the judicially ordered number of jurors who are to answer the questionnaire. She is additionally instructed in this email message that she is not to mail such information to each juror until the judge makes the questionnaire available to the jurors.

Each time the court administrator, court reporter, judge, plaintiff attorney, and defense attorney, or jurors log onto the website, the invention logo appears at the very top of the screen. Directly below this logo appears the name of the courthouse, the address of the courthouse, and the troubleshooting number that was entered by the supervising court administrator or master user. When each different user logs into their respective programs, the invention logo, courthouse name, address, and troubleshooting number appear on every screen. Directly below the troubleshooting number appears the name of the individual user's respective program and the respective case number. For example, such names would be the following depending on the respective user: "Master User Program for 04 CR 1984," "Court Administrator Program for 04 CR 1984," "Judge Program for 04 CR 1984," "Plaintiff Attorney Program for 04 CR 1984," "Defense Attorney Program for 04 CR 1984," and "Court Reporter Program for 04 CR 1984."

Every email message sent includes the date the message was sent, the name of the user it is being sent to, and the interactive website address link to access the invention programs. Also, any time lawyers and the judge submit anything jury selection questions, rulings, etc., they will be presented with a statement that asks: "Are you sure you want to submit?" If they select submit, their product will be submitted. If they select "Do Not Submit" or select previous, their product will not be submitted. Every time lawyers and the judge submit anything, they will be sent a receipt of submission message emailed to their personal email account that specifies what they submitted and who it was sent to and the time it was sent and confirmation that it was sent to the appropriate email addresses.

Also, with every function that the judge and both attorneys are required to perform, the judge and attorneys are provided with spelling options to help them correct any spelling errors before submitting. Also, with every function that the judge and both attorneys are required to perform, the judge and attorneys are provided with font color/size options to change to the colors and sizes of questions, responses, explanations of rulings, rebuttals etc to where they are all different colors and sizes to make them easier to view.

Finally, the software automatically keeps track of each different piece of information the Court Reporter is instructed to print and place in the court file for a particular case. After every deadline of the invention passes, and after the Court Reporter has printed all required criteria that is ordered to be printed, the software automatically sends an email message to the Court Administrator instructing her to delete all information in the case. However, she is instructed to check the court file check list and ensure that all required documents are included.

Advantages of Inventive Jury Selection Software

The inventive software and method provides advantages to all participants in jury selection, to society, and to the pursuit of justice.

Advantages to Attorneys

The invention will produce great advantages for attorneys.

A. Lawyers can Ask Jurors an Unlimited Number of Questions.

In conventional in court questioning of jurors, time constraints are imposed on lawyers. As a consequence, lawyers usually do not have the opportunity of asking the jurors all the questions they would like to ask. Since Griebat Jury Selection allows lawyers to question jurors outside of court through the use of a phone or website, lawyers are not restricted by the time constraints of conventional jury questioning. Therefore, lawyers can ask jurors as many questions as they desire. Since lawyers can ask as many questions as they desire, they can obtain unlimited information. Additionally, lawyers can ask jurors as many questions as they desire because the lengthy number of questions would not burden the jurors in the new and improved jury selection invention. Jurors do not have to answer all of the questions in one sitting. Jurors can make as many phone calls or log onto the website and answer questions as many times as they need to in order to complete the questionnaire. Also, the Jurors would be allowed to respond to the questionnaire at any time 24 hours a day 7 days a week.

B. Lawyers can Ask Each Individual Juror Every Question.

Due to the time constraints of in court questioning of jurors, lawyers often do not get to ask each juror every question. For example, a lawyer may ask Juror Smith what he thinks the term reasonable doubt means. The lawyer likely would not have the time to ask each juror this same question. With the invention, each juror is ordered to respond to each question on the questionnaire which ultimately provides more information on each juror than could be acquired in conventional in court jury selection.

C. Lawyers can Obtain More Accurate Information on Jurors

In conventional in court jury selection, jurors are questioned by lawyers in front of all other jurors in the pool. As a result, jurors commonly listen to their fellow jurors respond to the attorney questions, and when they are presented with a substantially similar question, they sometimes adopt the expressed views of their fellow jurors and respond in the same way even if their opinion may have initially differed form their fellow juror's response. In the invention, the out of court process of questioning jurors occurs before the jurors appear in court and have an opportunity to adopt the opinions of their fellow jurors. Additionally, in the invention, jurors are instructed that they are not to consult with any fellow jurors or attorneys or anyone before or during their responding to the questionnaire.

They are instructed to respond in private and out of the presence of other jurors. Additionally, they are instructed that they must only respond based on their true beliefs. Also, to ensure that jurors do not conform their responses with anyone, the invention administers an oath to jurors. Also, to ensure that jurors do not conform their responses, the invention Software records the oral responses of jurors if jurors respond by phone so attorneys can detect fraud. Ultimately, the inability of jurors being able to respond in the presence of other jurors or lawyers through the invention, provides attorneys with more accurate information as to the true beliefs of jurors.

D. Lawyers can Make More Informed and Intelligent Juror Selections.

Given the time constraints of conventional jury selection and the inability of lawyers to ask each juror an adequate number of questions, lawyers often have to resort to their instincts and unreliable stereotypes and statistics about people when making juror selections. Since this invention allows lawyers to ask an unlimited number of questions of each individual juror and prevents jurors from conforming their responses, lawyers will undoubtedly gain significantly more accurate information on the mental impressions of each juror. Such enhanced information generated through this invention will decrease the desire of attorneys to rely on unreliable types and statistics.

E. Lawyers can More Efficiently Question Jurors in Court.

Since the inventive program and method can be used to accommodate conventional in court jury selection, it can be used as a tool to make in court questioning of jurors more efficient and more productive. Since lawyers can ask each individual juror an unlimited number of questions and can receive unconformed responses through the inventive method and program before they question jurors in court, lawyers are instructed to print, read, and study each jurors individual questionnaire responses and bring them with them to court.

Before jurors ever question jurors in court for the first time, they will already know what specific questions and responses they need to clarify with each juror. Instead of starting at square one with the jury pool and asking all jurors blanket questions, lawyers can immediately call out a particular juror's name and question that juror on a specific questionnaire response of that juror that the lawyer would like to have clarified or probe a little deeper into the juror's insight in regards to that particular question. Additionally, lawyers can predetermine their jury selections before they question jurors in court and become subject to the same constraints of conventional in court questioning of jurors. Ultimately, lawyers would be able to make conventional in court questioning of jurors more efficient and more productive.

F. Lawyers can Avoid Juror Hostility Towards them and their Clients.

In conventional in court questioning of jurors, jurors sometime become angry with the way a lawyer presents a question to them. Sometimes jurors mistake the lawyer's tone and demeanor towards them when a lawyer initially questions them. Sometimes the juror becomes embarrassed responding in front of their peer jurors which leads to answering the lawyer's questions in a hostile manner. Sometimes the lawyer may appear argumentative the invention can prevent such hostility towards lawyers since the lawyers do not question the jurors in person nor does the lawyers voice read the questions to the jurors.

The questions are presented to the jurors by an automated voice and/or through typed questions via website, U.S. Mail, or email. Additionally, jurors answer the questions in private and out of the presence of jurors which relieves them of any anxiety or pressure that commonly occurs with in court questioning. Also, the invention allows lawyers the opportunity to ask jurors probing uncomfortable questions that might invite a hostile reaction without being in the presence of the jurors.

G. Lawyers can Prepare More Effective Trial Strategies.

Since the inventive jury selection program and method ultimately can obtain unlimited unconformed information on jurors, lawyers undoubtedly could gain more insight into the thought processes of jurors and learn how sensitive some jurors are and what the jurors think is important. For example, in a murder case involving a well known and liked victim in a small community, all 150 people in the jury pool are asked on a questionnaire if they have heard about the defendant in the paper and whether or not they believe he is innocent until he is proved guilty by the state. 96 of the jurors respond by saying something to the effect of even though they dearly miss the victim and are deeply saddened by her loss they still feel like they could presume the defendant innocent until proved guilty. Given this overwhelmingly consistent response, the defense attorney may undoubtedly include in his defense strategy a plan to express sympathy for the victim and her family in front of the jury and take on a more sincere tone rather than an aggressive argumentative tone. The prosecutor on the other hand may use this knowledge from the questionnaire to be more aggressive and attempt to arouse the jurors into seeking justice for the victim. Ultimately, with such great insight into the impressions of jurors, the invention can help lawyers prepare more effective trial strategies.

H. Lawyers can Obtain More Confidence in a Jury Verdict.

With lawyers being able to make more informed juror selections with the invention do to the abundance and quality of information it produces on each juror, lawyers will have more confidence in the jurors to properly weigh the evidence they have presented and reach a just verdict. Additionally, with the invention's capability of substantially reducing any possibility of jurors being excluded based on their race or gender, criminal defense lawyers and civil litigants representing minority clients seeing minority jurors empaneled and prevented from being excluded may make them feel more confident in a jury decision.

I. The Invention is More Feasible for Lawyers.

In conventional jury selection, lawyers are sometimes allowed to submit questionnaires to the jurors. The lawyers type their questions and then file them with the court. However, the inventive method's use of the questionnaires to jurors is more convenient for lawyers. It allows lawyers to submit their questions from the luxury of their personal phone or personal computer at any time day or night 24 hours a day, 7 days a week. Additionally, the invention automatically presents the statutory juror qualification questions on the questionnaire and prevents lawyers from duplicating their counterpart's questions which could have the effect of annoying the jurors. Also, unlike conventional questionnaire administration where the jurors only have the option of typing or handwriting their responses, the invention allows lawyers the option of obtaining the natural voice responses of jurors that they would receive if they were to ask the jurors the questions themselves. Additionally, the invention, is more feasible in detecting fraud since it automatically records each jurors voiced responses. Also, the invention provides all of the benefits of conventional in court jury selection by allowing lawyers to exercise challenges for cause, peremptory challenges, and *Batson* Challenges the invention also provides the option of viewing jurors respond and listening to jurors respond the invention is more feasible than conventional in court jury selection since lawyers can make all necessary challenges for cause and peremptory challenges from their personal office without going to court.

J. Lawyers can be Provided with a Better Environment for Selecting Jurors.

Given the time constraints of conventional in court jury selection, lawyers have to quickly make challenges for cause and peremptory challenges. They struggle to take notes on juror responses and write juror names as they are questioning jurors. Usually, they base their challenges for cause and peremptory challenges on their sporadic notes and instincts and stereotypes. Conversely, with the invention's capability of selecting jurors outside of court, lawyers are not subject to the rigorous time constraints of conventional jury selection; therefore, a judge could allow a lawyer days and even weeks to make challenges for cause and peremptory challenges decisions. Additionally, the invention allows the opportunity for viewing and listening to jurors respond and recording juror responses in a typed format, lawyers can thoroughly study each juror and consult with their assistants before making their selections. Thus, their selections will be more thought out and calculated.

K. Lawyers May be Provided with an Extra Tool to Select Jurors.

The invention gives the option of expanding the grounds for Challenges for Cause WITH Listening and/or Viewing Jurors Respond to allow attorneys to exclude jurors whose contextual statements are inconsistent with their physical gestures and tone of voice, lawyers can be provided with an additional tool to help them make the juror selections they desire.

2. Advantage to Jurors

A. Prevents Juror Discrimination

The invention provides many options o for preventing race and gender discrimination; race and gender discrimination can almost be completely eliminated. Thus, Jurors can no longer be denied their civic duty of serving on a jury due to their race or gender. Jurors no longer will have to feel that they are not allowed to serve on a jury panel due to their race or gender.

B. Relieves Jurors of Anxiety of Answering Questions in Court.

In Conventional jury selection, jurors often feel anxiety among other jurors. They sometimes feel their intelligence threatened when lawyers appear to interrogate them on their beliefs of the law. They sometimes feel pressured into conforming their answers with other jurors, or feel pressured into telling lawyers what they want to hear instead of expressing their true opinions. The invention allows jurors to answer the questions in the comfort of their own home, and they are instructed not to answer their questions in the presence of other jurors or attorneys. Additionally, they are instructed to not consult with anyone while responding to the questions. Thus, the invention enables a forum that would relieve jurors of the pressures of conventional jury selection.

C. Can Prevent Most Jurors from Missing Work Due to Jury Selection.

Because the invention can conduct jury selection outside of court, jurors likely would not have to take off work or find babysitters to participate in jury selection. Additionally, since jurors could respond to the questions at anytime 24 hours a day, 7 days a week, the invention can accommodate any juror's schedule. Also, with the invention, jurors can stop answering questions at anytime and finish responding at anytime before the deadline. Thus, if jurors get tired of answering or due not have the time to answer all of the questions in one sitting, they can start and stop answering as many times as necessary to complete the questionnaire.

Advantages to Judges

A. Judges could be Prevented from Making Difficult *Batson* Rulings.

The invention gives numerous options that prevent jurors from being excluded based on their race and gender such as lawyers not being allowed to view or listen to jurors when making juror selections, the judge being able to make edits to responses revealing race and gender, lawyers being able to object to questions soliciting race and gender, and anonymous numbers being substituted for actual juror names undoubtedly will make *Batson* decisions much easier. In conventional jury selection, much research of case law throughout many jurisdictions shows that the test carved out in *Batson* v. *Ken-*

*tucky* simply does not work in preventing race and gender discrimination. Lawyers easily can circumvent the test since a peremptory challenge can be based on anything but race and gender. Thus, lawyers easily can make up a reason to preserve their peremptory exercise. However, with the invention, the race and gender of jurors likely will not be revealed to the lawyers when they exercise their peremptory challenges. Therefore, *Batson* challenges likely will not be made.

B. Judges will have More Confidence.

Since the invention can prevent lawyers from excluding jurors based on their race and gender and since lawyers would have a chance to gain more information on jurors, judges will have more confidence that jurors are not being excluded based on their race and gender and attorneys are gaining more insight into the jurors.

Advantages for Judicial Economy

A. Can Administer Jury Trials at a Much Faster Rate.

Since jury selection can be conducted completely out of court. No court time would be needed to conduct jury selection which would speed up court dockets. Also, if the invention is merely used to accommodate conventional jury selection, it can speed up conventional jury selection because lawyers would know exactly what questions to ask the jurors when they question them in court.

B. Can Decrease Appellate Case Loads.

Since the invention can prevent *Batson* challenges due to juror race and gender profiles not being revealed to lawyers when making juror selections, appeals based on *Batson* likely would decrease causing appellate case loads to decrease.

Advantages to Society

A. Prevents Discrimination.

Since the Civil War, America has struggled for race and gender equality in all walks of life: education, employment, voting, housing, contracting etc. Due to the invention's features that prevent race and gender discrimination, government exclusion of citizens participating in their civic duty of jury selection based on race and gender could finally be prevented.

B. Helps Economy.

Companies lose money each year due to employees taking off work for jury selection. Since the invention can be conducted outside of court many jurors would not have to take off work to report for jury selection.

Advantages to the Pursuit of Justice

A. Can Prevent Bias within the Jury Panel.

Since lawyers can receive greater insight into the mental impressions of jurors and can receive significantly more information on jurors, lawyers can better prevent jurors who are biased against them from sitting in the panel. Ultimately, this could have the result of more just verdicts.

B. Can Make Justice Blind.

Since the invention, can prevent jurors from being discriminated against based on their race and gender, justice would become truly blind.

Advantages for Minority Civil Plaintiff's and Civil and Criminal Defendants

Because the invention can prevent race and gender discrimination, minority civil plaintiff and civil and criminal defendant's would have more confidence in a jury's verdict knowing that fellow minority jurors were not excluded from the venire based on their race and gender.

Uses of Inventive Jury Selection Software and Method

Given the many options, invention can be used in many different ways to accomplish any objective of jury selection. Thus, it can be used in any way from basic questioning of jurors before attorneys question them in court to attorneys making all jury selections outside of court. Thus, it can be used to accommodate and enhance conventional jury selection or it can be used to replace conventional jury selection. The following are just some of the more practical ways the invention can be utilized:

1. Basic Questioning of Jurors with No Options

The judge can simply not select any options and use the invention as a means of simply questioning jurors and recording their responses before the attorneys question them in court and make juror selection decisions. There are many substantial advantages of this basic forum. It can greatly enhance the productively of conventional jury selection. In conventional jury selection, attorneys simply do not have enough time to ask jurors as many questions as they desire do to the time constraints. Since the invention can administer questions outside of court, attorneys can ask as many questions as they desire. Instead of only having the opportunity of asking each juror maybe one or two blanket questions asked of all jurors in conventional jury selection, the inventive program and method allows attorneys to ask each juror well over a hundred questions. Additionally, since each juror answers the questions in private and out of the presence of other jurors, they will not conform their responses. So, the responses obtained are likely more genuine and untainted. Ultimately, such greater insight into the mental impressions of jurors will obviously help attorneys make better more grounded jury selection decisions in court.

Such a forum can also make jury selection more economical. Since this software can obtain the juror responses before the jurors appear in court, it could have the effect of shortening voir dire. Thus, when the jurors show up for jury selection, attorneys will automatically know which specific questions to ask each individual juror. Thus, attorneys will know exactly which questions they need to clarify with jurors based on their responses on the questionnaire. Also, since voir dire likely would be shortened, jury pool sizes could increase giving attorneys a broader base to choose and impanel a jury due to their questions being more efficient. Additionally, since jurors can answer the questions at anytime 24 hours a day, they will not have to take off work to answer the questions. Also, since jurors can call and answer questions as many times as they want, jurors will not be burdened by lengthy questionnaires.

Thus, the invention is economical in that attorneys never have to leave their office or attend court to obtain responses to their questions. Also, the inventive method and program records the oral responses of jurors into a typed format. Thus, jurors are not burdened with having to write out all of their responses. Additionally, it records the actual voice responses of jurors and allows attorneys to listen to the sincerity of juror responses.

Such a forum allows attorneys the opportunity to know jurors personally and obtain a feel for each juror's intelligence, decision making ability, and how they will fit in with the rest of jurors. Thus, the invention can put an end to attorneys having to rely on unreliable juror stereotypes to make juror selections.

Furthermore, such a forum could help reduce the probability of attorneys exercising their peremptory challenges based on juror race or gender. Thus, many scholars have argued that an increase in juror mental impressions and information will help attorneys make more informed jury selection decisions and rely less on racial and gender stereotypes.

2. Basic Questioning of Jurors with the Option of Viewing the Jurors

The judge can also decide to use the invention simply questioning jurors and recording their responses and allowing the option of video recording jurors respond. This forum would allow attorneys the additional advantage of actually viewing the jurors respond to the questionnaire before the jurors appear in court for questioning. The advantage of this method is that it would undoubtedly provide attorneys with the most credible information. Thus, they could see the sincerity of juror responses and look for physical gestures that could indicate bias. The disadvantage of this method is that the jurors would not be provided with the luxury of answering the questions from their personal telephone since they have to be video recorded when responding to the questionnaire.

3. Inventive Jury Selection Method with the Option of Exercising Challenges for Cause WITH Listening and/or Viewing Jurors Respond The judge can utilize the invention to not only record juror responses to the questionnaire but also allow the option of attorneys exercising an additional number of challenges for cause to the challenges for cause WITH Listening and/or Viewing Jurors Respond that are designated for in court questioning of jurors. Thus, in this forum attorneys would be allowed to exercise a given number or unlimited number of challenges for cause WITH Listening and/or Viewing Jurors Respond through this software based on juror questionnaires. Then attorneys would be allowed to exercise their regular number of challenges for cause and peremptory challenges in court. This forum is advantageous from an economic stand point. Thus, the jurors who, on paper, would not qualify to sit on a jury could be excluded before they have to appear in court for questioning. Thus, they would not have to take off work or be burden with having to travel to the courthouse for questioning. Thus, people like police officers or people related to the defendant or prosecutor would not have to appear.

4. Inventive Jury Selection Method with the Option of Exercising Challenges for Cause and Peremptory Challenges WITH Listening and/or Viewing Jurors Respond The judge also could allow attorneys the options of exercising challenges for cause and peremptory challenges WITH Listening and/or Viewing Jurors Respond based on juror questionnaires through this software before and in addition to attorneys questioning jurors in court and exercising more challenges for cause and peremptory challenges WITH Listening and/or Viewing Jurors Respond. The advantage of this forum is that jury pools or the number of jurors called for jury duty can be expanded and attorneys can narrow this pool economically before the jurors have to appear in court. Thus, jurors excluded with challenges for cause and peremptory challenges WITH Listening and/or Viewing Jurors Respond through the software would not have to appear for in court questioning. Thus, the most obvious jurors to be excluded could be excluded through the software, and, in turn, they would not have to take off work to appear in court.

5. Inventive Jury Selection with Challenges for Cause and Peremptory Challenges WITHOUT Listening and/or Viewing Jurors Respond and Race/Gender Discrimination Prevention Options Combined with in Court Questioning of Jurors and Exercising Challenges for Cause with Expanded Grounds of Inconsistent Responses This forum allows attorneys to question jurors outside of court and record juror responses and allows attorneys to exercise challenges for cause and peremptory challenges WITHOUT Listening and/or Viewing Jurors Respond outside of court and before the attorneys question jurors inside of court. After such juror selections have been made through this software and method attorneys are only allowed to exercise an additional number of challenges for cause on jurors inside of court. Thus, all peremptory challenges may be exercised through the software program WITHOUT Listening and/or Viewing Jurors Respond. Attorneys would not be allowed to exercise peremptory challenges inside of court when questioning jurors. The advantage of this method is that with the invention options of preventing race and gender based challenges for cause and peremptory challenges such as anonymous numbers in place of juror names, making objections to questions based on race and gender, editing responses that give rise to race and gender, and *Batson* Challenges attorneys will be prevented from excluding jurors based on their race or gender. Additionally, lawyers would get greater insight into the mental impressions of jurors. Also, the standard for challenges for cause exercised in court could be expanded to being able to remove jurors whose responses on the questionnaire are inconsistent with their in court responses. Thus, this inconsistency could be based on the context of their responses and their physical gestures. For more advantages of this forum see article in the Kansas Journal of Law and Public Policy.

6. Complete Jury Selection Outside of Court with Viewing Option

The judge could elect to have all jury selection outside of court through use of this invention. Thus, with the invention's option of allowing attorneys to view jurors respond to the questionnaire by video recording jurors respond and the invention's options of exercising challenges for cause and peremptory challenges WITH Listening and/or Viewing Jurors Respond, and *Batson* Challenges, all required elements of jury selection are met with the invention. Therefore, all of jury selection can be conducted outside of court. Thus, attorneys would be able to view the jurors respond to questions and listen to their responses and study their responses. The obvious advantage to this forum is that only the jurors who made the panel have to show up. Another obvious advantage to this forum is that no more court time would have to be taken up for jury selection. Thus, jury trials can be resolved twice as fast. Additionally, since attorneys can ask as many questions as they desire, they would likely be able to make more informed jury selection decisions than they would be able to make in conventional jury selection of questioning jurors in court. Thus, attorneys likely would be exposed to over a hundred times the amount of information that they would be able to obtain with conventional jury selection. Thus, citizens would never have to take off work for jury duty if they were not chosen. Also, the jurors who were chosen would not have to take off as much work. Furthermore, judicial economy likely would be enhanced.

Another advantage to this method over conventional jury selection is that attorneys would not have to personally question potential jurors in court and risk jurors becoming hostile with them. Additionally, the jurors would not be able to conform their responses like they would be able to in conventional jury selection.

Furthermore, the risk of attorneys excluding jurors with discriminatory peremptory challenges likely would decrease significantly because attorneys would base their peremptory challenges on greater information which reduces the chance of attorneys relying on race and gender stereotypes.

Ultimately, this the invention method consisting of challenges for cause and peremptory challenges WITH Listening and/or Viewing Jurors Respond, *Batson* Challenges, and the viewing option completely outside of court likely provides the most substantial and feasible advantages to society, judicial economy, and attorneys. Attorneys will like this forum because they can view the jurors respond and obtain over a hundred times the amount of mental impressions of jurors than conventional jury selection and they will not run the risk of making jurors hostile with them.

7. Complete Jury Selection Outside of Court with all Race/ Gender Discrimination Prevention Options The judge can also allow for complete jury selection outside of court with all of the race and gender discrimination prevention options of the invention in tact. Thus, attorneys would base all of their challenges for cause and peremptory challenges WITHOUT Listening and/or Viewing Jurors Respond on the juror questionnaires. Thus, the names and appearances of jurors would not be revealed to the attorneys before they make their jury selection decisions. Thus, attorneys would not have any of the race or gender profiles of jurors before they exercise challenges for cause or peremptory challenges.

This forum likely would prevent any race and gender discrimination in jury selection. It would provide attorneys with well over a hundred times the amount of mental impressions of jurors than conventional jury selection. Jurors would be able to respond to the questionnaire from their home phone. Only jurors chosen to serve will have to appear in court.

8. Complete Jury Selection Outside of Court with Challenges for Cause and Peremptory Challenges WITHOUT Listening and/or Viewing Jurors Respond Combined with Challenges for Cause WITH Listening and/or Viewing Jurors Respond and Expanding the Standard of Such Challenges for Cause to Include Inconsistent Responses.

This particular setup of the invention Software likely would completely prevent race and gender discrimination in the selection of jurors since lawyer would not be allowed to exercise their peremptory challenges on the physical appearances or voices of the jurors. Additionally, lawyers would not be disadvantaged by not being allowed to base their peremptory challenges on the physical appearances and voice tones of jurors since they would be allowed to exclude jurors with Challenges for Cause WITH Listening and/or Viewing Jurors Respond after such peremptory challenges are exercised with the expanded grounds of inconsistent answers. Thus, lawyers would be able to exclude jurors if their physical gestures and voice tones are inconsistent with the context of any of their statements. Therefore, the lawyer's need to view and/or listen to the jurors respond to make jury selection decisions would be satisfied, and the need for preventing jurors being excluded based on their race and gender would also be satisfied. Also, since the entire process could be done outside of court almost every advantage that the invention has to offer mentioned above, could be provided through this format.

This unique method and computer program provide an exciting addition to the administration of justice. Other objects, advantages and novel features of the present invention will become apparent from the following detailed description of the invention when considered in conjunction with the accompanying drawings.

DESCRIPTION OF THE PREFERRED EMBODIMENTS

Figure 1:
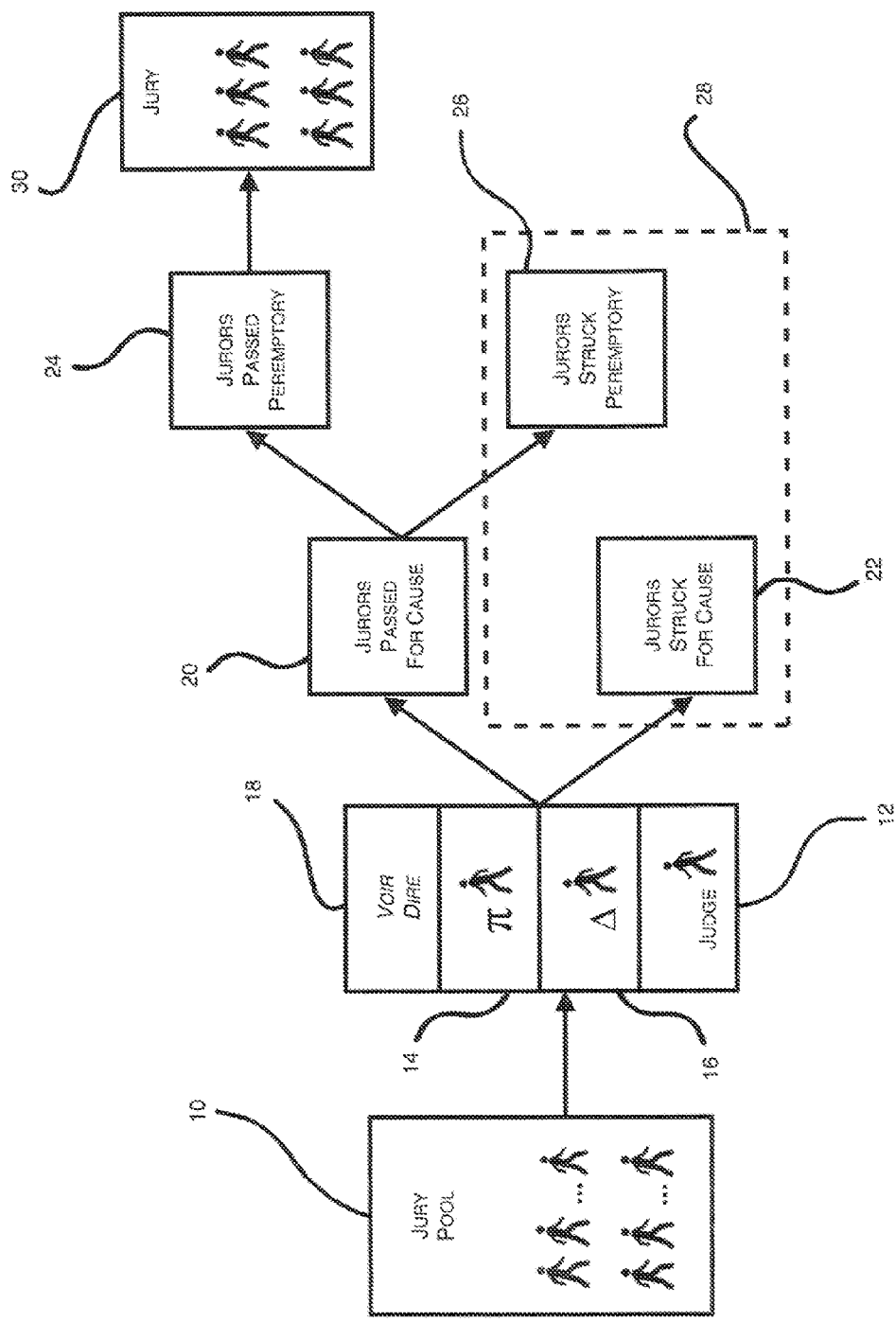
FIG. 1 is a flowchart detailing the traditional, prior-art method of selecting a jury panel from a pool of prospective jurors.

FIG. 1 shows a flow-chart diagram of a the commonly used method of jury selection. A jury pool 10 is chosen by the Court Administrator; the pool 10 is then subjected to a voir dire examination 18. The voir dire comprises three main components: first, a judge-rendered component 12, a plaintiff's component 14, and a defendant's component 16.

Generally, the judge component 12 of the voir dire often includes a court-approved jury questionnaire that is distributed to each member of the jury pool 10 prior to their appearance in court per a jury summons. Of course, the judge component 12 may also include live, in-court question-and-answer.

Still referring to FIG. 1, the prior art method of jury selection also includes live, in-court questioning of the jury pool 10 comprising a plaintiff's component 14 of the voir dire 18 and a defendant's component 16 of the voir dire 18.

After the voir dire 18 is completed, the parties (and the court) may execute any juror strikes for cause. Those that are struck for cause 22 will become members of the excused group 28 that is excluded from further service and sent home with the thanks of the court. In contrast, those who are passed for cause 20 remain a part of the jury pool 10, and are then subjected to peremptory challenges by the parties. Those subjected to peremptory strikes 26 become members of the excused group 28 that is sent home with the thanks of the court.

Those jurors who are passed from peremptory strikes forma group 24 that is subjected to a final whittle-down (if necessary) before the jury 30 is empaneled. Those that are members of the group 24 but not selected to serve on the jury 30 become members of the group 28 that is relieved of further jury duty.

Figure 2:
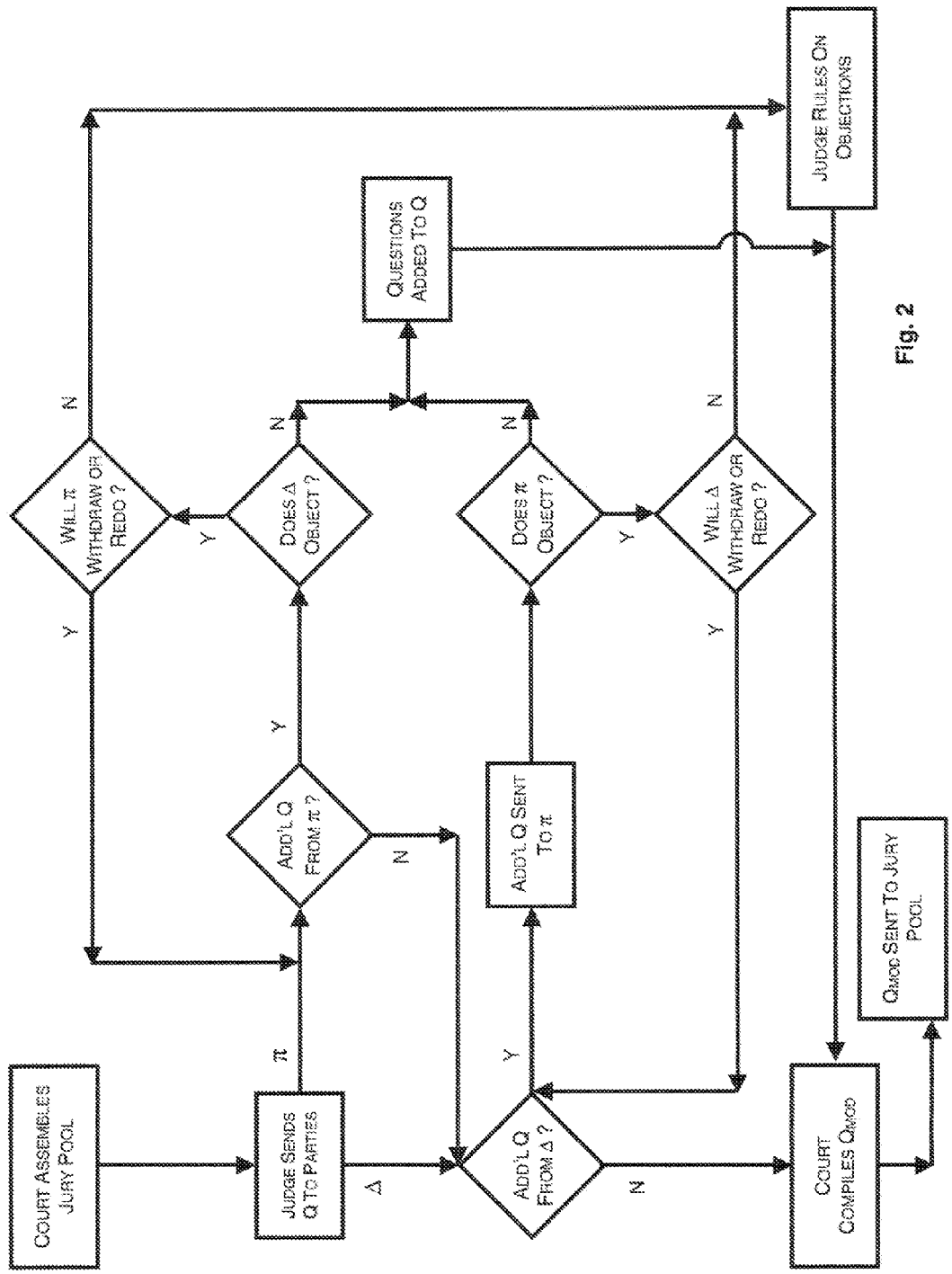
FIG. 2 is a flowchart detailing the initial steps of the unique method and computer program for jury selection, according to the principles of the invention.

FIG. 2 is a flow chart detailing the initial phases of the computer program and method for jury selection, according to the principles of the invention. First, the Court administrator assembles a pool of jurors, usually from random, or from data assembled from numerous databases, such as voter registration databases, drivers license registrations, and the like.

Still referring to FIG. 2, as a case nears a trial setting, the judge sends a juror questionnaire Q to each of the parties. For simplicity, FIG. 2 details the invention as it would be used in a simple suit having only one plaintiff and one defendant; however, the inventive jury selection method is well-suited for multiple party litigation, or even class action litigation as well.

As shown in FIG. 2, the trial judge sends the questionnaire Q to each party, who is entitled to propose additional or supplemental questions. When a party desires to submit supplemental questions, however, these proposed additions are first sent to the opponent, who may make objections to any of the supplemental questions. If there are no objections to the supplemental questions, then these are added to the initial questionnaire Q and become part of a modified Questionnaire entitled Qmod.

Still referring to FIG. 2, the parties are encouraged to work out their differences regarding potentially troublesome supplemental questions. If an opponent's objection is well-taken by the proponent, the question may be either re-worded or withdrawn entirely by the proponent. However, if the parties cannot agree as to the validity of an opponent's objections, the objection(s) are forwarded to the Court for ruling.

As shown in FIG. 2, the Court will rule on the objections lodged by the parties; this may be accomplished in any known method within the court's discretion. For example, the Court may grant the objection in its entirety by discarding a proposed supplemental question. Alternatively, the court may overrule the objection in its entirety by allowing the question, as proposed, to become a part of Qmod. In its discretion, the Court may grant the objection in part by dedacting or deleting objectionable portions—or even re-wording supplemental questions—before a supplemental question becomes part of Qmod.

As further shown in FIG. 2, if the parties have no objections to any of the supplemental questions proposed by an opponent, these questions will become part of Qmod as well. Finally, the Court Administrator then compiles the final version of Qmod so that it can be sent to all members of the jury pool.

Figure 3:
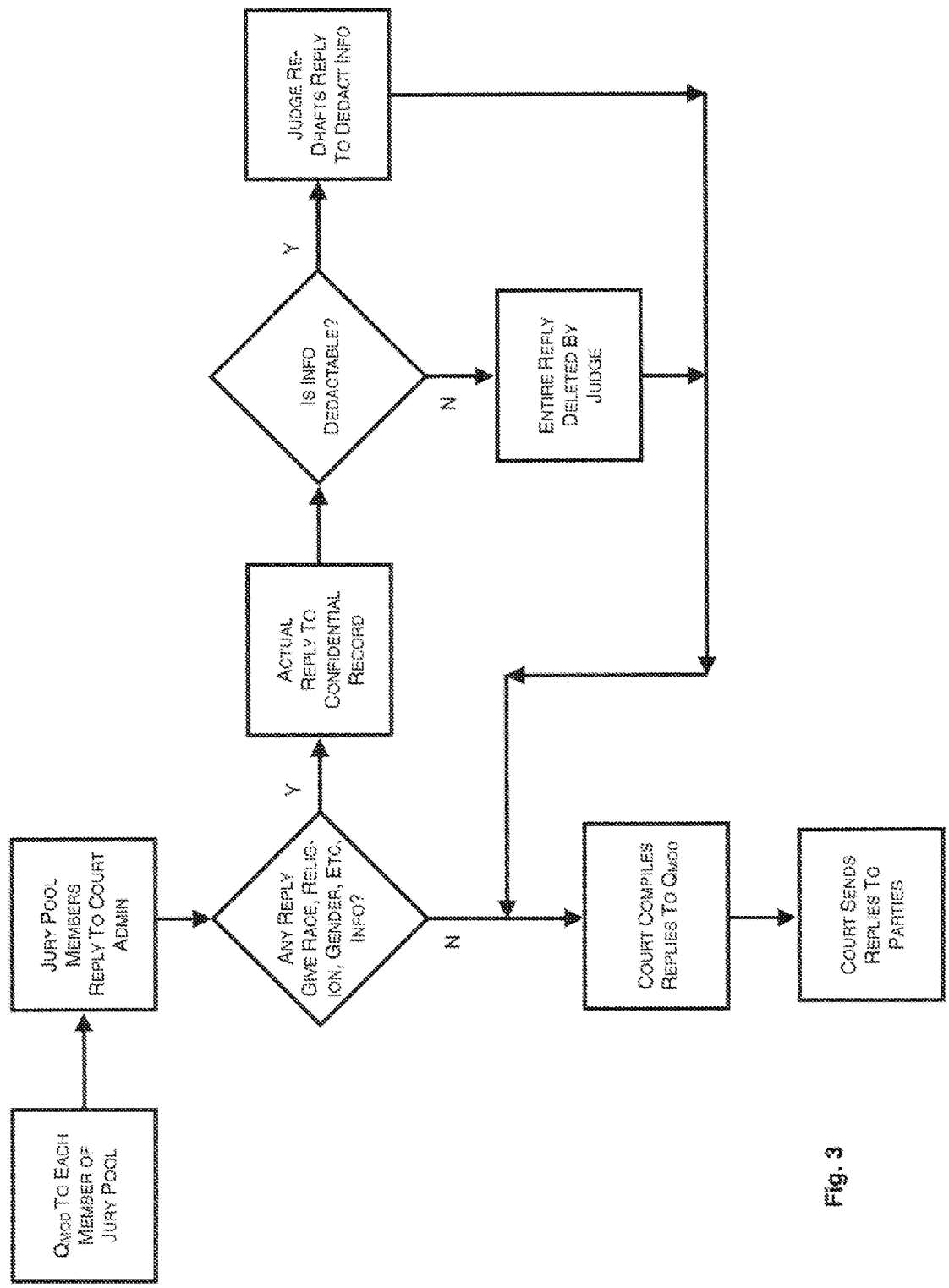
FIG. 3 is a flowchart showing subsequent steps of the unique method and computer program.

FIG. 3 is a flowchart showing subsequent steps of the inventive method and computer program, according to the principles of the invention. The Court Administrator then sends Qmod to each and every member of the jury pool, and demands that each member return Qmod with replies. In a preferred embodiment, Qmod is sent electronically to each member of the jury pool, preferably by email. Alternatively, members of the jury pool may reply to Qmod by telephone, by entry of replies into a website, or the like. Because most statutes and court rules require that jurors respond to voir dire questions under oath, care should be taken to ascertain that each member answers under the penalty of perjury.

As shown in FIG. 3, the Court Administrator and/or the Judge reviews the juror replies for indicators of race, religion, gender, sexual orientation, marital status, or the like. If this information may be dedacted from the response, the court may, in its discretion, re-word the reply or dedact the appropriate portion(s) from the replies. If the entire reply is passim with such indicators, the court may, in its discretion, dedact the respective reply in its entirety.

As shown in FIG. 3, the responses to the Qmod—edited as needed—are then compiled by the Court Administrator, who then forwards the edited replies to all parties.

Figure 4:
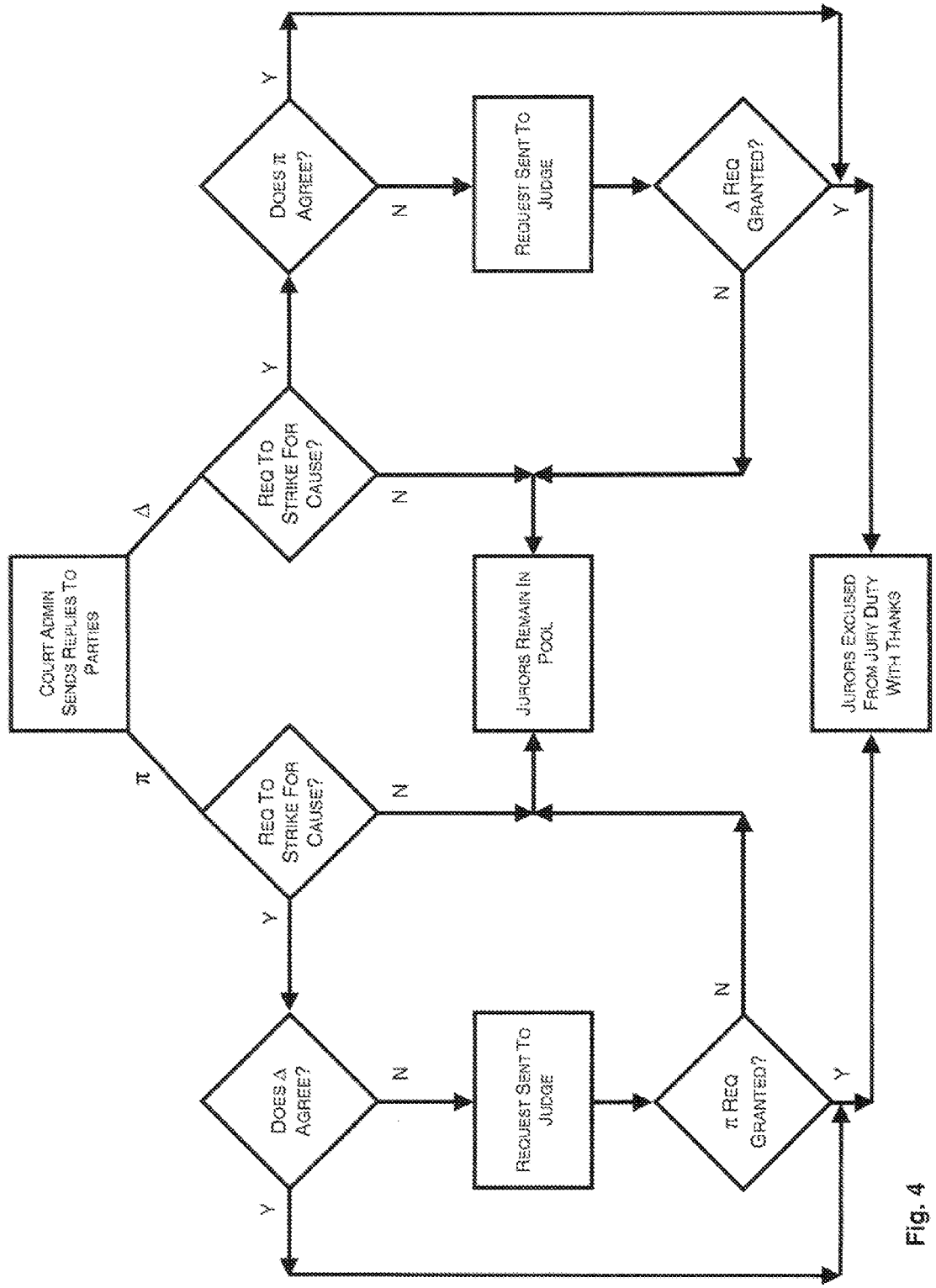
FIG. 4 is a flowchart showing subsequent steps of the unique method and computer program.

As shown in FIG. 4, the replies of the jury pool are forwarded to each party, who reviews the replies. Each party will then review the replies to Qmod to determine whether a request to strike for cause should be lodged to any member of the jury pool. If a party makes a request, the inventive method and computer program will then ascertain that such is forwarded to the opponent, preferably by e-mail or any other electronic means. If the parties agree that the request to strike for cause should be granted, then that juror is then excused from further jury duty with the thanks of the court.

Still referring to FIG. 4, if the parties cannot reach an accord as to the propriety of a request to strike for cause, then each party will be afforded the opportunity to present evidence and/or argument to the Court, which will rule upon the Request in due course. Preferably, the request, argument and/or evidence is all submitted, transmitted, and received electronically.

As shown in FIG. 4, if a party's request to strike for cause is denied, then the juror will remain a member of the jury pool. Conversely, if a party's request to strike is granted, then that juror is then excused form further jury duty with the thanks of the Court. It is preferred that those excused from jury duty—whether by agreement of the parties or by the Court—receive notice of such exclusion before even being required to come to court. Application of the inventive method and computer program, therefore, marks a considerable improvement over the prior art because it saves considerable time and resources, and also reduces the burden on pool members by possibly eliminating the need to take time away from their daily lives only to be later excused from jury duty.

Regrettably, it is well-known that many people receive jury summonses fail to properly comply with them for one reason or another. Usually, jurors fail to comply because they cannot take time away form their work, families, or travel schedule in order to meet their civic duty. However, the inventive computer program and method will increase response from those who receive jury summonses, because many can be eliminated from the jury pool without having to take an entire day to endure traditional voir dire. Under the traditional methods of voir dire, a member of the jury pool may be required to absent himself from his daily routine for several days, only to be later excused from service before the jury is empaneled. This fear of waste deters many from properly complying with the jury summons—and the invention eliminates much of this waste.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A method enabling parties to litigation to select a jury from a plurality of candidates, the method comprising the steps of:

providing a personal computer to each of the parties to litigation;

posting an initial questionnaire on a website in communication with a computer server;

pairing a respective email address with each respective party to litigation;

providing the initial proposed questionnaire for each party to review by enabling each party to access and add questions to the questionnaire from the website to the personal computer of the respective parties to litigation;

emailing a notice to each respective party, the notice informing that the initial proposed questionnaire is available for access from the website, for review and update;

accessing the initial proposed questionnaire on the website from the personal computer of the respective parties to litigation;

creating an updated questionnaire by the parties to litigation, the creating step including adding supplemental questions to the initial proposed questionnaire;

entering, by at least one of the parties to litigation, an objection to the at least one additional question;

transmiting the objection to the at least one additional question to a judge and to the other parties to litigation;

transmiting a ruling on the objection, the ruling made by the judge, to the parties to litigation;

presenting the updated questionnaire to each respective candidate;

answering, by each respective candidate, each question of the updated questionnaire;

converting, on the server, each respective reply by automatically transcribing each reply into a text-based tangible form;

compiling respective replies to the updated questionnaires, and posting the respective replies on the website;

assigning a gender-neutral indicator to the respective reply of each respective candidate;

correlating each respective gender neutral indicator to the respective reply submitted by the respective candidate;

editing, by a judge, the respective responses to delete indicators of at least one of gender, race, or religion, marital status, sexual orientation, socio-economic status, education level, or profession, thereby creating edited candidate replies;

alerting the parties by email to perceive the respective edited candidate replies from the respective candidates;

making the edited candidate replies available, on the website, to the parties to the litigation;
selecting, through the website, from the plurality of candidates those jurors that at least one party desires to exclude from the jury;
striking from the plurality of candidates those who were chosen during the selecting step to be excluded from the jury;
empaneling each member of the jury;
creating, by the server, a jury selection process transcript.

2. The method as in claim 1, further comprising the step of conducting a live, in-person voir dire examination of the plurality.

3. The method as in claim 1, wherein the step of striking a respective candidate is performed using the respective gender neutral indicator.

4. The method step as in claim 1, further including at least one of:
the step of redrafting questions that were subject to the at least one objection; or,
the step of deleting the question that was subject to objection.

5. The method as in claim 1, further including the steps of
notifying the parties by email of a conclusion of the striking step;
allowing each party to enter objections to actions taken during the striking step;
notifying a judge of objections to actions taken during the striking step; and,
posting onto the website, by the judge, of rulings on the objections to actions taken during the striking step.

6. A non-transitory computer readable storage medium with an executable computer program stored thereon enabling parties to litigation to select a jury from a plurality of candidates, the computer program comprising:
a code sequence operable to pair a respective email address with each respective party to litigation;
a code sequence operable to make an initial proposed questionnaire available for review on an internet website in communication with a computer server;
a code sequence operable to email a notice to each respective party, the notice informing that an initial proposed questionnaire is available for review on the internet website;
a code sequence operable to enable the respective parties to access and submit supplemental questions to the initial proposed questionnaire on the internet website to create an updated questionnaire;
a code sequence operable to enable a party to the litigation to enter an objection to the at least one additional question, via the internet website;
a code sequence operable to transmit the objection to the at least one additional question to the judge and to the parties to litigation; and,
a code sequence operable to transmit a ruling on the objection, the ruling made by the judge, to the parties;
a code sequence operable to assign a gender neutral indicator to each respective candidate;
a code sequence operable to present the updated questionnaire to each respective candidate;
a code sequence operable to enable conversion, by the computer server, each respective reply by automatically transcribing each reply into a text-based tangible form;
a code sequence operable to enable compiling respective sets of replies to the list of questions updated questionnaires, and posting the respective replies on the internet website;
a code sequence operable to transmit to the judge the replies from each respective candidate;
a code sequence to enable the judge to edit the juror replies, thereby creating amended juror replies;
a code sequence operable to automatically convert, using the server, each respective amended juror reply into a tangible form that the server posts on the website;
a code sequence operable to email the parties to the litigation a notice informing that the candidate replies are available on an internet website;
a code sequence operable to enable each respective party to log onto the internet website and strike from the plurality of candidates those jurors it desires to exclude from the jury;
a code sequence operable to enable striking from the plurality of candidates who were excluded from the jury; and,
a code sequence operable to create a jury selection process transcript.

7. The computer program as in claim 6, further including
a code sequence operable to notify the parties of candidates excluded during the striking step; and,
a code sequence operable to enable at least one of the parties object to action taken during the striking step; and,
a code sequence operable to notify the judge of the objections to actions taken during the striking step; and
a code sequence operable to enable the judge to rule on the objections to actions taken during the striking step; and,
a code sequence operable to notify the parties by email that the step of ruling on the objections has been completed, the objections being to actions taken during the striking step; and,
a code sequence operable to make the ruling on the objections available to the parties, the objections being to actions taken during the striking step.

8. The computer program as in claim 6, further including a code sequence operable to transfer the respective replies into human-readable form.

9. The computer program as in claim 6, further having:
a code sequence operable to input a respective e-mail address for each respective party;
a code sequence operable to compile replies to the questionnaire into a human-readable format;
a code sequence operable to notify by email the respective parties that the replies are available on the internet website; and,
a code sequence operable to enable each party to access the replies.

10. The computer program as in claim 6, further having a code sequence operable to detect and highlight any portion of the respective responses that provides indicators of race or gender.

11. The computer program as in claim 6, further including:
a code sequence operable to send to each party to the litigation the supplemental questions proposed by each party.

12. The computer program as in claim 6, further including a code sequence operable to enable the judge to delete indicators of at least one of gender, race, or religion, marital status, sexual orientation, socio-economic status, education level, or profession, thereby creating the amended candidate replies.

13. The computer program as in claim 6, further including;
a code sequence operable to convert the updated questionnaire to an audible file;

a code sequence operable to transmit the audible file via the internet to each respective candidate;

a code sequence operable to play the audible file to each respective candidate;

a code sequence operable to give a respective response, by each respective candidate, to each question of the updated questionnaire;

a code sequence operable to capture each respective candidate response into a respective digital video file; and, a code sequence operable to alert the parties to the litigation that respective candidate responses are available for viewing and listening.

14. The computer program as in claim 6, wherein the candidates give replies to each question of the updated questionnaire that are captured as audio and video files.

15. The computer program as in claim 6, further including:

a code sequence operable to correlate each respective gender neutral indicator to the respective reply submitted by the respective candidate; wherein, step of striking a respective candidate is performed using the respective gender neutral indicator.

16. The computer program as in claim 6, further including:

a code sequence operable to enable correlating each respective gender neutral indicator to the respective reply submitted by the respective candidate.

17. The Computer program as in claim 12, wherein the code sequence operable to email the parties to the litigation a notice informing that the candidate replies are available on an internet website comprises emailing the parties to the litigation a notice that the amended candidate replies are available on the internet website.

18. The Computer program as in claim 12, wherein each respective amended juror reply is converted into a tangible form that the server posts on the website.

* * * * *